(12) United States Patent
Graham et al.

(10) Patent No.: US 11,780,408 B2
(45) Date of Patent: Oct. 10, 2023

(54) WINDSHIELD WIPER CONNECTOR AND ASSEMBLY

(71) Applicant: Pylon Manufacturing Corporation, Deerfield Beach, FL (US)

(72) Inventors: Matthew Graham, West Plam Beach, FL (US); Will Young, Deerfield Beach, FL (US); Hiroshi Kawashima, Sunrise, FL (US)

(73) Assignee: PYLON MANUFACTURING CORPORATION, Deerfield Beach, FL (US)

( * ) Notice: Subject to any disclaimer, the term of this patent is extended or adjusted under 35 U.S.C. 154(b) by 0 days.

(21) Appl. No.: 17/850,861

(22) Filed: Jun. 27, 2022

(65) Prior Publication Data

US 2022/0402461 A1 Dec. 22, 2022

Related U.S. Application Data

(62) Division of application No. 16/049,540, filed on Jul. 30, 2018, now Pat. No. 11,370,394.

(Continued)

(51) Int. Cl.
| | |
|---|---|
| *B60S 1/40* | (2006.01) |
| *F16B 5/12* | (2006.01) |
| *B60S 1/38* | (2006.01) |
| *F16B 45/00* | (2006.01) |
| *B60S 1/04* | (2006.01) |

(Continued)

(52) U.S. Cl.
CPC ........... *B60S 1/4009* (2013.01); *B60S 1/3801* (2013.01); *B60S 1/4003* (2013.01); *F16B 5/123* (2013.01); *F16B 45/00* (2013.01); *B60S 1/0491* (2013.01); *B60S 2001/3815* (2013.01); *B60S 2001/4022* (2013.01); *B60S 2001/4035* (2013.01); *B60S 2001/4054* (2013.01); *B60S 2001/4058* (2013.01); *F16B 2/22* (2013.01);

(Continued)

(58) Field of Classification Search
CPC .... B60S 1/4009; B60S 1/4048; B60S 1/4006; B60S 1/4016; B60S 2001/4022; B60S 2001/4035; B60S 2001/4058; B60S 2001/4061; B60S 1/4003
USPC .................................................... 15/250.32
See application file for complete search history.

(56) References Cited

U.S. PATENT DOCUMENTS

| | | | |
|---|---|---|---|
| 9,090,231 B2 * | 7/2015 | Park ...................... | B60S 1/3801 |
| 11,370,394 B2 * | 6/2022 | Graham ................ | B60S 1/4003 |

FOREIGN PATENT DOCUMENTS

| | | | |
|---|---|---|---|
| EP | 3072756 | * | 9/2016 |
| FR | 2600292 | * | 12/1987 |
| JP | 2001-163188 | * | 6/2001 |

* cited by examiner

*Primary Examiner* — Gary K. Graham

(57) ABSTRACT

Embodiments of a windshield wiper assembly may include a support structure, a wiper blade connector assembly for connecting the support structure with a wiper arm of a vehicle, a wiper blade cover fittable over the wiper blade connector assembly, and a wiper blade strip secured to the underside of the support structure. The connector assembly may include a wiper blade connector, a wiper blade connector cover connected to the wiper blade connector and pivotable between an open position and a closed position, and a wiper blade connector adapter securable between the wiper blade connector and the wiper blade connector cover. The various embodiments of a wiper blade connector assembly permit the embodiments of the wiper blade assembly to be connected with a plurality of wiper arm types.

17 Claims, 56 Drawing Sheets

Related U.S. Application Data

(60) Provisional application No. 62/671,539, filed on May 15, 2018, provisional application No. 62/651,435, filed on Apr. 2, 2018, provisional application No. 62/646,498, filed on Mar. 22, 2018, provisional application No. 62/625,335, filed on Feb. 1, 2018, provisional application No. 62/587,111, filed on Nov. 16, 2017, provisional application No. 62/538,368, filed on Jul. 28, 2017.

(51) Int. Cl.
*F16B 21/02* (2006.01)
*F16B 2/22* (2006.01)

(52) U.S. Cl.
CPC ............... *F16B 5/121* (2013.01); *F16B 5/126* (2013.01); *F16B 5/128* (2013.01); *F16B 21/02* (2013.01)

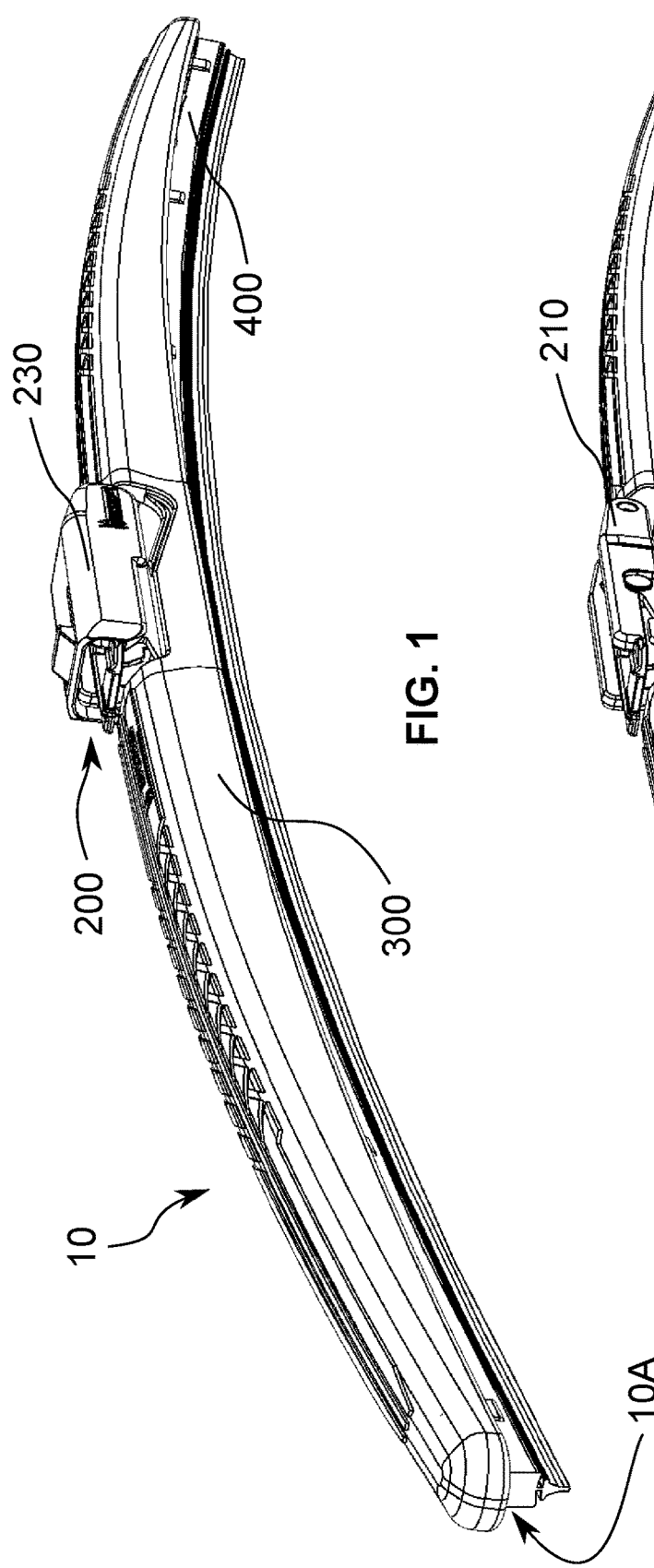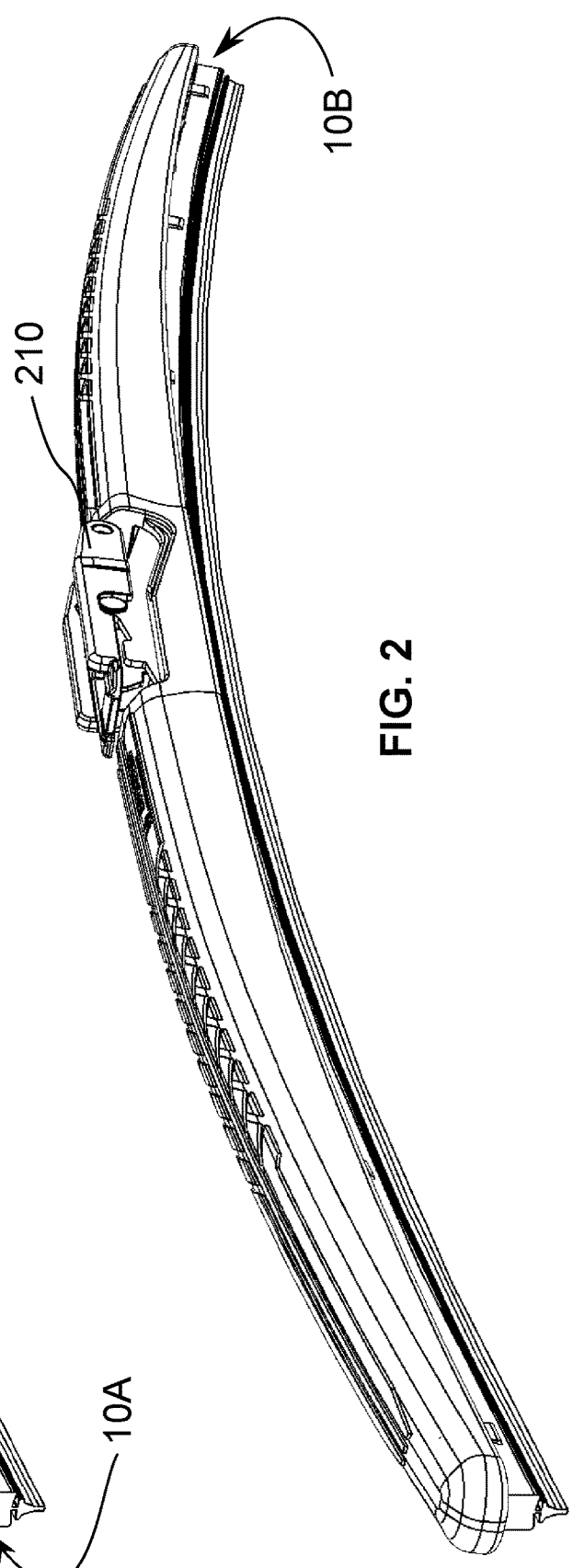

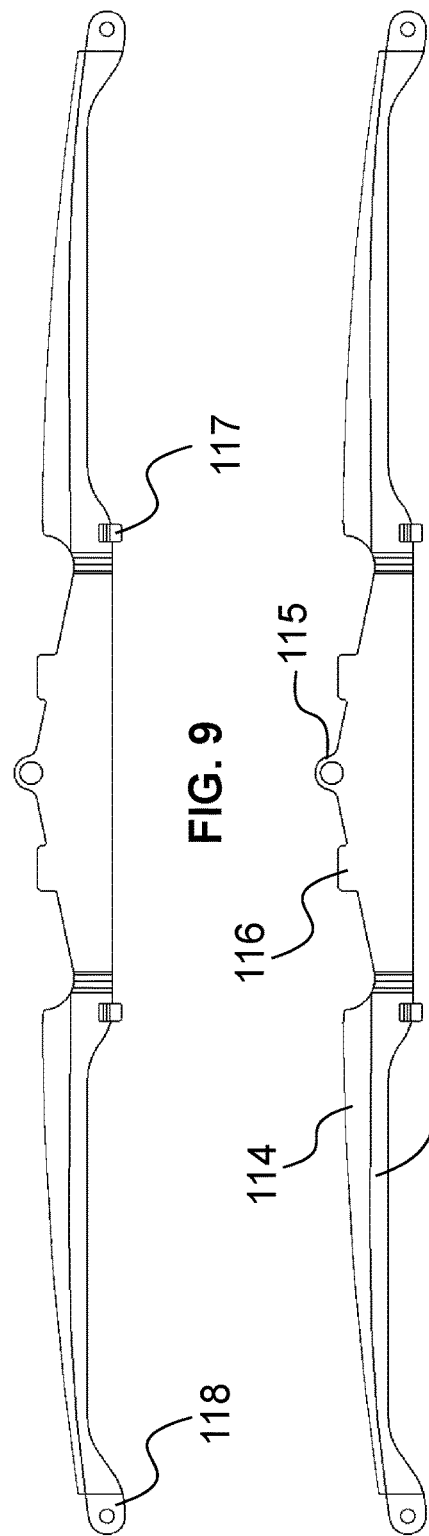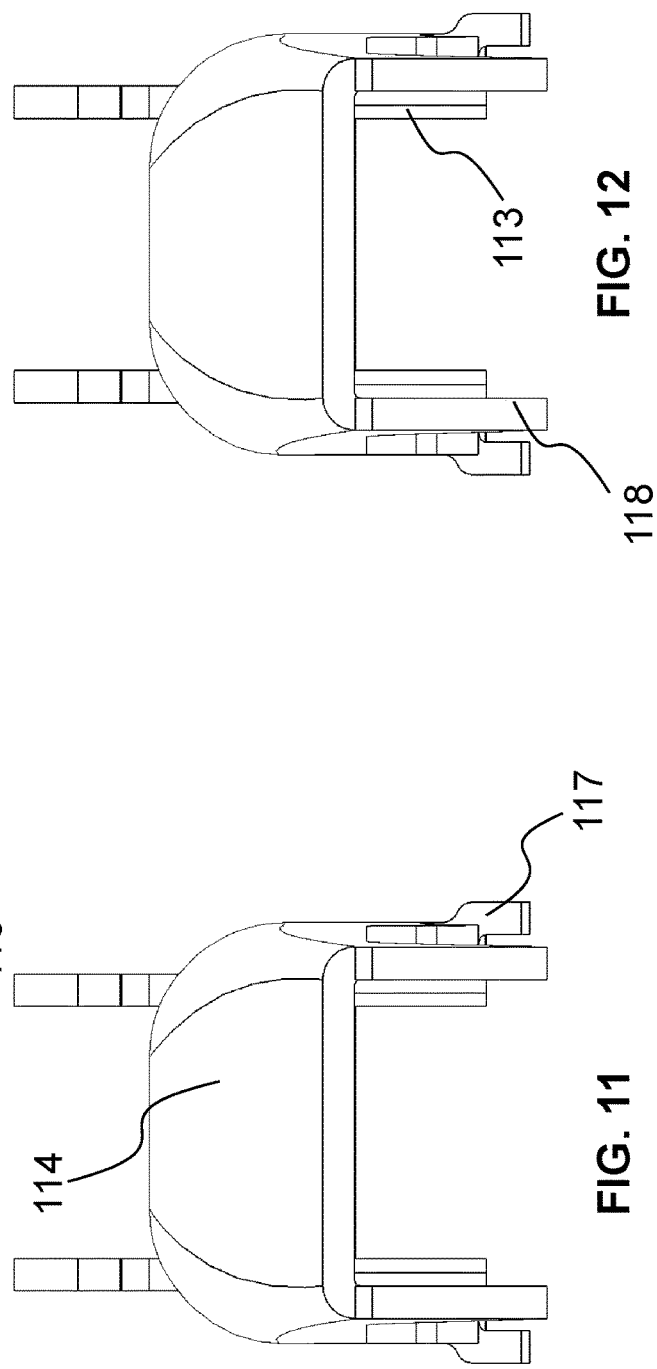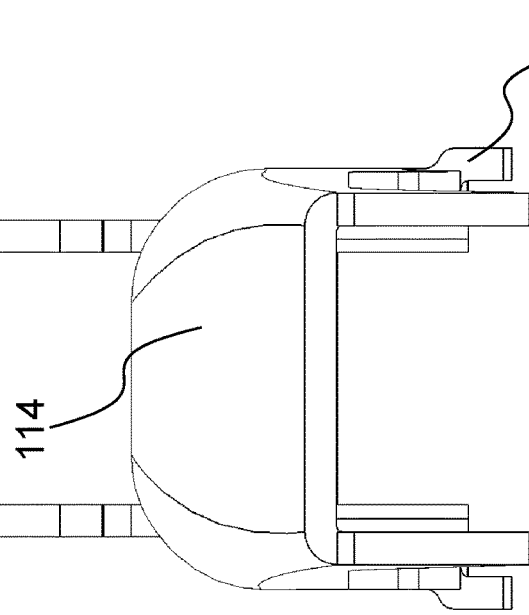

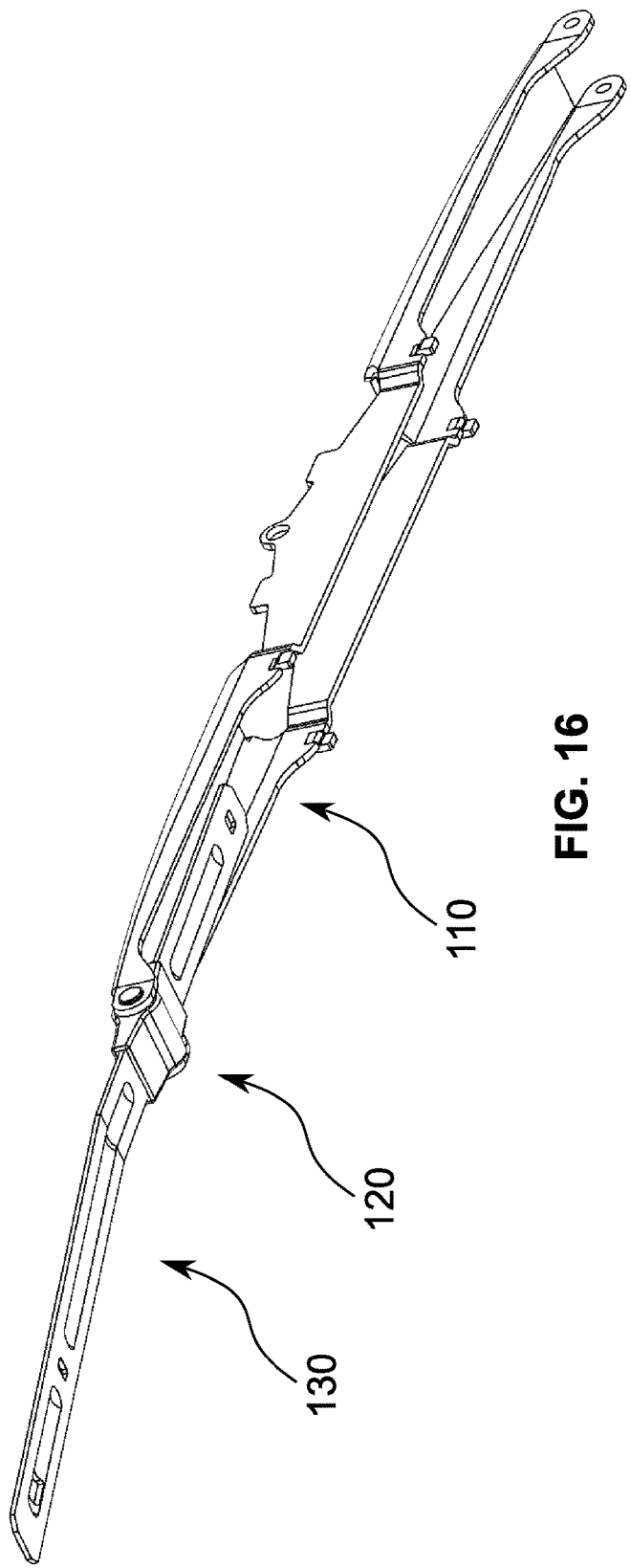
FIG. 16
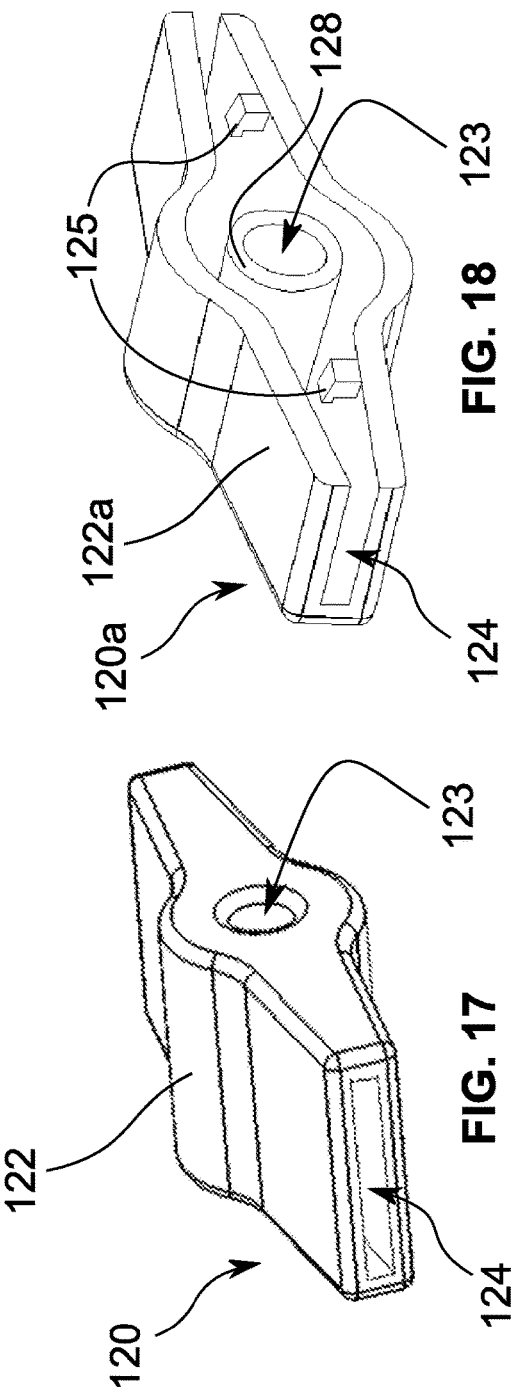
FIG. 18
FIG. 17

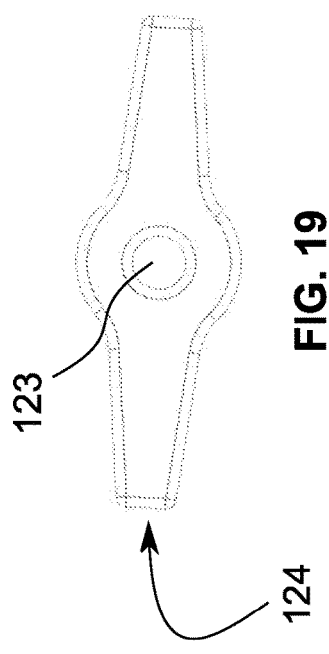
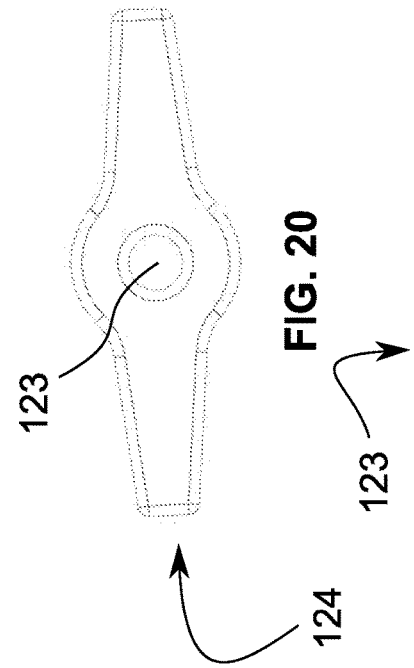
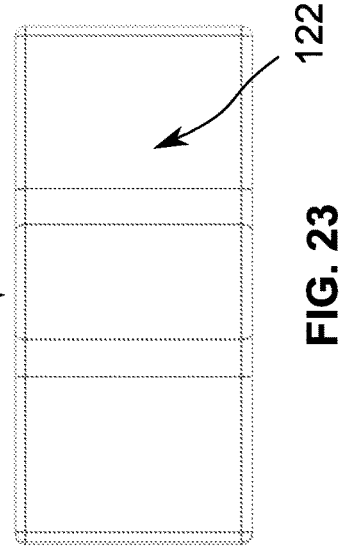
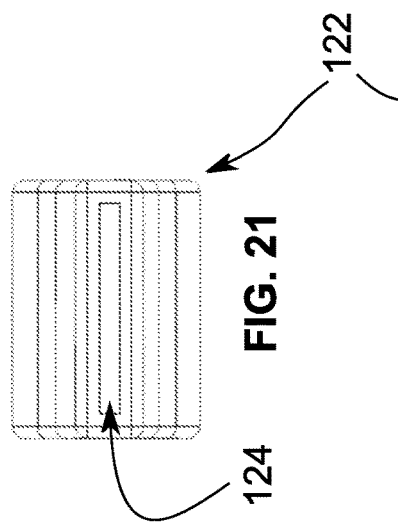
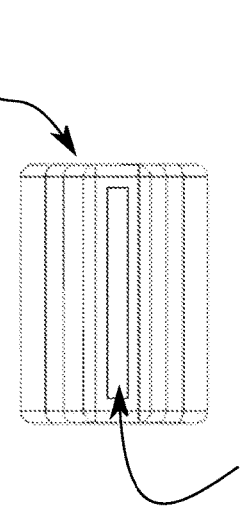
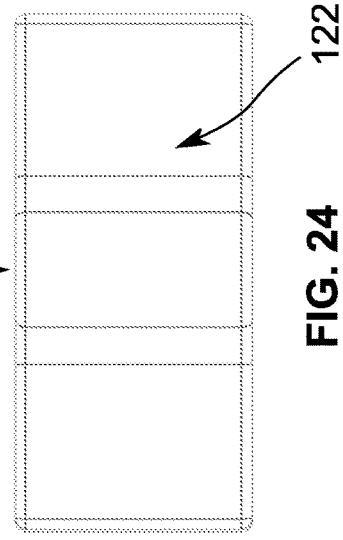

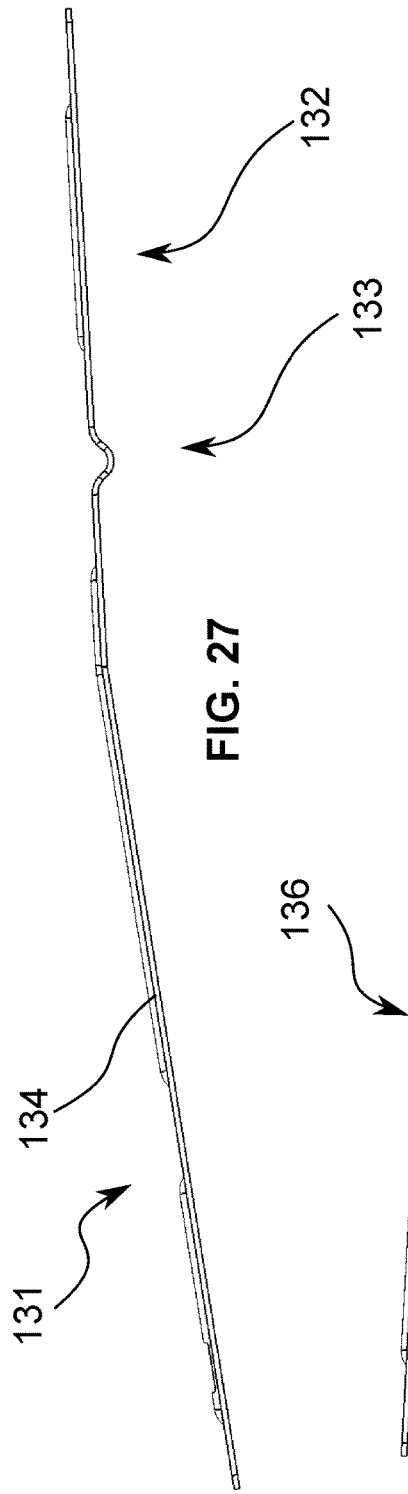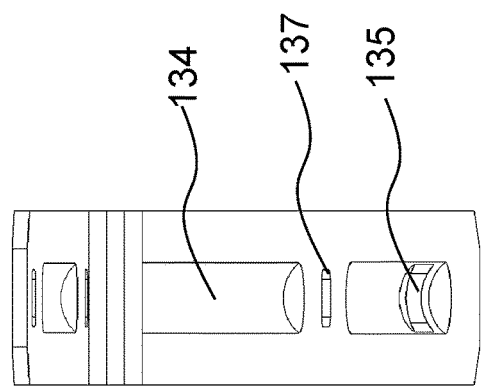

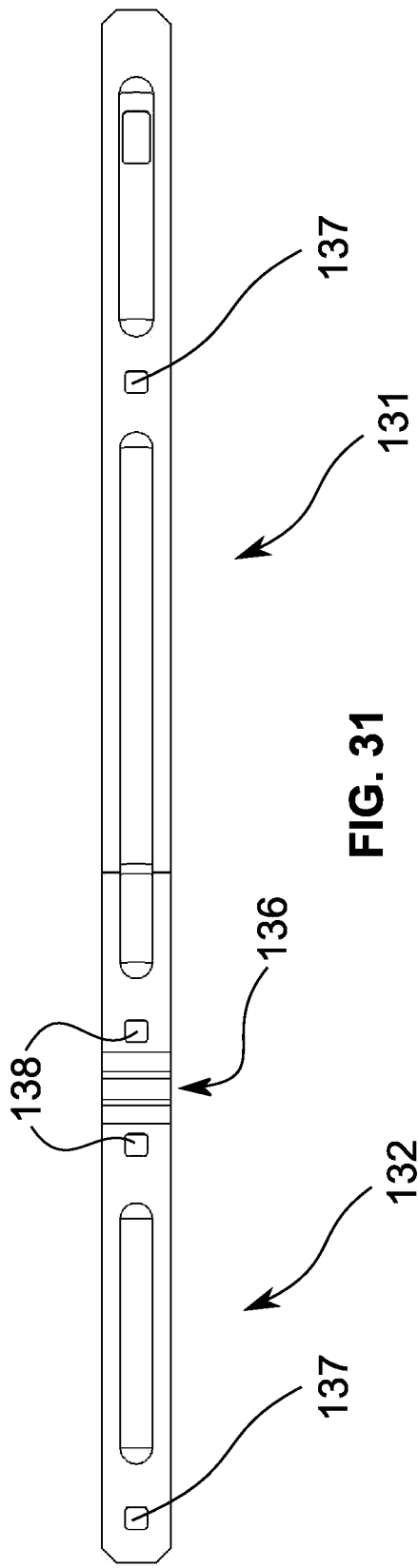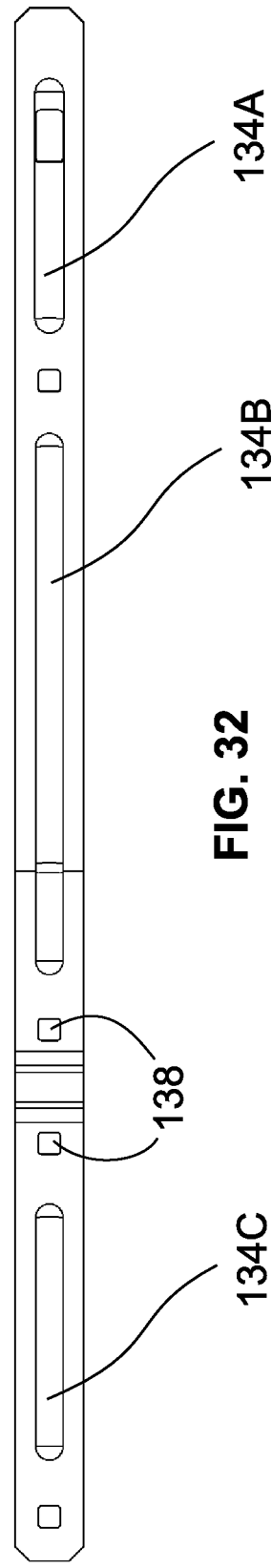
FIG. 31
FIG. 32

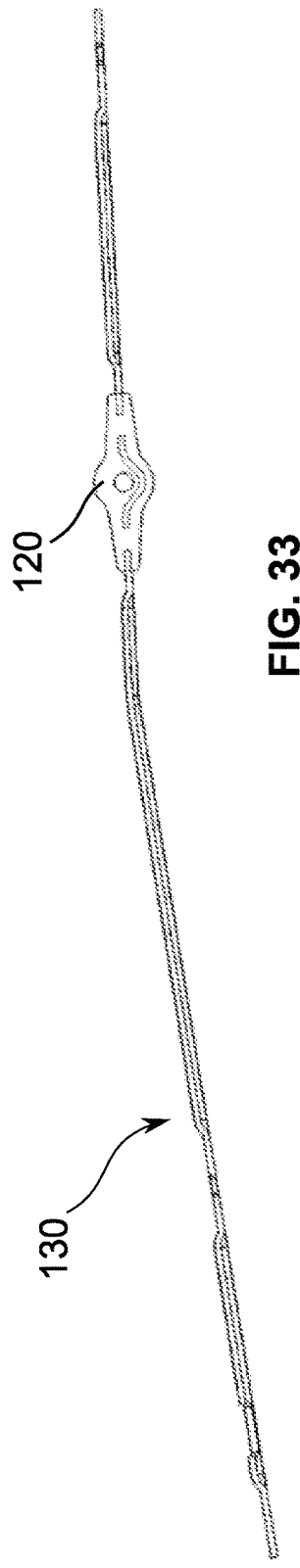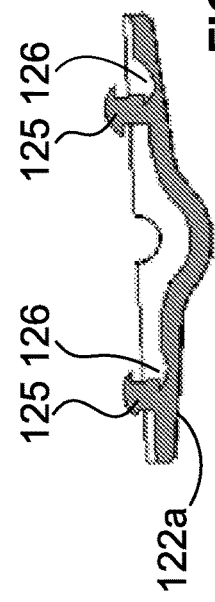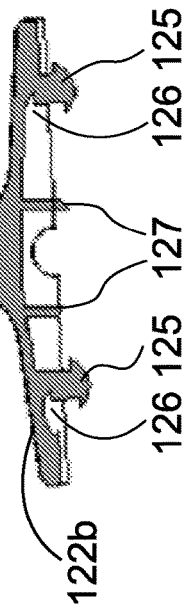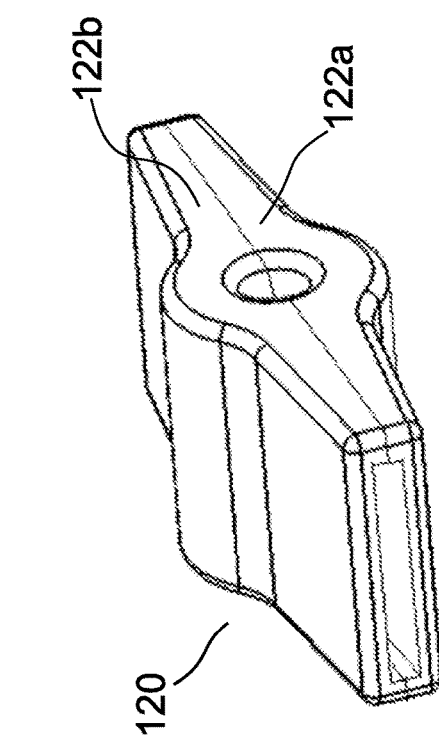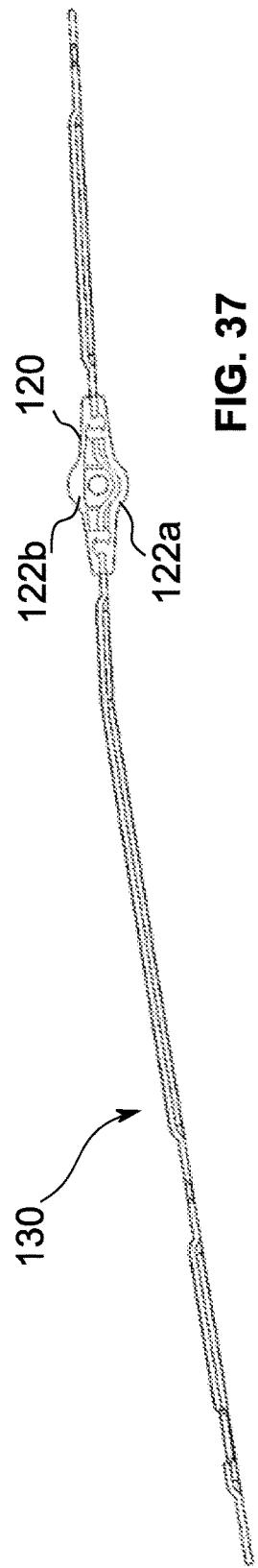
FIG. 33
FIG. 35
FIG. 36
FIG. 34
FIG. 37

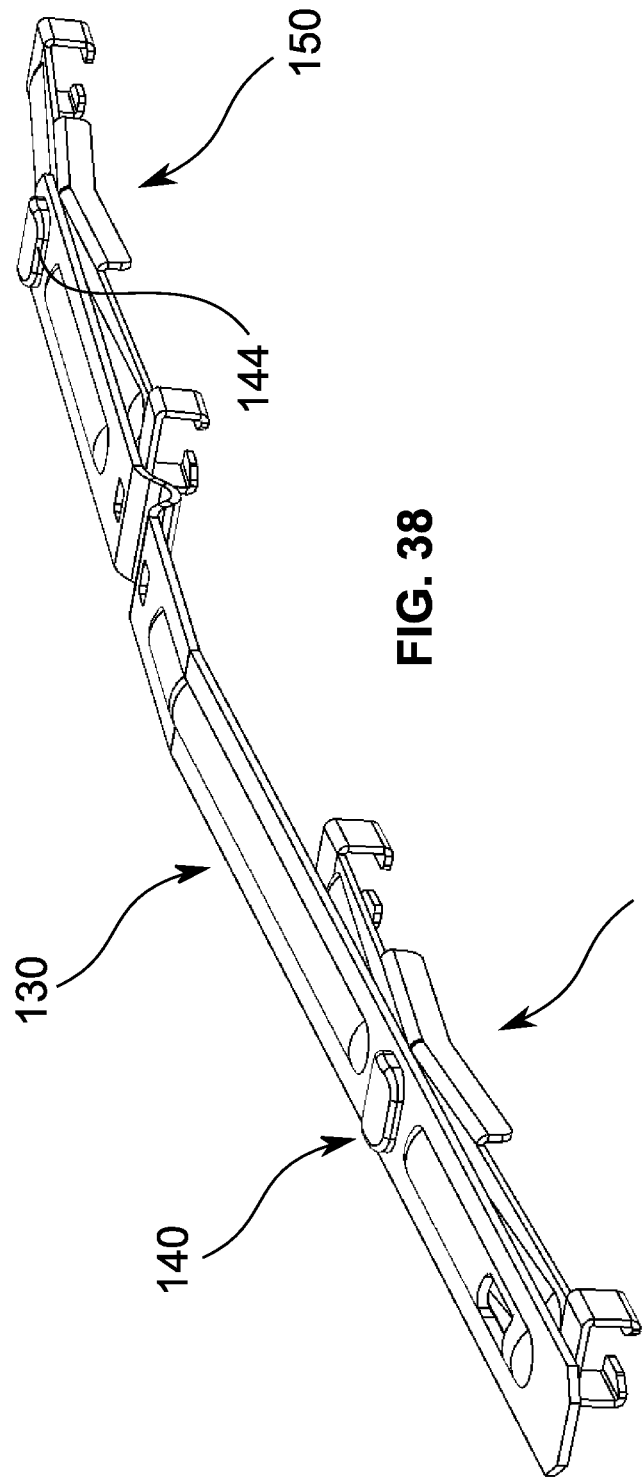
FIG. 38
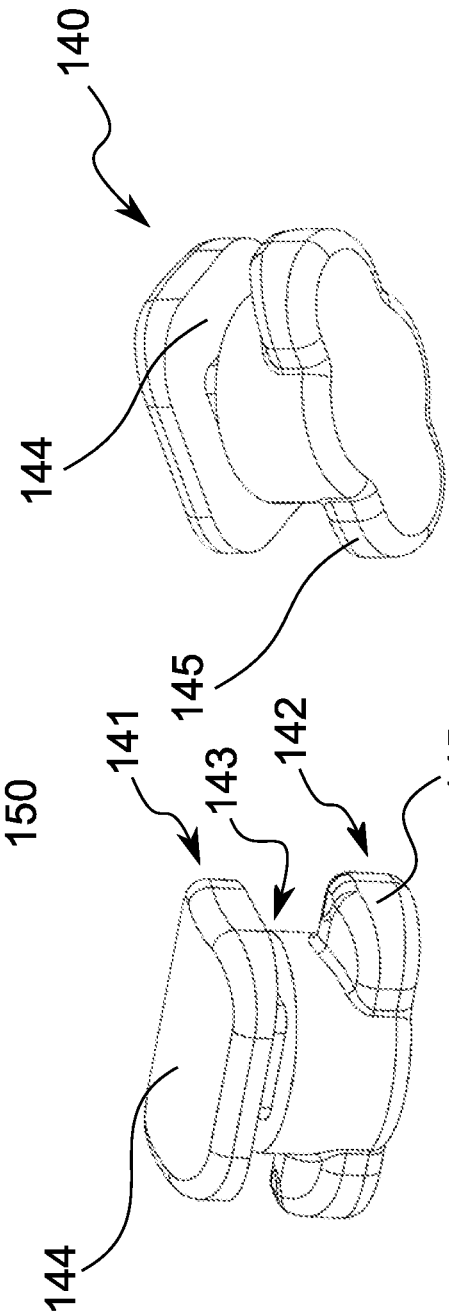
FIG. 39
FIG. 40

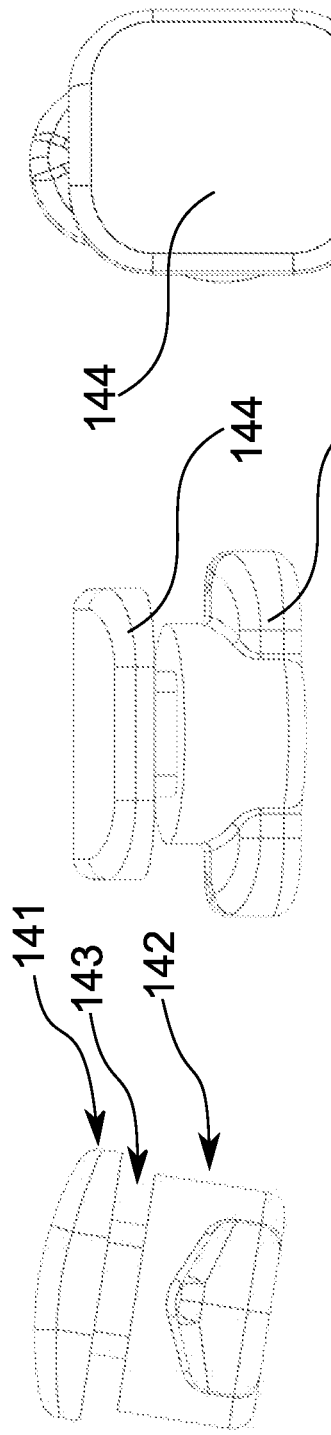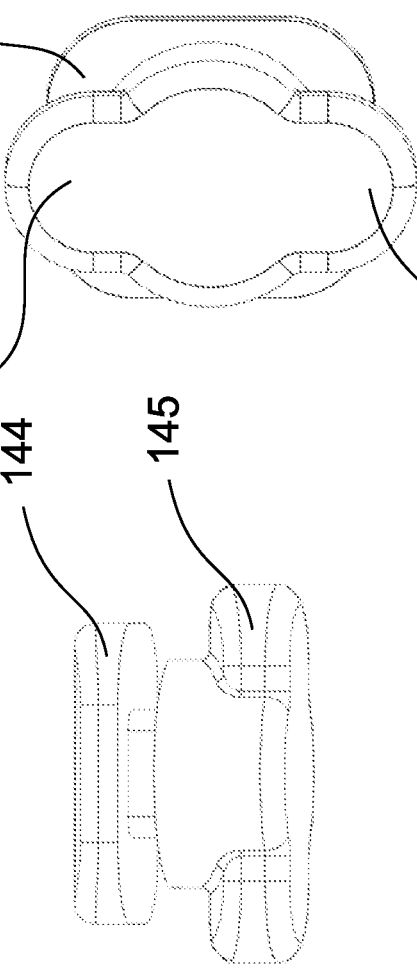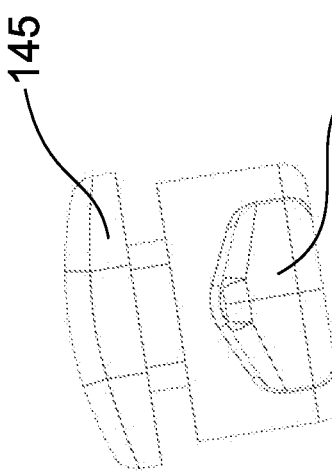

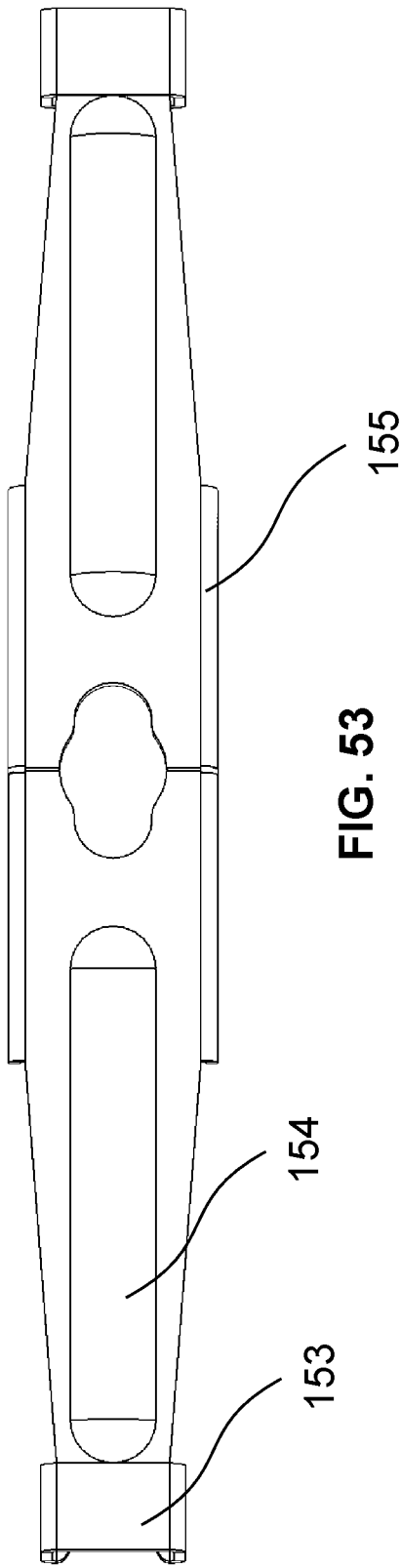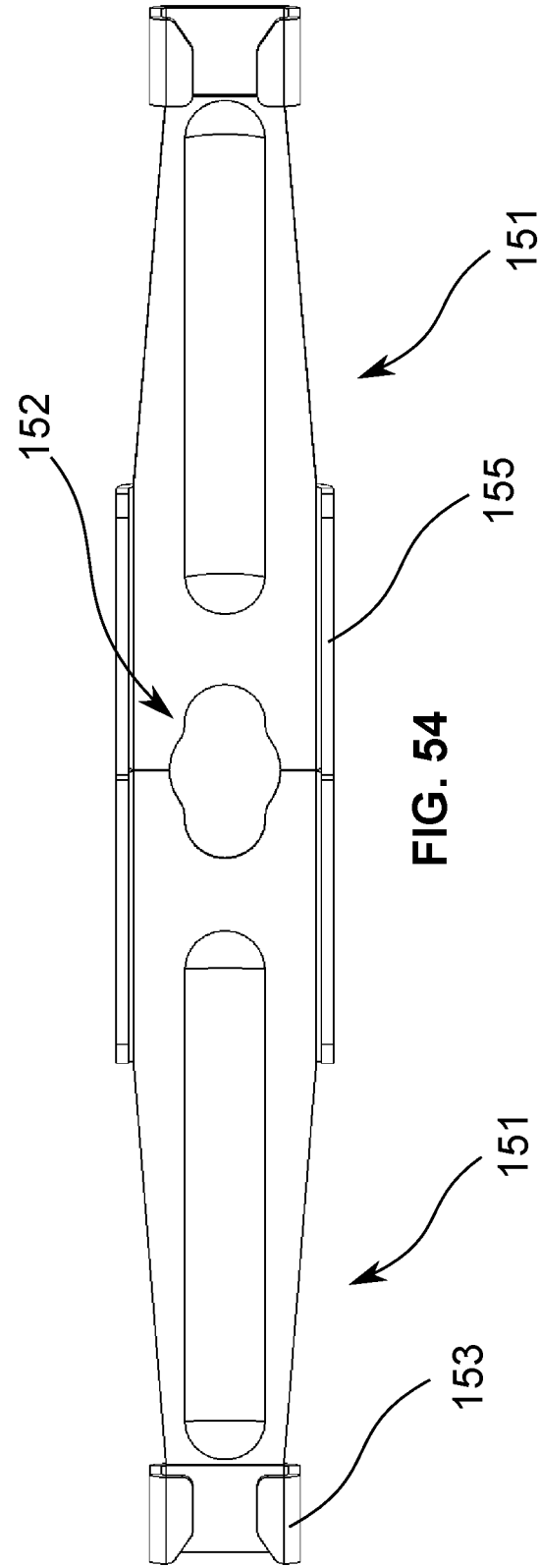

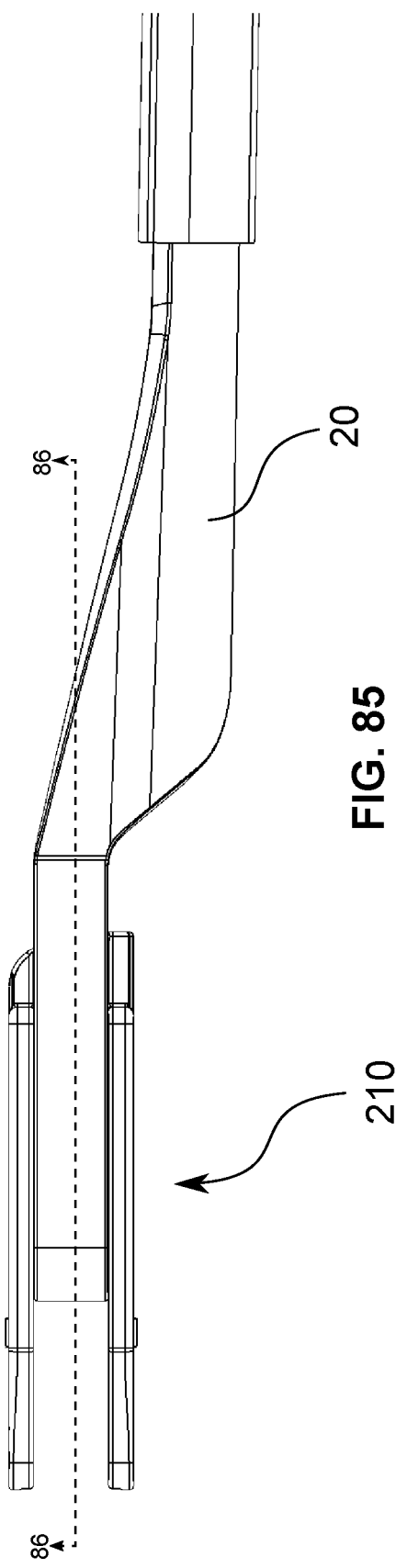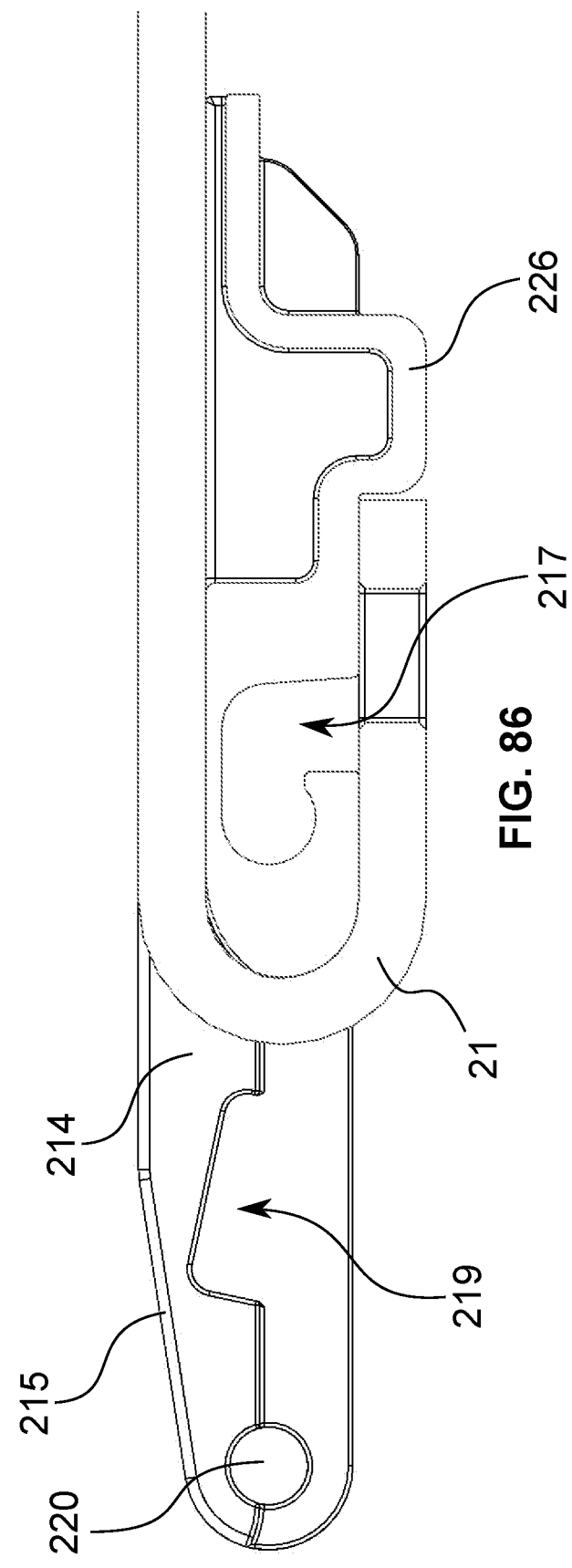

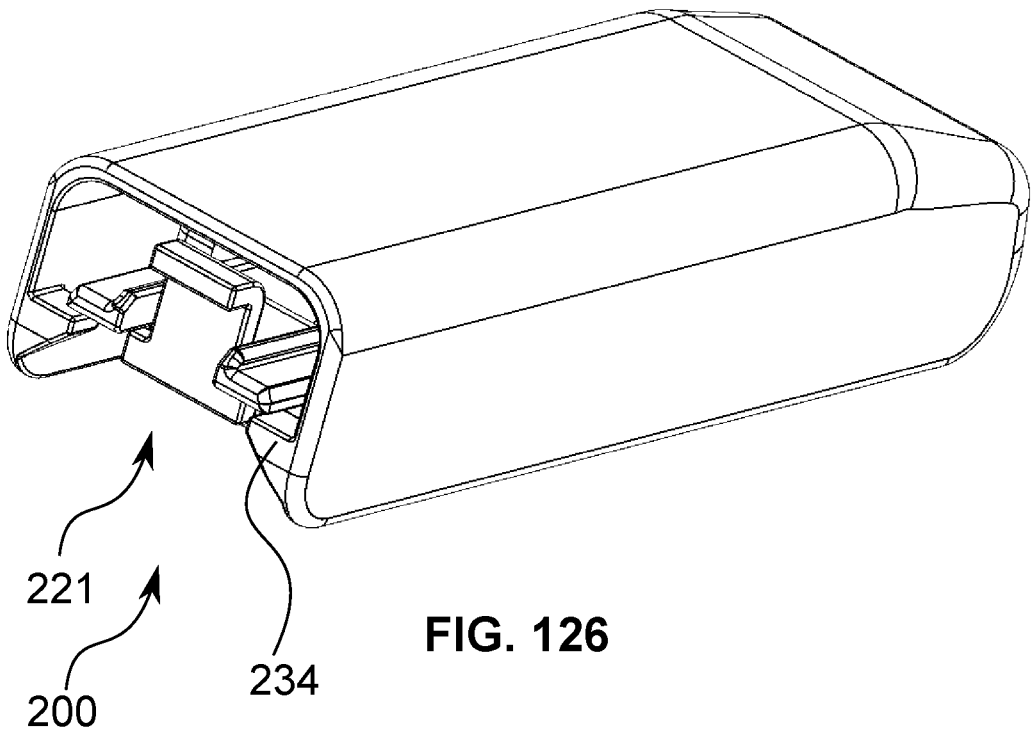
FIG. 126
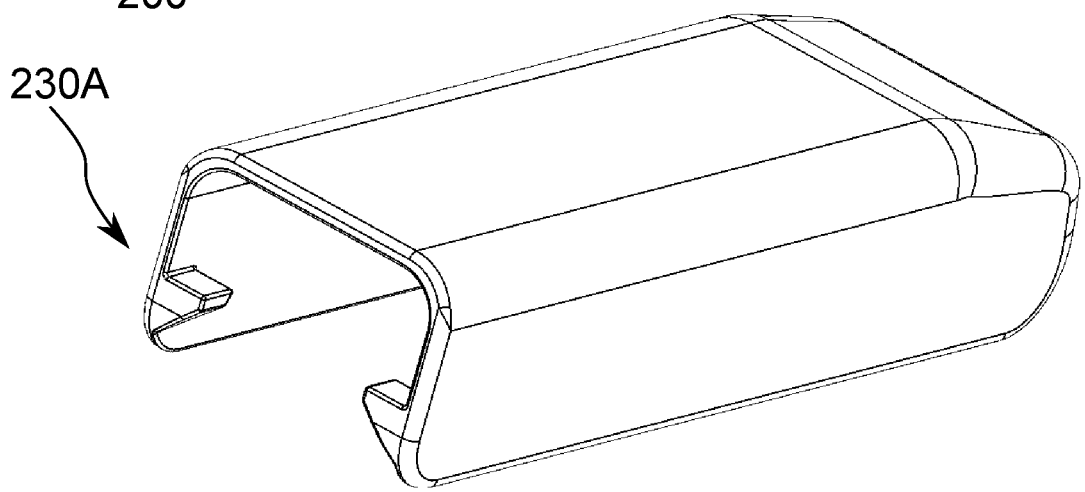
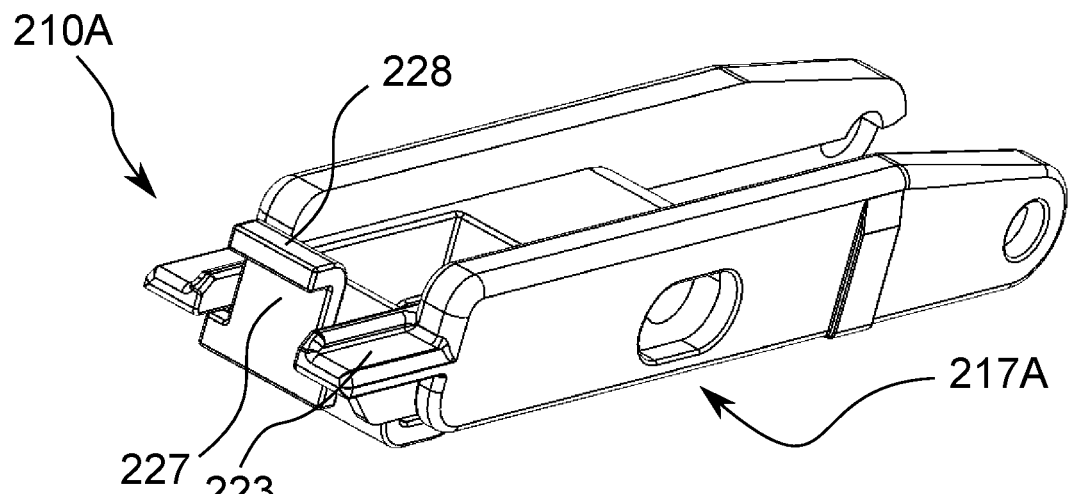
FIG. 127

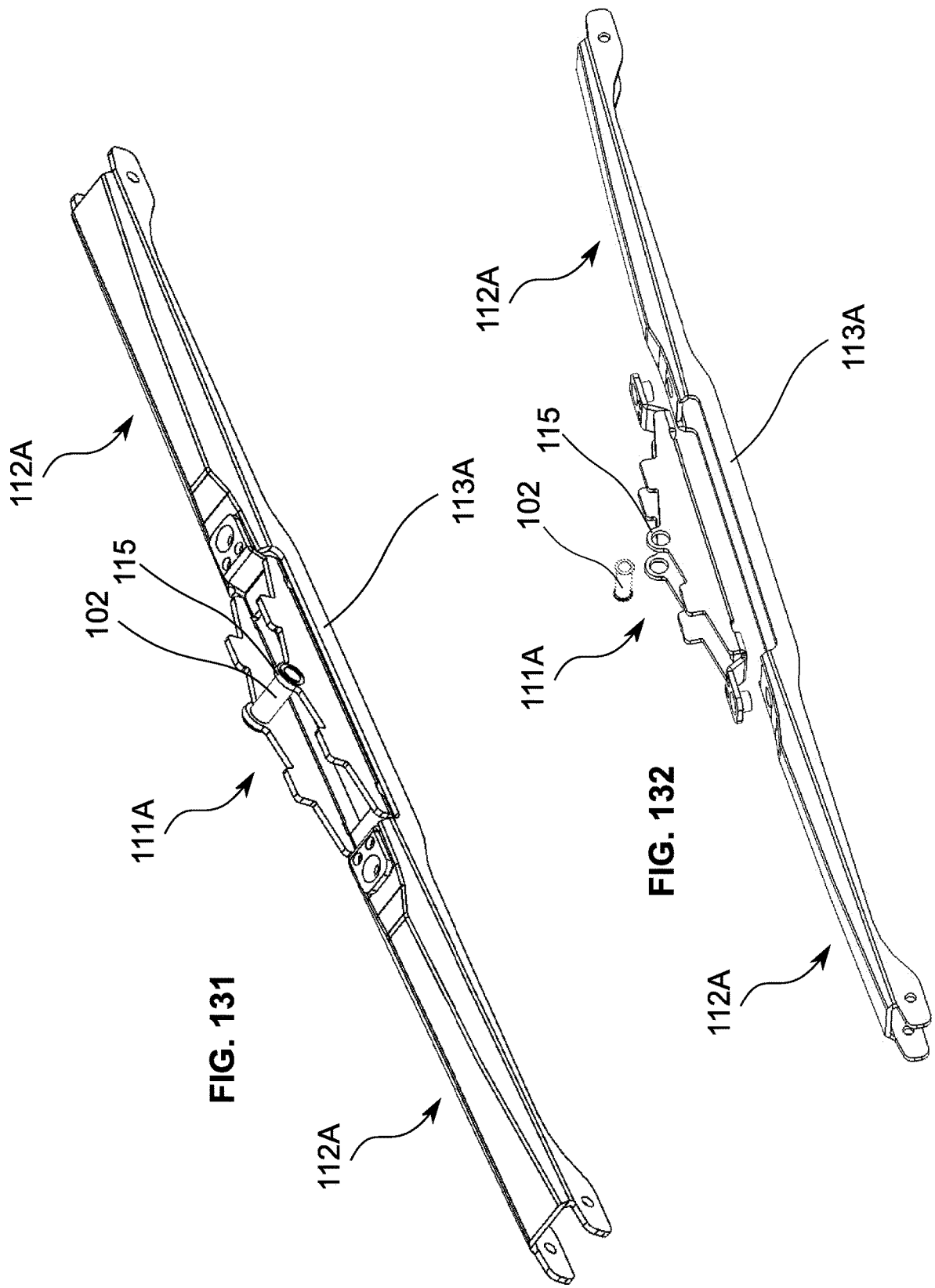

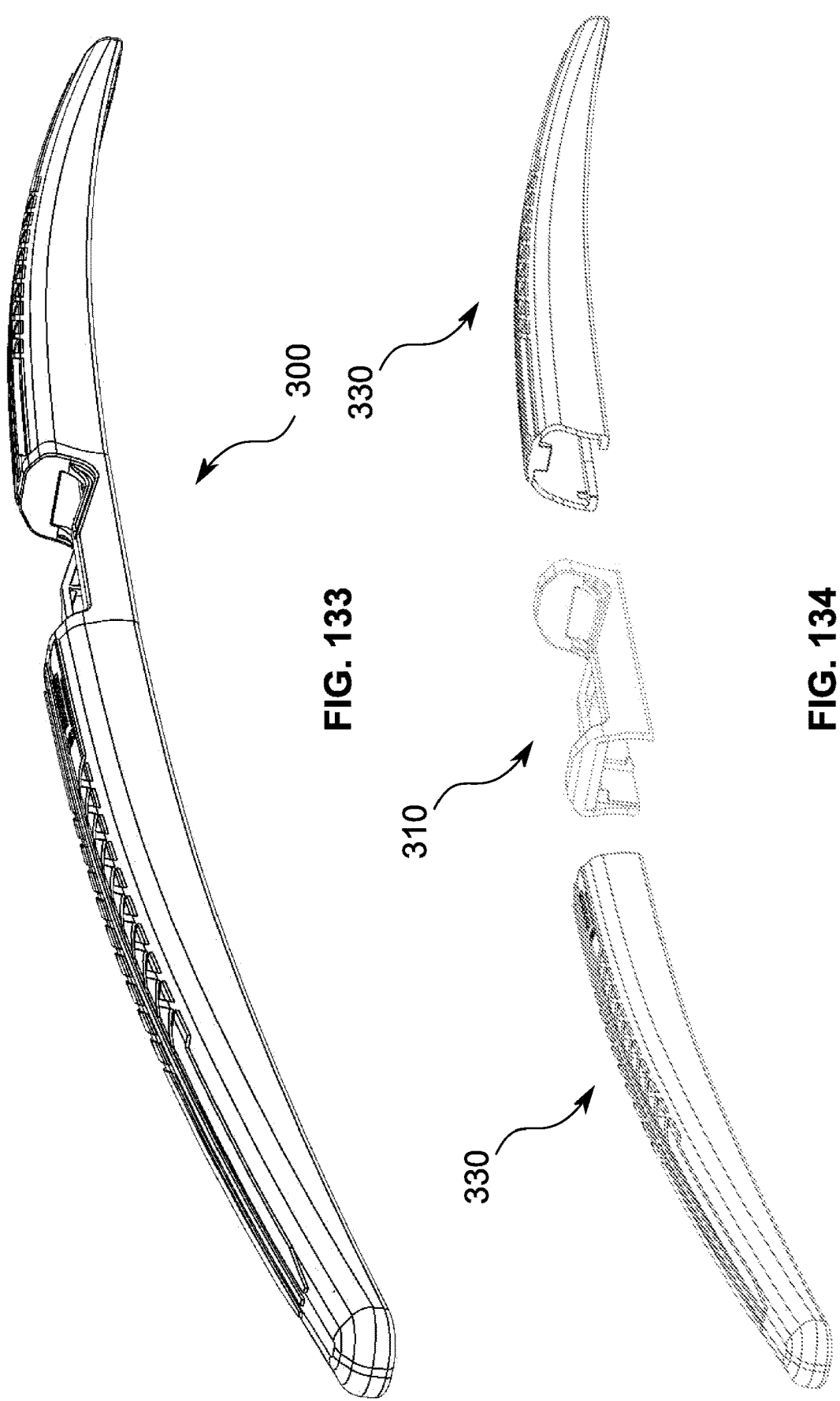

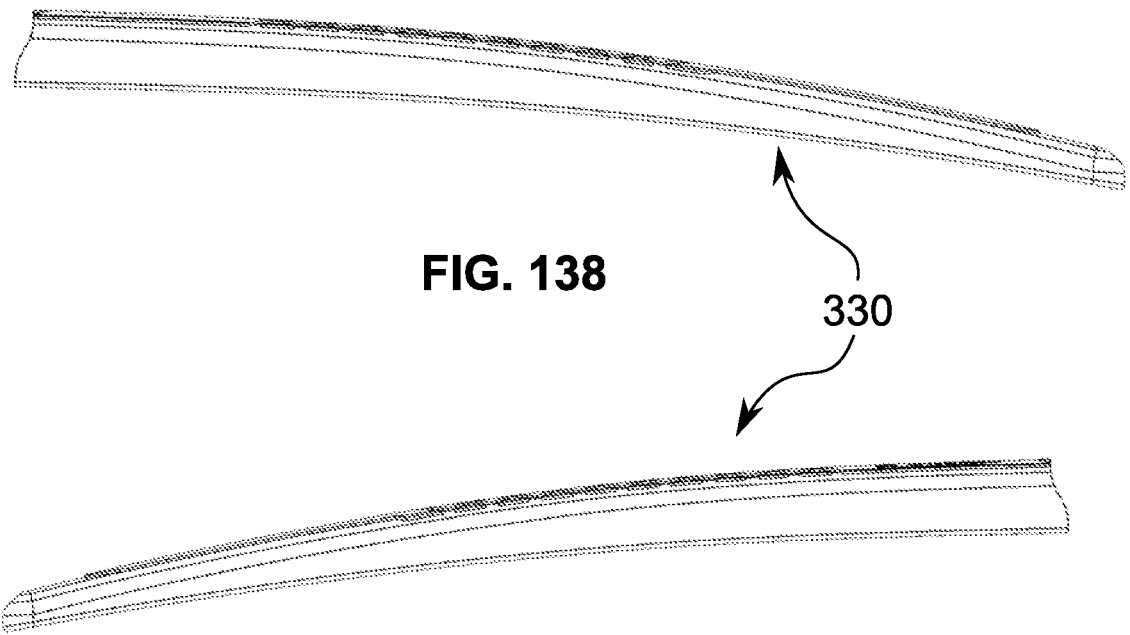
FIG. 138
330
FIG. 139
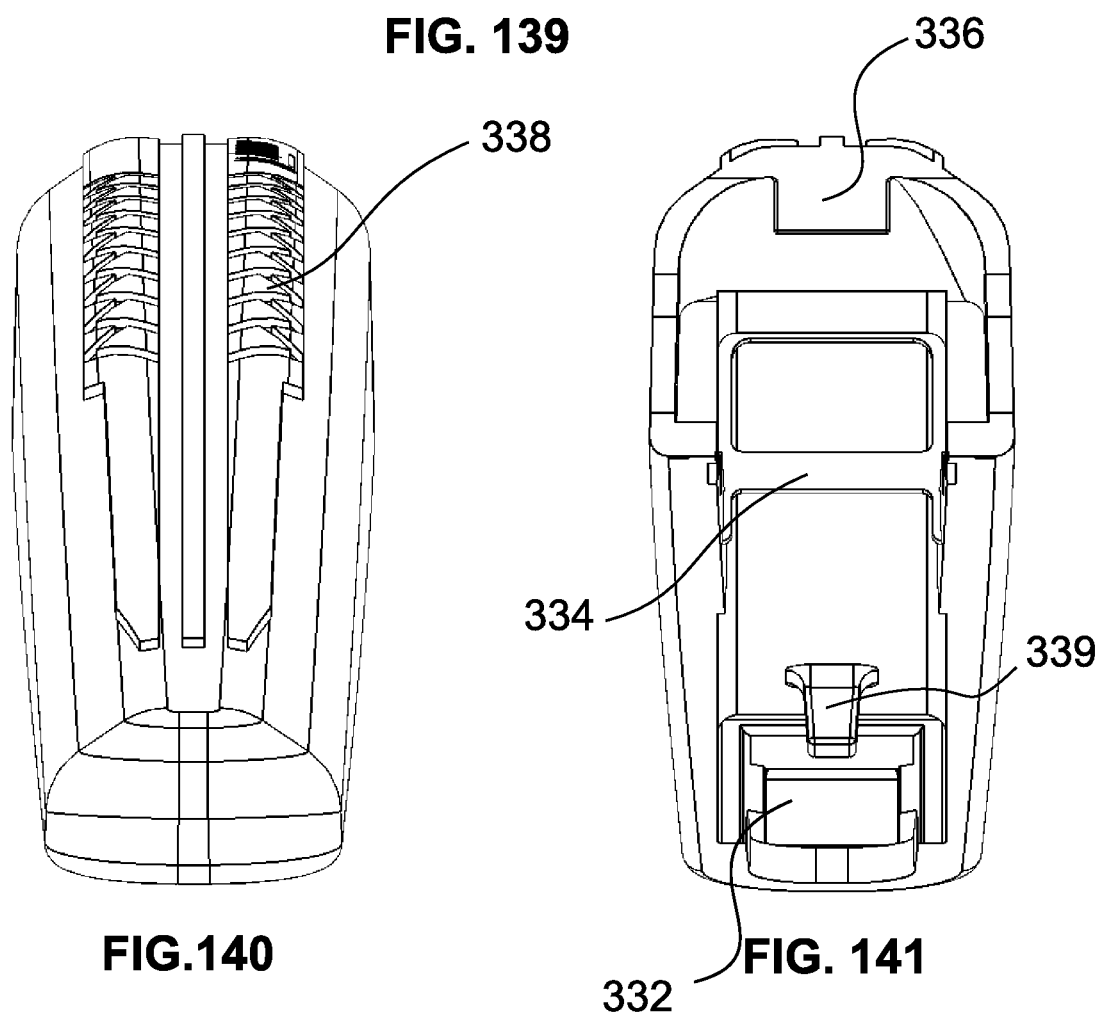
FIG.140
FIG. 141

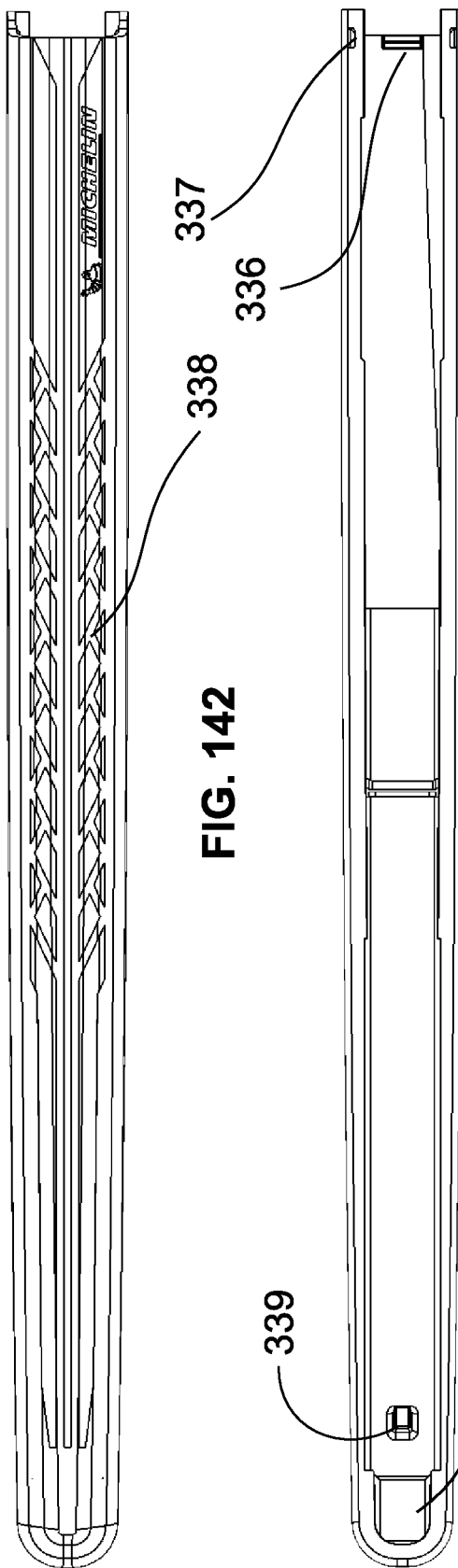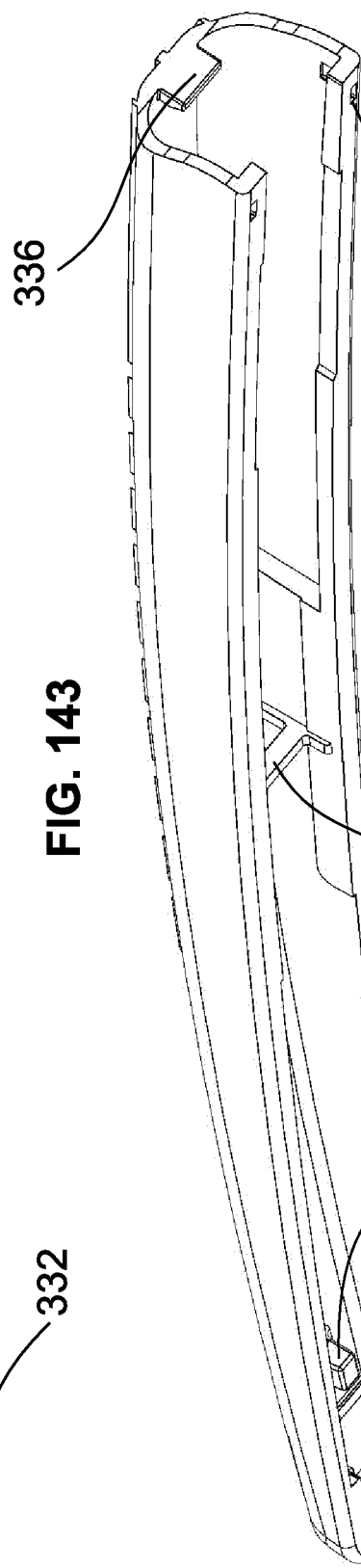

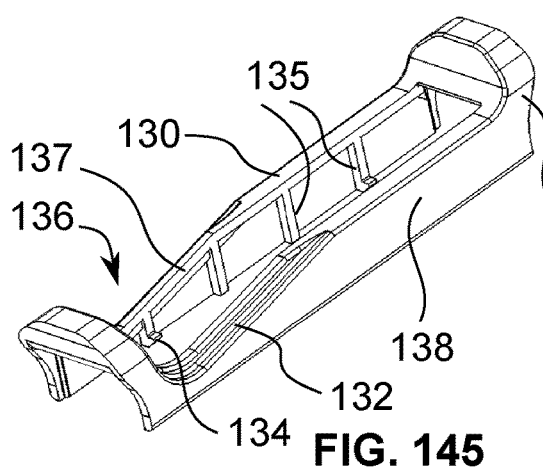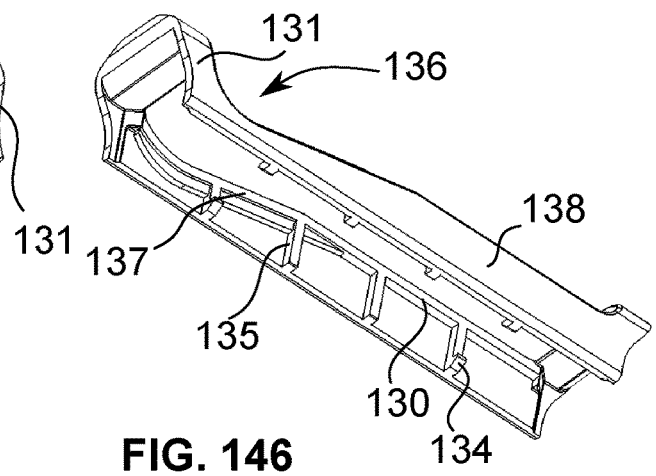
FIG. 145　　　FIG. 146
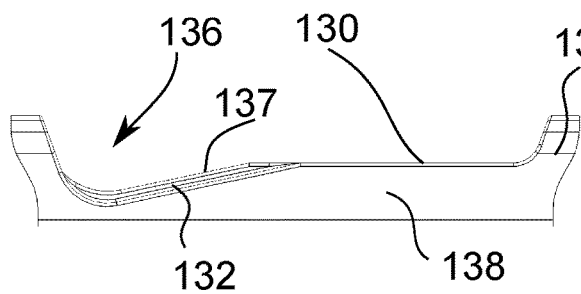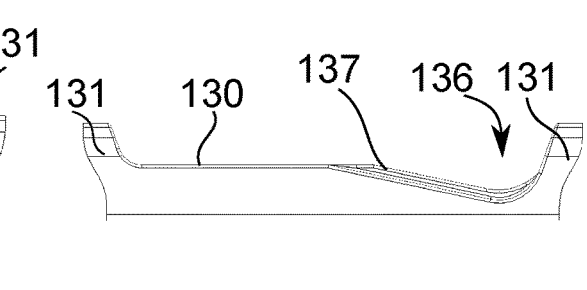
FIG. 147　　　FIG. 148
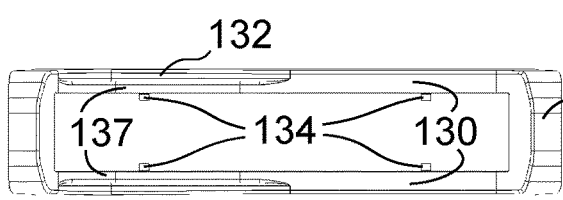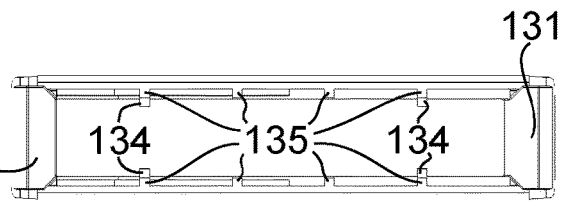
FIG. 149　　　FIG. 150
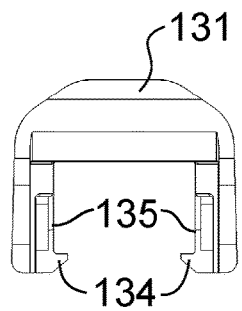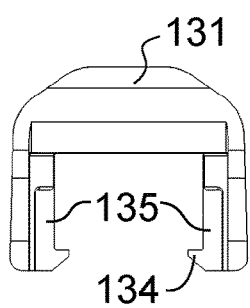
FIG. 151　　　FIG. 152

WINDSHIELD WIPER CONNECTOR AND ASSEMBLY

CROSS REFERENCE TO RELATED APPLICATIONS

This application is a divisional of U.S. application Ser. No. 16/049,540 filed Jul. 30, 2018, which claims priority to U.S. Provisional Application No. 62/538,368 filed Jul. 28, 2017, U.S. Provisional Application No. 62/587,111 filed on Nov. 16, 2017, U.S. Provisional Application No. 62/625,335 filed on Feb. 1, 2018, U.S. Provisional Application No. 62/646,498 filed on Mar. 22, 2018, and U.S. Provisional Application No. 62/651,435 filed on Apr. 2, 2018, and U.S. Provisional Application No. 62/671,539 filed May 15, 2018 the entire contents of each are hereby incorporated by reference.

FIELD OF THE DISCLOSURE

This disclosure relates generally to wiper blades, connectors, and assemblies for connecting the wiper blade with a wiper arm of a vehicle.

BACKGROUND

In an effort to improve upon the traditional, bracketed wiper blade, the beam blade (or flat blade) was developed, keeping a lower profile and generally providing a more uniform distribution than most bracketed wiper blades. U.S. Pat. No. 8,397,341 to Edhe discloses an example beam blade known in the prior art. However, beam blades do not have the lateral stability of bracketed blades, and can have problems with wrapping (i.e. keeping contact between the outer edges of the wiper blade and windshield) when their curvature is too sharp for the windshield. Accordingly, beam blades may be serve well for original equipment (i.e. the wiper blades installed by manufacturers on cars that are designed specifically for that car), but can experience problems on certain vehicles if designed as aftermarket wiper blades (i.e. replacement blades designed to be used on a variety of different windshields where the manufacturer does not know what vehicle the blade will be used on).

Moreover, wiper blade arms are not uniform from vehicle to vehicle, and aftermarket wiper blade manufacturers often need universal wiper blade connectors so as to connect aftermarket wiper blades with a variety of wiper arm types, such as those shown in FIG. 153 herein.

The first generation of hybrid wiper blades developed improved on beam blade performance in these circumstances. These blades combine the use of brackets with a beam-like characteristics without creating problems with banding. One such improvement of this hybrid wiper blade, using a combination of traditional brackets and either beams or flat brackets, was previously disclosed in U.S. Ser. No. 13/776,376, the entire contents of which are hereby incorporated by reference. The instance disclosure provides further improvements to hybrid wiper blades as well as universal connectors and connector assemblies.

BRIEF SUMMARY OF THE DISCLOSURE

The following presents a simplified summary of the disclosure in order to provide a basic understanding of some aspects of the invention. This summary is not an extensive overview of every embodiment disclosed herein. It is intended to neither identify key or critical elements of the various embodiments nor delineate the scope of the disclosure. Its sole purpose is to present some concepts of the disclosure, in accordance with the various embodiments disclosed herein, in a simplified form as a prelude to the more detailed description that is presented later.

In one embodiment of the disclosure, a wiper blade connector assembly may be provided for connecting a wiper blade support structure with a wiper arm. The wiper blade assembly may include a wiper blade connector having a first portion, a second portion longitudinally opposed to the first portion, and a center portion defined between the first and second portions. The wiper blade connector may include a pair of side walls extending along at least some of the first, second, and center portions, each side wall having a top surface and a bottom surface. The wiper blade connector may also include a connector channel defined between the pair of side walls on the second portion of the wiper blade connector, and the connector channel may be dimensioned to accommodate at least a portion of the wiper arm. The wiper blade connector may further include a rivet cutout provided proximate the bottom surface and dimensioned to accommodate a rivet on the wiper blade support structure. The wiper blade connector may additionally include a hook end stop provided proximate the bottom surface and distanced from the rivet cutout, the hook end stop positioned so as to abut the end of a hook-style wiper arm.

In further embodiment of the disclosure, a wiper blade connector assembly may be provided for connecting a wiper blade support structure with a wiper arm. The wiper blade assembly may include an embodiment of a wiper blade connector. The wiper blade connector assembly may further include a wiper blade connector cover having a first portion and a second portion longitudinally opposed to the first portion, the first portion of the wiper blade connector cover pivotable with respect first portion of the wiper blade connector, and the second portion of the wiper blade connector cover securable to the wiper blade connector.

In another embodiment of the disclosure, a wiper blade assembly may be connectable with a wiper arm, and the wiper blade assembly may include an embodiment of a wiper blade support structure and an embodiment of a wiper blade connector assembly for connecting the wiper blade support structure with the wiper arm.

The following description and the annexed drawings set forth certain illustrative aspects of the embodiments of the disclosure. These aspects are indicative, however, of but a few of the various ways in which the principles of the disclosure may be employed and the various embodiments are intended to include all such aspects and their equivalents. Other advantages and novel features will become apparent from the following description when considered in conjunction with the drawings.

BRIEF DESCRIPTION OF THE FIGURES

FIG. 1 illustrates a top perspective view of an embodiment of a wiper blade assembly.

FIG. 2 illustrates a top perspective view of the wiper blade assembly of FIG. 1 without the wiper blade connector cover.

FIG. 9 illustrates a front view of the primary frame of FIG. 7.

FIG. 10 illustrates a back view of the primary frame of FIG. 7.

FIG. 11 illustrates a side view of the primary frame of FIG. 7.

FIG. 12 illustrates an opposing side view of the primary frame of FIG. 7.

FIG. 16 illustrates a bottom perspective view of the primary frame coupled with the secondary frame of FIG. 15.

FIG. 17 illustrates a top perspective view of the secondary frame connector.

FIG. 18 illustrates a top perspective view of a secondary frame connector half.

FIG. 19 illustrates a front view of the secondary frame connector of FIG. 17.

FIG. 20 illustrates a back view of the secondary frame connector of FIG. 17.

FIG. 21 illustrates a side view of the secondary frame connector of FIG. 17.

FIG. 22 illustrates an opposing side view of the secondary frame connector of FIG. 17.

FIG. 23 illustrates a top view of the secondary frame connector of FIG. 17.

FIG. 24 illustrates a bottom view of the secondary frame connector of FIG. 17.

FIG. 27 illustrates a front view of the secondary frame of FIG. 25.

FIG. 28 illustrates a back view of the secondary frame of FIG. 25.

FIG. 29 illustrates a side view of the secondary frame of FIG. 25.

FIG. 30 illustrates an opposing side view of the secondary frame of FIG. 25.

FIG. 31 illustrates a top view of the secondary frame of FIG. 25.

FIG. 32 illustrates a bottom view of the secondary frame of FIG. 25.

FIG. 33 illustrates a front view of a longitudinal cross section of the secondary frame of FIG. 25 and the secondary frame connector of FIG. 17.

FIG. 34 illustrates top perspective view of a two-piece secondary frame connector.

FIG. 35 illustrates a front view of a longitudinal cross-section of a first piece of the two-piece secondary frame connector of FIG. 34.

FIG. 36 illustrates a front view of a longitudinal cross-section of a second piece of the two piece secondary frame connector of FIG. 34.

FIG. 37 illustrates a front view of a longitudinal cross-section of the secondary frame of FIG. 24 and the secondary frame connector of FIG. 34.

FIG. 38 illustrates a top perspective view of an embodiment of a secondary frame connected with a pair of tertiary frames.

FIG. 39 illustrates a top perspective view of an embodiment of a tertiary frame connector.

FIG. 40 illustrates a bottom perspective view of the tertiary frame connector of FIG. 39.

FIG. 41 illustrates a front view of the tertiary frame connector of FIG. 39.

FIG. 42 illustrates a back view of the tertiary frame connector of FIG. 39.

FIG. 43 illustrates a side view of the tertiary frame connector of FIG. 39.

FIG. 44 illustrates an opposing side view of the tertiary frame connector of FIG. 39.

FIG. 45 illustrates a top view of the tertiary frame connector of FIG. 39.

FIG. 46 illustrates a bottom view of the tertiary frame connector of FIG. 39.

FIG. 53 illustrates a top view of the tertiary frame of FIG. 47.

FIG. 54 illustrates a bottom view of the tertiary frame of FIG. 47.

FIG. 85 illustrates a top view of the wiper arm connected with the wiper blade connector of FIG. 84.

FIG. 86 illustrates a front view of a longitudinal cross-section of the wiper arm connected with the wiper blade connector of FIG. 84.

FIG. 120 illustrates a top view of the connector cover of FIG. 116.

FIG. 121 illustrates a bottom perspective of the connector cover of FIG. 116.

FIG. 122 illustrates a side view of the connector cover of FIG. 116.

FIG. 123 illustrates an opposing side view of the connector cover of FIG. 116.

FIG. 124 illustrates a top perspective of a wiper arm connected with the wiper connector assembly of FIG. 104.

FIG. 125 illustrates a bottom perspective of the wiper arm connected with the wiper connector assembly of FIG. 124.

FIG. 126 illustrates a top perspective view of an embodiment of a wiper blade connector assembly.

FIG. 127 illustrates an exploded top perspective view of the wiper blade connector assembly of FIG. 126.

FIG. 128 illustrates an exploded bottom perspective view of the wiper blade connector assembly of FIG. 126.

FIG. 129 illustrates a top perspective view of a longitudinal cross-section of the wiper blade connector of the wiper blade connector assembly of FIG. 126.

FIG. 130 illustrates a top perspective view of a longitudinal cross-section of the wiper blade connector assembly of FIG. 126.

FIG. 131 illustrates a top perspective view of an embodiment of a primary frame assembly including a primary frame, a mounting base and a rivet.

FIG. 132 illustrates an exploded top perspective view of the primary frame assembly of FIG. 131.

FIG. 133 illustrates a top perspective view of an embodiment of a wiper blade cover.

FIG. 134 illustrates an exploded top perspective view of the wiper blade cover of FIG. 133 showing a perspective view of a first side section, a center section, and a second side section of the wiper blade cover.

Figure 135:
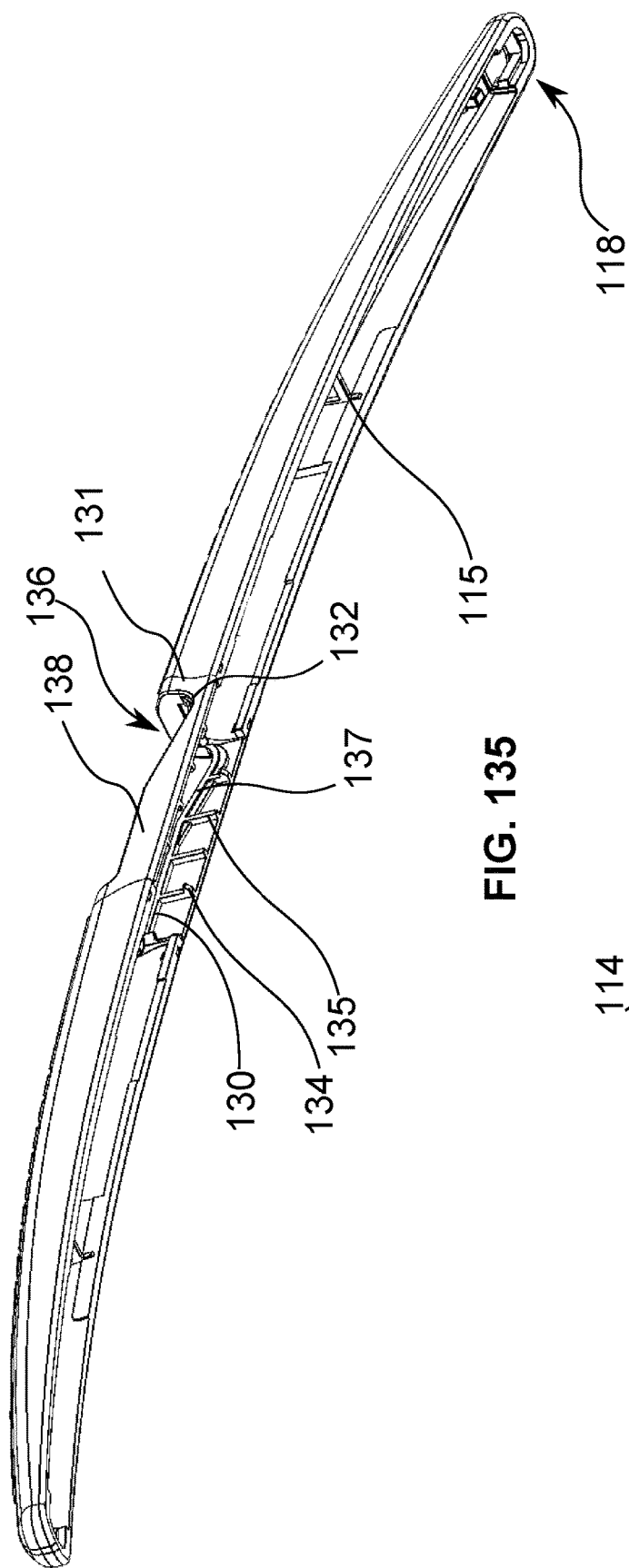

FIG. 135 illustrates a bottom perspective view of the wiper blade cover of FIG. 133.

Figure 136:
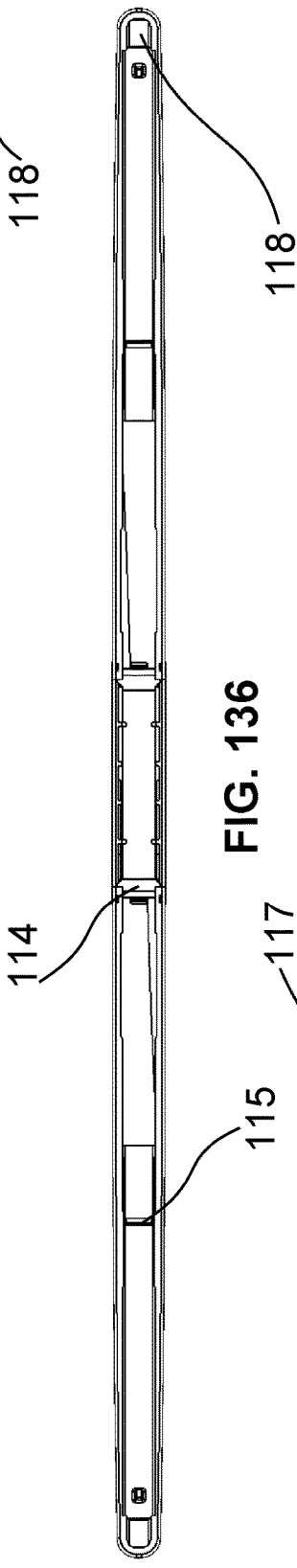

FIG. 136 illustrates a top view of the wiper blade cover of FIG. 133.

Figure 137:

FIG. 137 illustrates a bottom view of the wiper blade cover of FIG. 133.

FIG. 138 illustrates a front side view of a cover side section of the wiper blade cover of FIG. 134.

FIG. 139 illustrates a back side view of the cover side section of FIG. 138.

FIG. 140 illustrates a side view of cover section of FIG. 138.

FIG. 141 illustrates an opposing side view of the cover side section of FIG. 138.

FIG. 142 illustrates a top view of the cover side section of FIG. 138.

FIG. 143 illustrates a bottom view of the cover side section of FIG. 138.

FIG. 144 illustrates a bottom perspective view of the cover side section of FIG. 138.

FIG. 145 illustrates a top perspective view of the cover center section of FIG. 134.

FIG. 146 illustrates a bottom perspective view of the cover center section of FIG. 145.

FIG. 147 illustrates a front view of the cover center section of FIG. 145.

FIG. 148 illustrates a rear view of the cover center section of FIG. 145.

FIG. 149 illustrates a top view of the cover center section of FIG. 145.

FIG. 150 illustrates a bottom perspective of the cover center section of FIG. 145.

FIG. 151 illustrates a side view of the cover center section of FIG. 145.

FIG. 152 illustrates an opposing side view of the cover center section of FIG. 145.

Figure 153:
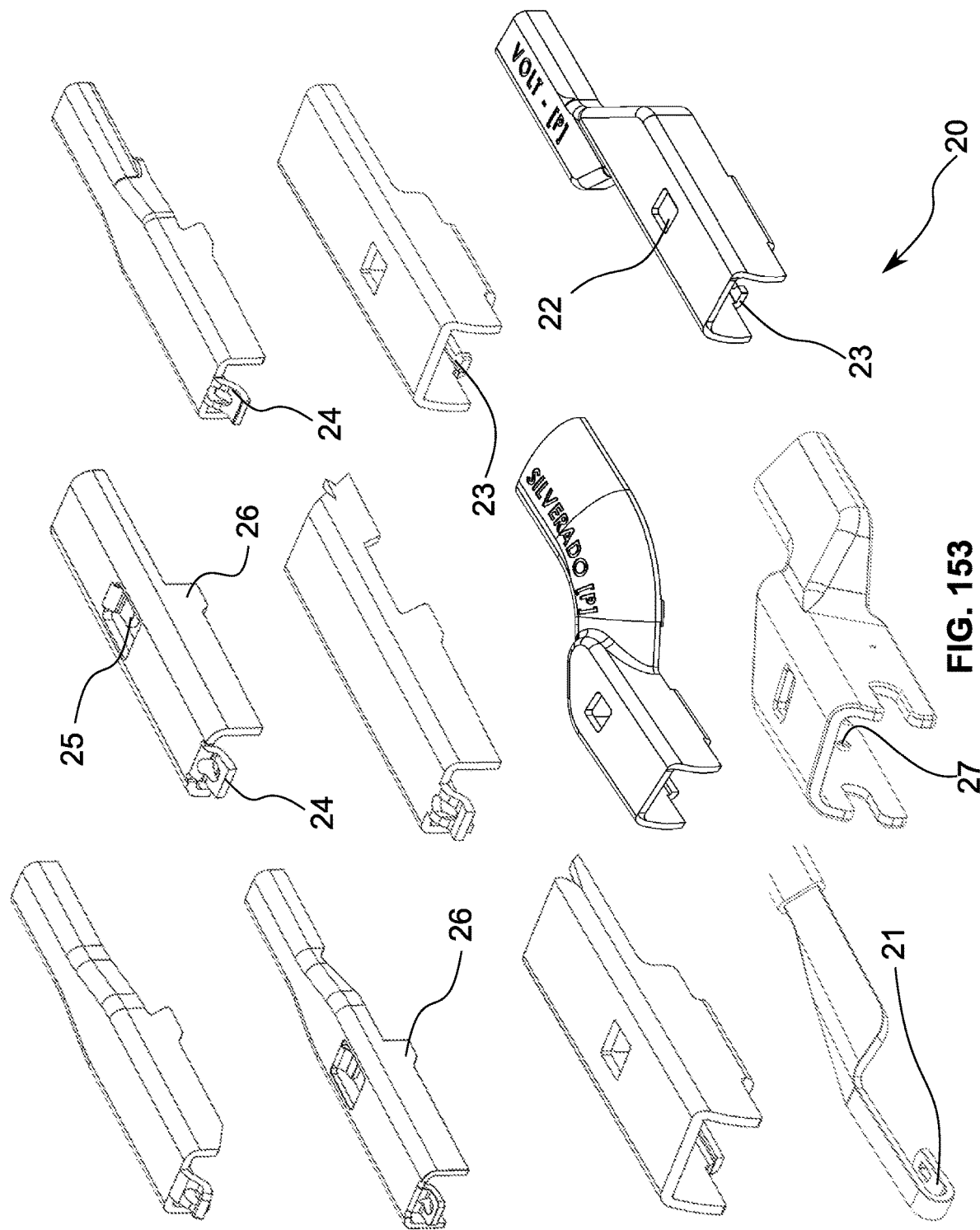

FIG. 153 illustrates embodiments of various types of wiper arms engageable with embodiments of a wiper blade connector assembly.

Figure 154:
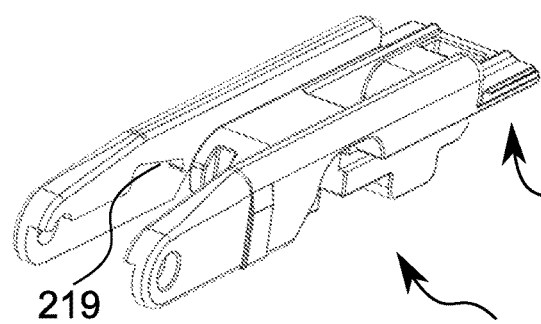

FIG. 154 illustrates a top perspective view of an embodiment of a wiper blade connector.

Figure 155:
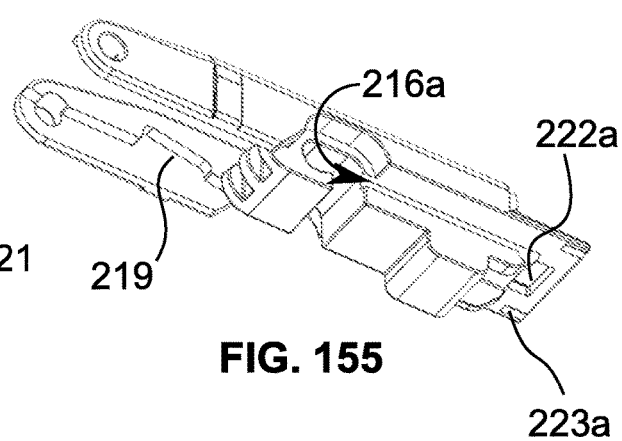

FIG. 155 illustrates a bottom perspective view of the wiper blade connector of FIG. 154.

Figure 156:
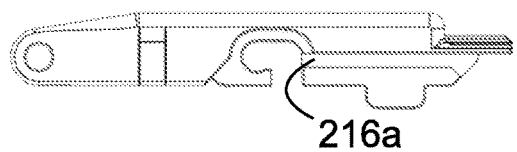

FIG. 156 illustrates a front view of the wiper blade connector of FIG. 154.

Figure 157:
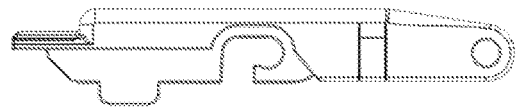

FIG. 157 illustrates a rear side view of the wiper blade connector of FIG. 154.

Figure 158:
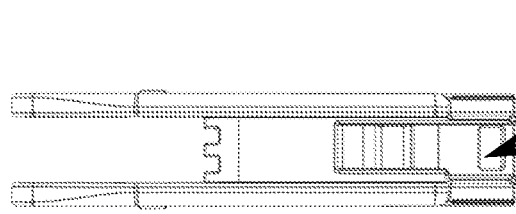

FIG. 158 illustrates a top view of the wiper blade connector of FIG. 154.

Figure 159:
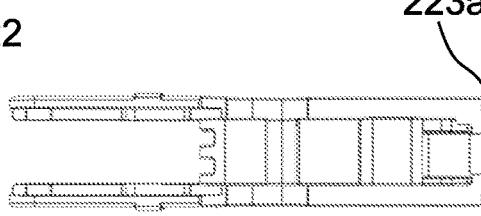

FIG. 159 illustrates a bottom view of the wiper blade connector of FIG. 154.

Figure 160:
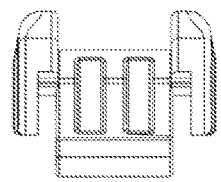

FIG. 160 illustrates a side view of the wiper blade connector of FIG. 154.

Figure 161:
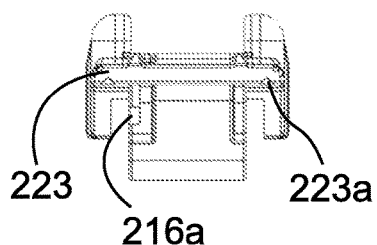

FIG. 161 illustrates an opposing side view of the wiper blade connector of FIG. 154.

Figure 162:
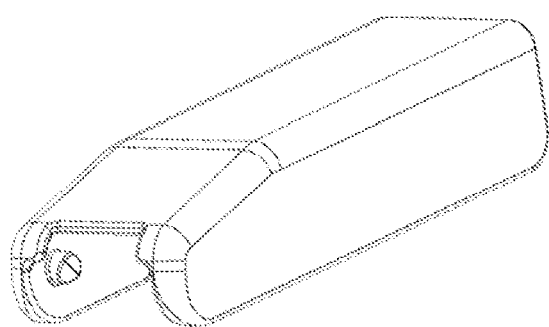

FIG. 162 illustrates a top perspective view of an embodiment of a wiper blade connector cover.

Figure 163:
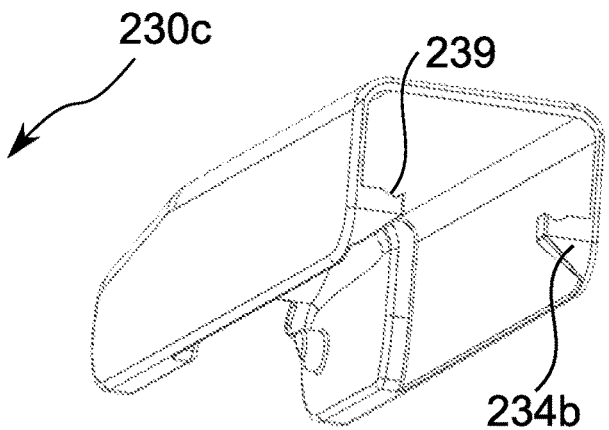

FIG. 163 illustrates a bottom perspective view of the wiper blade connector cover of FIG. 162.

Figure 164:

FIG. 164 illustrates a front view of the wiper blade connector cover of FIG. 162.

Figure 165:
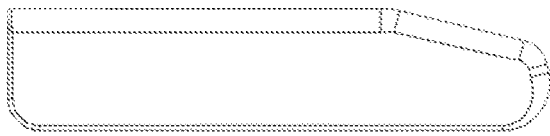

FIG. 165 illustrates a rear view of the wiper blade connector cover of FIG. 162.

Figure 166:
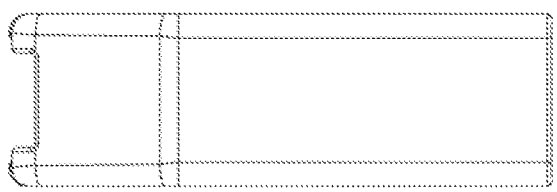

FIG. 166 illustrates a top view of the wiper blade connector cover of FIG. 162.

Figure 167:
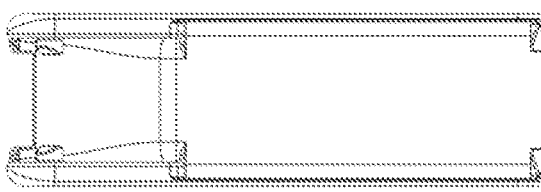

FIG. 167 illustrates a bottom view of the wiper blade connector cover of FIG. 162.

Figure 168:
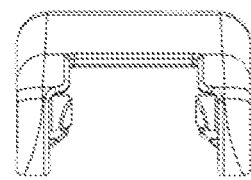

FIG. 168 illustrates a side view of the wiper blade connector cover of FIG. 162.

Figure 169:
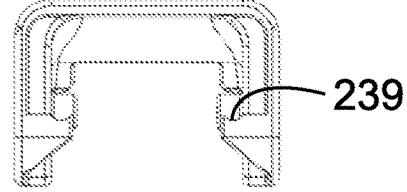

FIG. 169 illustrates an opposing side view of the wiper blade connector cover of FIG. 162.

Figure 170:
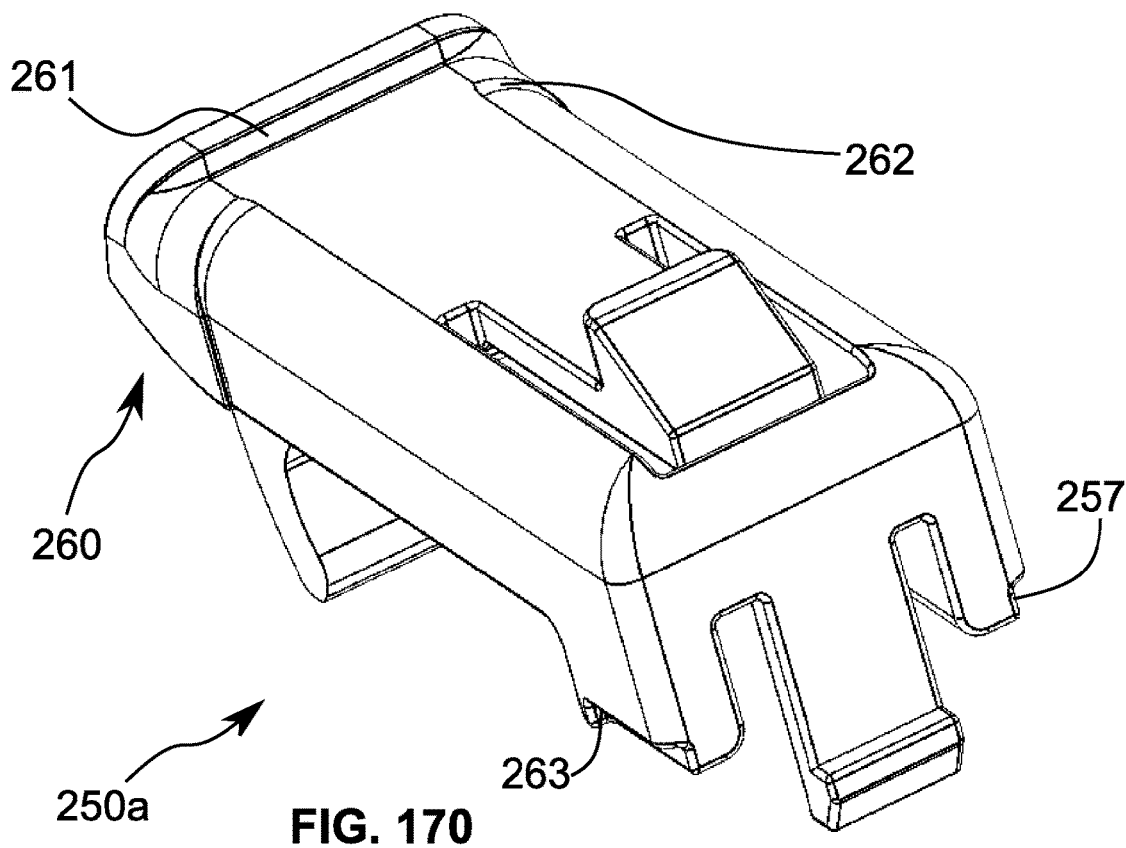

FIG. 170 illustrates a top perspective view of an embodiment of a wiper blade adapter.

Figure 171:
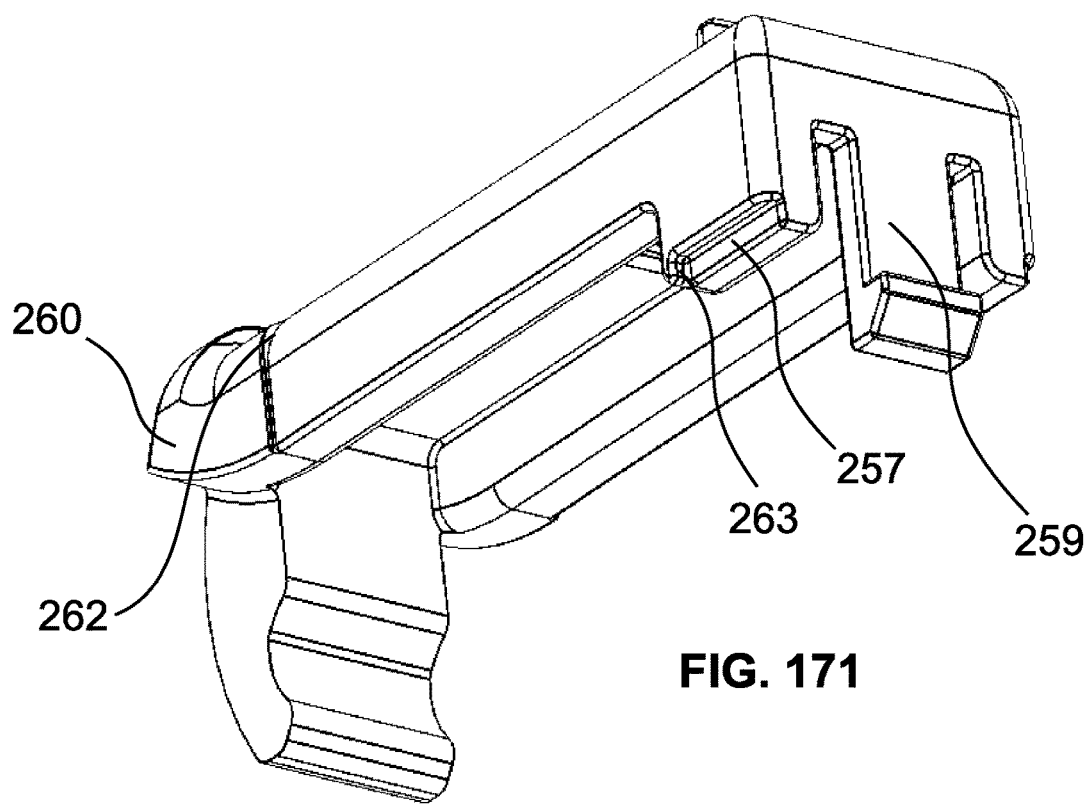

FIG. 171 illustrates a bottom perspective view of the wiper blade adapter of FIG. 170.

Figure 172:
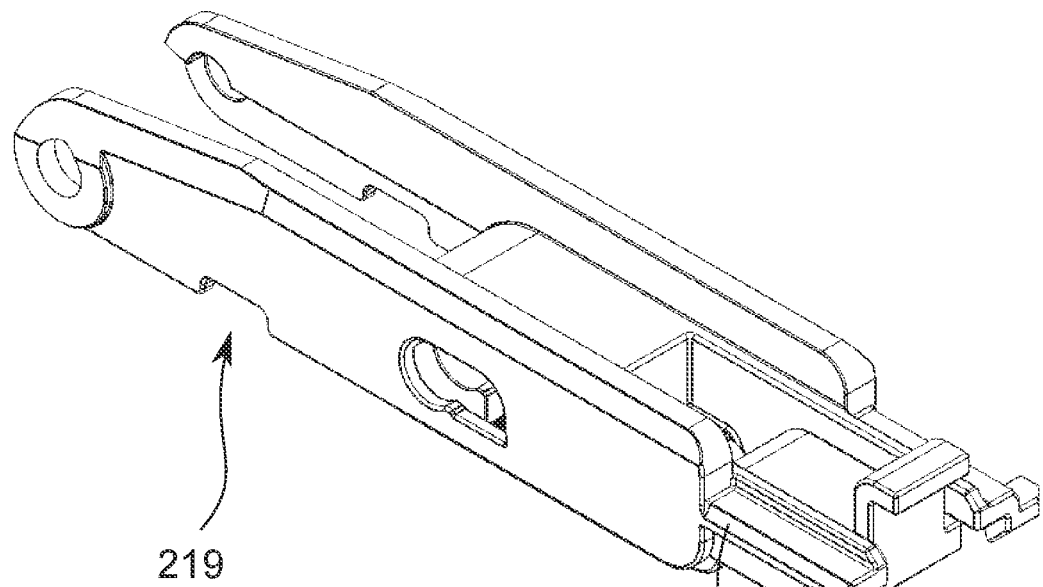

FIG. 172 illustrates a top perspective view of an embodiment of a wiper blade connector.

Figure 173:
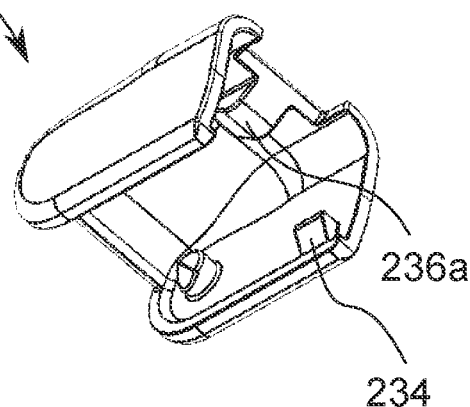

FIG. 173 illustrates a bottom perspective view of an embodiment of a wiper blade connector cover.

Figure 174:
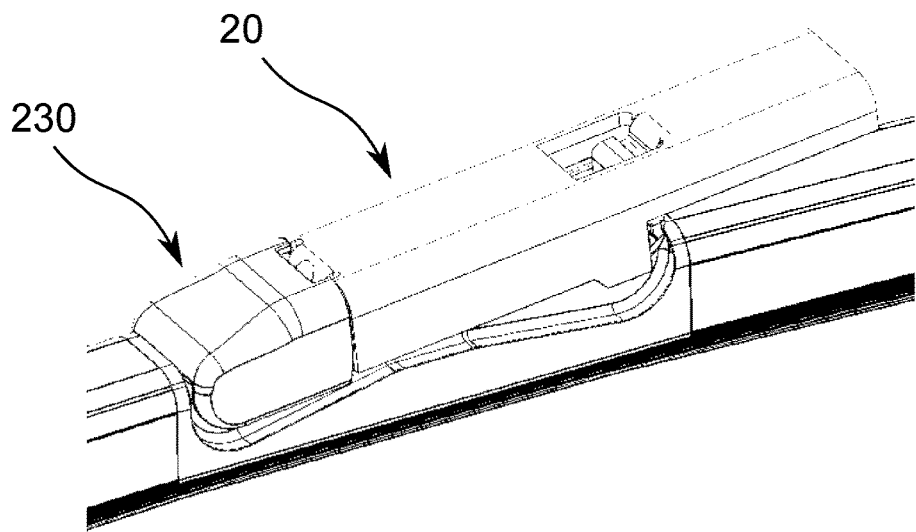

FIG. 174 illustrates a side view of a wiper arm connected with a wiper blade support structure by a wiper blade connector assembly in a closed position, the wiper blade connector assembly including an embodiment of a wiper blade connector and the wiper blade connector cover of FIG. 173.

Figure 175:
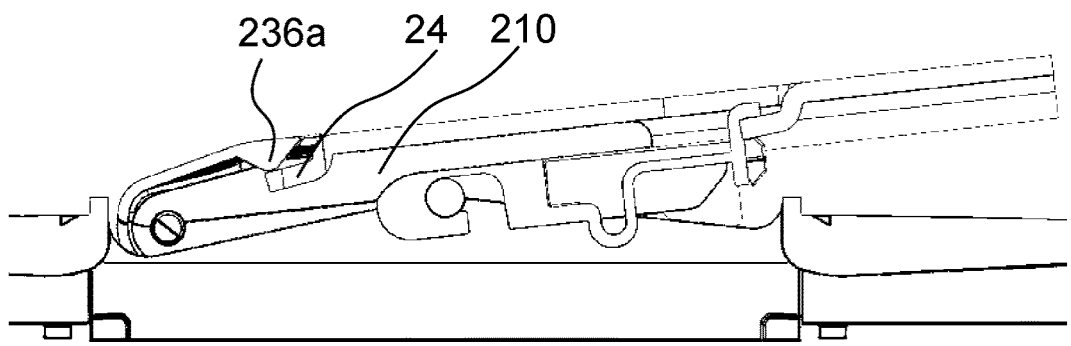

FIG. 175 illustrates a side section view of the wiper arm, wiper blade support structure, and wiper blade connector assembly in a closed position of FIG. 174.

Figure 176:
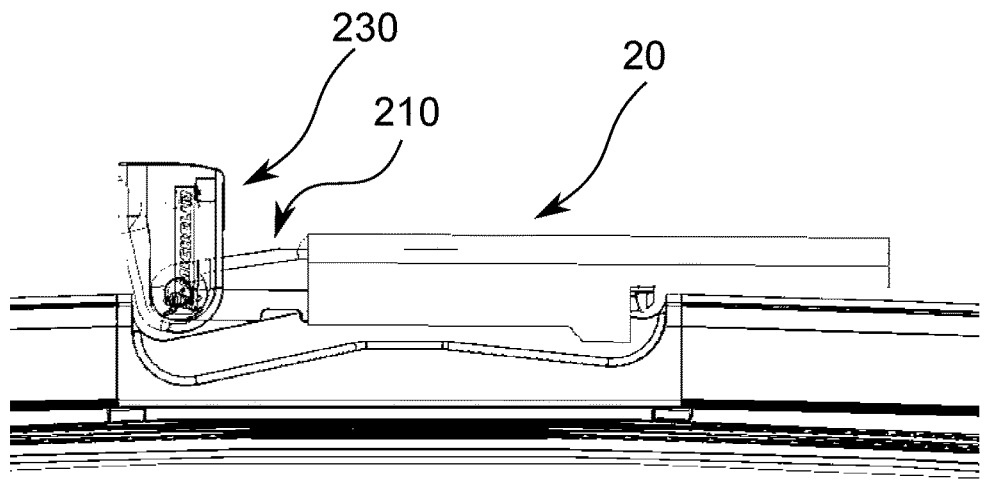

FIG. 176 illustrates a side view of the wiper arm, wiper blade support structure, and wiper blade connector assembly in an open position of FIG. 174.

DETAILED DESCRIPTION

The following detailed description and the appended drawings describe and illustrate some embodiments of the disclosure for the purpose of enabling one of ordinary skill in the relevant art to make and use these embodiments. As such, the detailed description and illustration of these embodiments are purely illustrative in nature and are in no way intended to limit the scope of the disclosure in any manner. It should also be understood that the drawings are not necessarily to scale and in certain instances details may have been omitted, which are not necessary for an understanding of the embodiments, such as details of fabrication and assembly. In the accompanying drawings, like numerals represent like components.

An embodiment of a wiper blade connector assembly may be provided for connecting a wiper arm of a vehicle with a wiper blade, and the wiper blade connector assembly may include a wiper blade connector and a wiper blade connector cover. The wiper blade connector may have a first side portion, a second side portion, and a center portion defined between the first and second side portions. The wiper blade connector may include a pair of side walls, each side wall provided along the edge of the first side portion and the center portion, and each side wall having a top surface and a bottom surface. The wiper blade connector may also include a pair of connector cover holes, each connector cover hole provided on an opposing side wall at the first side portion. The wiper blade connector cover may have a first portion and a second portion, the wiper blade cover including a pair of connector hole rods, each connector hole rod projecting from an opposing inner surface in the first portion. A connector cover axis may be fine defined through the pair of connector cover holes. Each connector hole rod may be connectable with the one of the connect cover holes, and the wiper blade connector cover is pivotable about the connector cover axis between an open position and a closed position.

In further embodiments, the wiper blade connector further includes a shelf provided on the second side portion, the shelf including a pair of wings and a center section defined between the wings. A connector channel may be defined over the center section of the shelf and between the pair of side walls, and the connector may be capable of receiving a wiper arm along the connector channel. The connector cover may include a pair of connector cover tabs each provided on the second portion of the connector cover, and at least one connector cover tab may engage with the underside of a wing as the connector cover is in the closed position. One of the pair of wings may extend longitudinally further than the other wing. The connector cover may include at least one additional connector tab provided on the first portion of the connector cover. The bottom surface of the sidewalls may be positioned at a lower position at the first side portion than at a higher position at the second side portion, and the higher position of bottom surface of the sidewalls is co-planar with the underside of the wings. A rivet cutout may be provided in the center portion between the higher and lower positions of the bottom surface of the sidewalls. An outward protrusion may be provided on the center portion of each side wall between the rivet cutout and the first side portion. The top surface of at least one sidewall at the first side portion may be angled downward from the top surface from the at least one side wall at the center portion. At least one sidewall of the connector may include an inner ledge at the first side portion. The inner ledge may include a cutout. The connector cover may include a top surface and a resilient button connected to the top surface by a cantilever. The connector cover may include at least one connector cover tab provided on the second portion of the connector cover. The center section of the shelf may be formed as a cantilever. The center section further comprises a pillar having a lip, and the center section pillar may be capable of being pushed down if the connector is engaged with a first wiper arm having a hook, and the lip of the pillar may be capable of engaging a rear tab of a second wiper arm.

An embodiment of a wiper blade connector assembly may be provided for connecting a wiper arm of a vehicle with a wiper blade, and the wiper blade connector assembly may include a wiper blade connector, a wiper blade connector cover, and a wiper blade connector adapter. The wiper blade connector may have a first side portion, a second side portion, and a center portion defined between the first and second side portions. The wiper blade connector may include: a pair of side walls, each side wall provided along the edge of the first side portion and the center portion, and each side wall having a top surface and a bottom surface; a pair of connector cover holes, each connector cover hole provided on an opposing side wall at the first side portion; and a shelf provided on the second side portion. The wiper blade connector cover may have a first portion and a second portion. The wiper blade connector cover may include a pair of connector hole rods, each connector hole rod projecting from an opposing inner surface in the first portion. The wiper blade connector adapter may have a first portion and a second portion. The wiper blade connector adapter may include a first clip provided at the first portion and a second clip provided at the second portion and engageable with an underside of the shelf. A connector cover axis may be defined through the pair of connector cover holes. Each connector hole rod may be connectable with the one of the connect cover holes, and the wiper blade connector cover may be pivotable about the connector cover axis between an open position and a closed position. The wiper blade connector adapter may be connectable with the wiper blade connector and, when connected with the wiper blade connector, positioned between the wiper blade connector and the wiper blade cover as the wiper blade cover is in the closed position.

In further embodiments of a wiper blade connector assembly, the wiper blade connector adapter may include a top surface and a resilient button connected to the top surface by a cantilever. The wiper blade connector adapter may include a bottom surface having a lower position and a higher position, the lower position adjacent the shelf and the higher position adjacent the upper surface of the side walls of the connector as the adapter is connected with the connector.

In one embodiment of the disclosure, a wiper blade connector assembly may be provided for connecting a wiper blade support structure with a wiper arm. The wiper blade assembly may include a wiper blade connector having a first portion, a second portion longitudinally opposed to the first portion, and a center portion defined between the first and second portions. The wiper blade connector may include a pair of side walls extending along at least some of the first, second, and center portions, each side wall having a top surface and a bottom surface. The wiper blade connector may also include a connector channel defined between the pair of side walls on the second portion of the wiper blade connector, and the connector channel may be dimensioned to accommodate at least a portion of the wiper arm. The wiper blade connector may further include a rivet cutout provided proximate the bottom surface and dimensioned to accommodate a rivet on the wiper blade support structure. The wiper blade connector may additionally include a hook end stop provided proximate the bottom surface and distanced from the rivet cutout, the hook end stop positioned so as to abut the end of a hook-style wiper arm.

In further embodiments of a wiper blade connector assembly, the top surface of the side walls at the first portion may be downwardly angled with respect to the top surface of the side walls at the center portion, and the top surface of the side walls at the center portion may be co-planar with the top portion of side walls at the second portion. The inner surface of at least one side wall at the first portion may include an inner ledge, and the inner ledge may include a primary frame cutout. The bottom surface of the side walls at the first portion may be coplanar with the bottom surface of the side walls at the center portion. The bottom surface of the side walls at the center portion may be at a different elevation than the bottom surface of the side walls at the second portion. The rivet cutout may be provided proximate the center and second portions, and the hookend stop may be provided on the second portion. An upper lip may extend into the upper channel and connected by a cantilever with the hookend stop. The rivet cutout may include a rivet clip and a rivet passage forming an "L" shape.

An embodiment of a wiper blade connector assembly may be provided for connecting a wiper blade support structure with a wiper arm. The wiper blade assembly may include an embodiment of a wiper blade connector. The wiper blade connector assembly may further include a wiper blade connector cover having a first portion and a second portion longitudinally opposed to the first portion, the first portion of the wiper blade connector cover pivotable with respect first portion of the wiper blade connector, and the second portion of the wiper blade connector cover securable to the wiper blade connector.

In further embodiments of a wiper blade connector assembly, the wiper blade connector may include a shelf provided on the second portion of the wiper blade connector, the shelf may include a center section aligned with the connector channel and at least one wing may be provided proximate to one of the side walls. The wiper blade connector cover may include at least one connector cover tab provided on the second portion of the wiper blade connector cover, and the at least one connector cover tab may be engageable with the at least one wing to secure the wiper blade connector cover in a closed position. The top surface of the side walls at the first portion of the wiper blade connector may be downwardly angled with respect to the top surface of the side walls at the center portion of the wiper blade connector, and the top surface of the side walls at the center portion of the wiper blade connector may be co-planar with the top portion of side walls at the second portion of the wiper blade connector. The bottom surface of the side walls at the first portion of the connector cover may be coplanar with the bottom surface of the side walls at the center portion of the connector cover, and the bottom surface of the side walls at the center portion of the wiper blade connector cover may be at a different elevation than the bottom surface of the side walls at the second portion of the wiper blade connector. An underside of the at least one wing may be coplanar with the bottom surface of the side walls at the second portion of the wiper blade connector. The wiper blade connector cover may include at least one rear cover tab provided on the first portion of the wiper blade connector cover, and the wiper blade connector may include an outward protrusion extending from an outer surface of one of the connector side walls. The at least one rear cover tab may be engageable with a bottom side of the protrusion when the cover is in the closed position. The first portion of the wiper blade connector may include a pair of connector cover receiving holes and the first portion of the wiper blade connector cover may include a pair of connector hole rods projecting inwardly and engageable with the connector cover receiving holes. An underside of the wiper blade connector cover includes a hook stop. The wiper blade connector cover may include a bottom surface at a first elevation at the first portion of the wiper blade connector cover and at a second elevation at the second portion of the wiper blade connector cover. The wiper blade connector cover may include a button cantilevered to a top surface of the wiper blade connector cover, and a distal edge of the button projects upward from the top surface of the wiper blade connector cover and includes a chamfered surface.

Embodiments of a wiper blade connector assembly may further include a wiper blade connector adapter having a first portion and a second portion longitudinally opposite the first portion, the wiper blade connector adapter may be securable between the wiper blade connector and the wiper blade connector cover. The wiper blade connector may include a shelf provided on the second portion of the wiper blade connector, the shelf may include a center section aligned with the connector channel and at least one wing provided proximate to one of the side walls. The wiper blade connector adapter may include a first clip provided on the first portion of the wiper blade connector adapter and a second clip provided on the second portion of the wiper blade connector adapter. The first clip may be insertable through the connector channel and a distal edge of the second clip may be engageable with an underside of the center section of the shelf. The wiper blade connector cover may include at least one connector cover tab provided on the second portion of the wiper blade connector cover, and the at least one connector cover tab may be engageable with the at least one wing to secure the wiper blade connector cover in a closed position. The wiper blade connector adapter may include adapter side walls having a bottom edge which contact the top surface of the connector side walls for at least part of the second portion of the wiper blade connector.

An embodiment of a wiper blade assembly may include a wiper strip, a support structure, a wiper blade connector assembly connectable with the support structure, a wiper strip connectable with the support structure, and a wiper blade cover connectable with the support structure. The wiper blade connector assembly may include any embodiment disclosed herein of a wiper blade support structure, including embodiments where the wiper blade connector assembly may include a wiper blade connector and a wiper blade cover pivotable with respect to the wiper blade connector between an open and a closed position.

An embodiment of a support structure for a wiper blade assembly may include a primary frame, a secondary frame, and a tertiary frame. The primary frame may have first and second longitudinal ends, a first side portion defined proximate the first longitudinal end, a second side portion defined proximate the second longitudinal end, and a center portion defined between the first and second side portions. The secondary frame may be connected with the second side portion of the primary frame. The secondary frame may have first and second longitudinal ends, a first side portion defined proximate the first longitudinal end, a second side portion defined proximate the second longitudinal end, and a center portion defined between the first and second side portions. The tertiary frame may be connected with the secondary frame at the first side portion of the secondary frame.

In further embodiments of a support structure, the primary frame may include side walls at each portion, the side walls at the center portion may be positioned further laterally inward than the side walls at the side portions. The primary frame may further include a plurality of cover engagement projections, each cover engagement projection may be provided on one of the side walls at one of the side portions and positioned proximate the center portion. The second side portion of the primary frame may include a top surface between the side walls. Each side wall at the center portion of the primary frame may include a primary hole positioned above the top surface of the second side portion. Each side wall at the center portion of the primary frame may include a pair of stops, with one stop provided on each side of the primary hole.

In still further embodiments of a support structure, the secondary frame may be connected with the primary frame at the center portion of the secondary frame. The support structure may further include a secondary frame connector. The secondary frame connector may include a secondary frame connector rivet and a secondary connector structure, which may include an interior passage dimensioned to accept insertion of the secondary frame connector rivet and a pair of side openings dimensioned to accept insertion of the center portion of the secondary frame. The primary frame may include a pair of secondary frame connector holes at the second side portion. The secondary frame connector rivet may be mutually insertable through the secondary frame connector holes and the interior passage along a secondary connector axis. The secondary frame may be pivotable with respect to the primary frame about the secondary connector axis. The center portion of the secondary frame may include a valley. The secondary frame may include a pair of central holes with one central hole provided on each side of the valley, and the secondary connector structure may include a pair of interior projections each engageable with one of the central holes. The secondary connector structure may be composed of two, connectable halves. The first side portion of the secondary frame may be obtusely angled from the center portion of the secondary frame. The secondary frame may include a strengthening bead extending over a top surface of the secondary frame along the first side portion and the center portion. The secondary frame may include a first strengthening bead on a top surface of the secondary frame along the first side portion of the secondary frame, a second strengthening bead on the top surface of the secondary frame along the first side portion and the center portion of the secondary frame, and a third strengthening bead on the top surface of the secondary frame along the second side portion. The tertiary frame may be connected with the secondary frame between the first and second strengthening beads. The primary frame may be connected with the secondary frame between the second and third strengthening beads. The center portion of the secondary frame may include a valley and a pair of central holes provided between the second and third strengthening beads. The support structure may include an additional tertiary frame connected with the secondary frame at the second side portion of the secondary frame.

In still further embodiments of a support structure, the support structure may include a tertiary frame connector having a top portion, a bottom portion, and a neck portion defined between the top and bottom portions. The secondary frame may include a tertiary connector hole and the tertiary frame may include a central connector hole, and the neck portion may be mutually receivable through both the tertiary connector hole and the central connector hole. The top portion may be positioned proximate the secondary frame and the bottom portion is positioned proximate the tertiary frame. The tertiary frame connector may include a cap at the top portion positioned over a top surface of the secondary frame, and a pair of wings at the bottom portion positioned beneath an underside of the tertiary frame. A top surface of the wings may be rounded. The cap may include a pair of underside projections provided on an underside of the cap, the underside projections oriented orthogonally from the wings. The neck portion may include a central gap defined between a pair of side walls, the central gap extending into the bottom portion. The neck portion may include a central gap defined between a pair of side walls, the central gap extending into the top portion. The tertiary frame may include a pair of side portions and a central connector hole provided where the side portions join. The tertiary frame may include a pair of side walls each provided on a lateral edge of the tertiary frame proximate the central connector hole. Each side portion may include a strengthening bead.

An embodiment of a support structure for a wiper blade may include a primary frame, a secondary frame, a secondary frame connector, a first tertiary frame, a first tertiary frame connector, a second tertiary frame, and a second tertiary frame connector. The primary frame may have first and second longitudinal ends, a first side portion defined proximate the first longitudinal end, and a second side portion defined proximate the second longitudinal end. The secondary frame may have first and second longitudinal ends, a first side portion defined proximate the first longitudinal end, a second side portion defined proximate the second longitudinal end, and a center portion defined between the first and second side portions. The secondary frame may be connected with the second side portion of the primary frame at the center portion of the secondary frame, and each side portion of the secondary frame may include a tertiary connector hole. A secondary frame connector may include a secondary frame connector rivet and a secondary connector structure, which may include an interior passage dimensioned to accept insertion of the secondary frame connector rivet and a pair of side openings dimensioned to accept insertion of the center portion of the secondary frame. The first tertiary frame may be connected with the first side portion of the secondary frame, and the tertiary frame may include a central connector hole. The first tertiary frame connector may have a top portion, a bottom portion, and a neck portion defined between the top and bottom portions, and the neck portion may be mutually receivable through both the tertiary connector hole of the first tertiary frame and one of the central connector holes of the secondary frame. The second tertiary frame may be connected with the second side portion of the secondary frame. The second tertiary frame connector may have a top portion, a bottom portion, and a neck portion defined between the top and bottom portions, and the neck portion may be mutually receivable through both the tertiary connector hole of the second tertiary frame and one of the central connector holes of the secondary frame.

An embodiment of a wiper blade may include a support structure and a wiper blade cover. The support structure may include a primary frame, a first secondary frame, and a second secondary frame. The primary frame may have first and second longitudinal ends, a first side portion defined proximate the first longitudinal end, a second side portion defined proximate the second longitudinal end, and a center portion defined between the first and second side portions. The first secondary frame may be connected with the first side portion of the primary frame, and the secondary frame may have first and second longitudinal ends. The second secondary frame may be connected with the second side portion of the primary frame, the secondary frame may have first and second longitudinal ends. The wiper blade cover may have first and second side sections and a center section between the first and second side sections, and the wiper blade cover may be attachable over the primary and secondary frames.

In further embodiments of a wiper blade, the primary frame may include side walls at each portion, the side walls at the center portion may be positioned further laterally inward than the side walls at the side portions, and a plurality of cover engagement projections, each cover engagement projection may be provided on one of the side walls at one of the side portions and positioned proximate the center portion. Each side section of the wiper blade cover may include a plurality of holes, each hole engaging with one of the cover engagements. Each side section of the wiper blade cover may include a distal groove to engage with one of the longitudinal ends of one of the secondary frames. Each distal groove may be defined by a ledge. The center section of the wiper blade cover may include a plurality of grips to engage with the underside of sidewalls at the center portion of the primary frame. The center section of the wiper blade cover may include two wrap over portions, each wrap over portion may be provided at a longitudinal end of the center section, each wrap over portion extending over the primary frame. The center section of the wiper blade cover may include a recessed area proximate one of the wrap over portions.

Various embodiments of a wiper blade assembly 10 and connection system are disclosed herein. Embodiments of a wiper blade assembly may be connectable with one or more wiper arm types 20 found on vehicles. Some of the many embodiments of wiper arm types 20 are shown in FIG. 153. Wiper arm types may include one or more tongues, pins, hooks, or combinations thereof.

With reference to FIGS. 1-6, a wiper blade assembly 10 may include a support structure 100, a wiper blade connector assembly 200, a wiper blade cover 300, and a wiper blade strip 400. Generally speaking, and as discussed in further detail herein, any support structure 100 may be used with the disclosed concepts, including a traditional frame support structure, a beam support structure, a hybrid support structure having both traditional frames and beams or beam-like frames. As illustrated in FIG. 3-6, the support structure 100 may include a primary frame 110, one or more secondary frames 130 connected to the primary frame 110, and one or more tertiary frames 150 each connected to a secondary frame 130. In the illustrated embodiments, a primary frame 110 is connected with a secondary frame 130 on opposing longitudinal ends 10A, 10B using a secondary frame connector 120, and two tertiary frames 150 are connected with each secondary frame 130 on opposing longitudinal ends 10A, 10B using a tertiary frame connector 140. Each tertiary frame 150 may holds or support the wiper strip 400. Persons of skill in the art will recognize that the secondary frames may be modified to hold or support the wiper strip directly on one, or both, ends, in accordance with the disclosed concepts. A wiper blade cover 300 may be provided to cover or shield the majority of the support structure 100 from weather conditions. The wiper blade cover may be a single piece or, as shown in the illustrated embodiment, multi-sectional. A wiper blade connector assembly 200 may mutually connect with the support structure 100, on the one hand, and a wiper arm 20, on the other hand. The wiper blade connector assembly may include a wiper blade connector 210 and a wiper blade connector cover 230. As illustrated herein below, the wiper blade connector assembly may be configured to connect to several different types of arms, and may form part of a connection system that includes one or more connector covers, and that may include an adapter. Persons of ordinary skill in the art will recognize that the disclosed concepts may be practiced with any connector, adapter or connection system known in the art or to be developed.

Reference in the disclosure to a longitudinal direction is intended to refer to the direction coinciding with longitudinal ends 10A, 10B. Reference to the lateral direction is orthogonal to the longitudinal direction corresponding with the width of various components described herein. Top surfaces or ends correspond to the direction or side closer to, for instance, connector assembly 200 while bottom surfaces or ends correspond to the direction or side closer to, for instance, the wiper strip 400. Proximal ends or sides correspond to the direction closest to the portion of a wiper arm that connects to a vehicle. Distal ends or sides correspond to the direction or side furthest from the portion of a wiper arm that connects to a vehicle. Inner ends or sides correspond to the direction or side closest to the connector, primary rivet or center of a wiper blade. Outer ends or sides correspond to the direction or side furthest from the connector, primary rivet or center of the wiper blade.

Referring now to FIGS. 7-14, support structure 100 may include a primary frame 110 which may be centrally provided within support structure 100. Primary frame 110 may be rigid. Primary frame 110 may include a central portion 111 and a pair of side portions 112 extending from central portion 111 in the longitudinal direction. Central portion 111 may include a pair of side walls 113, which may be parallel with respect to each other and orthogonal with the longitudinal direction of the wiper blade. Side portions 112 may each include a pair of side walls 113 and a top surface 114. The side walls 113 of the center portion 111 may positioned further laterally inward than the side walls 113 of the side portions 112. A narrower distance between the side walls 113 of the center portion 111 may facilitate rotation or rocking of a wiper blade connector assembly when connected with the primary frame 110. In some embodiments, the width or distance between side walls 113 of the side portions 112 may be substantially similar to the width of a connector cover 230 and/or the width of the center section of wiper blade cover 300. In some embodiments the side walls 113 of the center portion 111 may be the same width as the side walls 113 of the side portions 112, such as the alternative embodiment shown in FIGS. 131-132. The primary frame may be made out of any suitable material, including but not limited to metals, such as steel or aluminum, plastics, and other synthetic or composite materials.

Primary frame holes 115 may be provided on the top side of the wide walls 113 of the center portion so as to engage with a rivet. Persons of ordinary skill in the art will recognize that the disclosed concepts may be practiced with any method or structure for connecting a wiper blade to a wiper arm known in the art or to be developed, including without limitation, direct connections to wiper arms, using inward projections or outward projections in place of a rivet, the holes, clips, or recesses receive projections or a rivet that is disposed on a connector, etc.

Stops 116 may be provided on the top side of the side walls 113 of the center portion adjacent to primary frame holes which may prevent or otherwise control the degree of pivoting or rocking of a connected connector assembly 200. The side walls may be sloped from primary frame holes 115 towards the base of the side walls. Alternatively, rectangular side walls, or any other desired shape of side walls may be used in accordance with the disclosed concepts. Primary frame hole 115 may be positioned above the top surface 114 of side sections 112. Alternatively, primary hole 115 may be positioned in line with, or lower than the top surface 114 of side sections 112. In the illustrated embodiment, four total stops 116 are provided, two on each side wall 113 with one stop on each side of primary frame holes 115. One or more primary frame cover engagement structures, such as cover engagement projections 117 may also be provided to facilitate engagement of primary frame 110 with wiper blade cover 300. Primary frame cover engagement projections 117 may be provided towards the bottom end side walls 113 on side portions 112 proximate or near center portion 111. Primary frame cover engagement projections 117 may be capable of engaging with a portion of cover 300, and as discussed further herein may be particularly capable of engaging with the center portion of a multi-sectional cover. Persons of ordinary skill in the art will recognize that any form of engaging a portion of the cover known in the art or to be developed may be used in accordance with the disclosed concepts, including without limitation, having holes or recesses on the primary frame which receive engagement projections from the cover portions, using claws or grips, or other form-fitting structures. Pivot extension walls 118 may be provided on the longitudinal ends of side portions 112. These pivot extension walls 118 may each include a primary-to-secondary hole 119 to facilitate engagement of a secondary frame connector, and holes 119 may be aligned so as to mutually receive a rivet, rod, or other cylindrical component as part of a secondary frame connector. Persons of ordinary skill in the art will recognize that the disclosed concepts may be practiced with any method or structure for connecting primary frame to a secondary frame known in the art or to be developed, including without limitation, direct connections between same, using inward projections or outward projections in place of a rivet, the holes, clips, or recesses receive projections or a rivet that is disposed on a secondary frame, etc.

Figure 3:
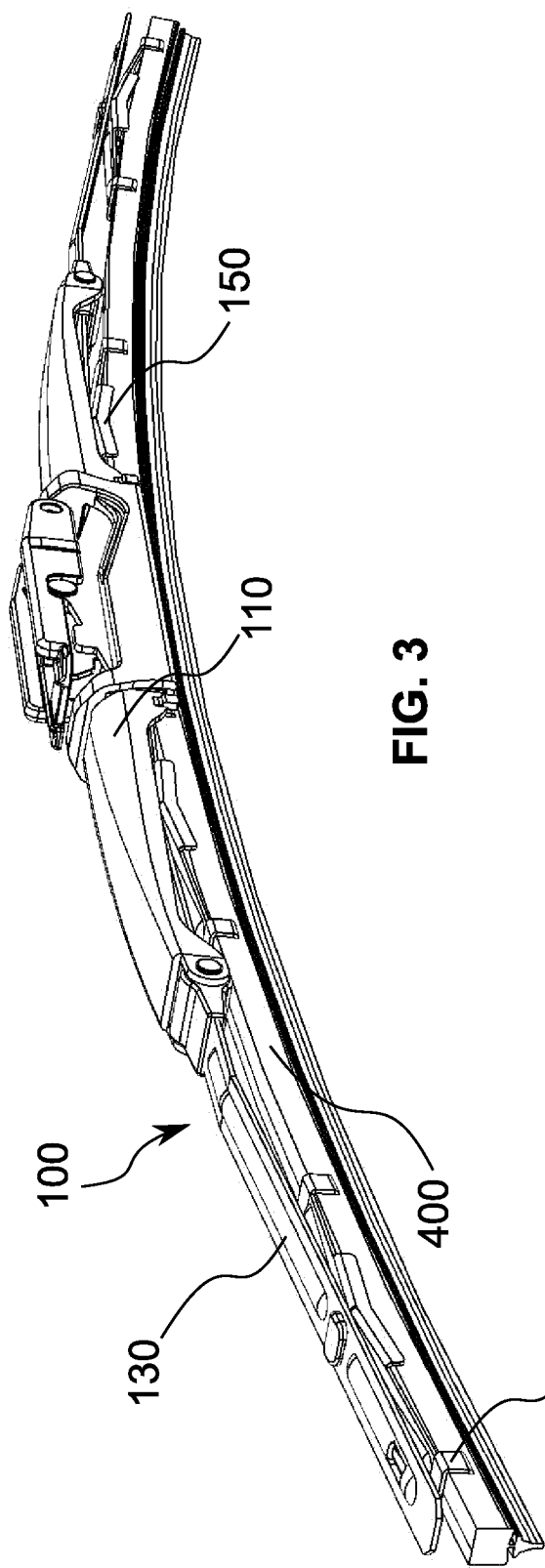
FIG. 3 illustrates a top perspective view of the wiper blade assembly of FIG. 2 without the wiper blade cover side sections.
Figure 4:
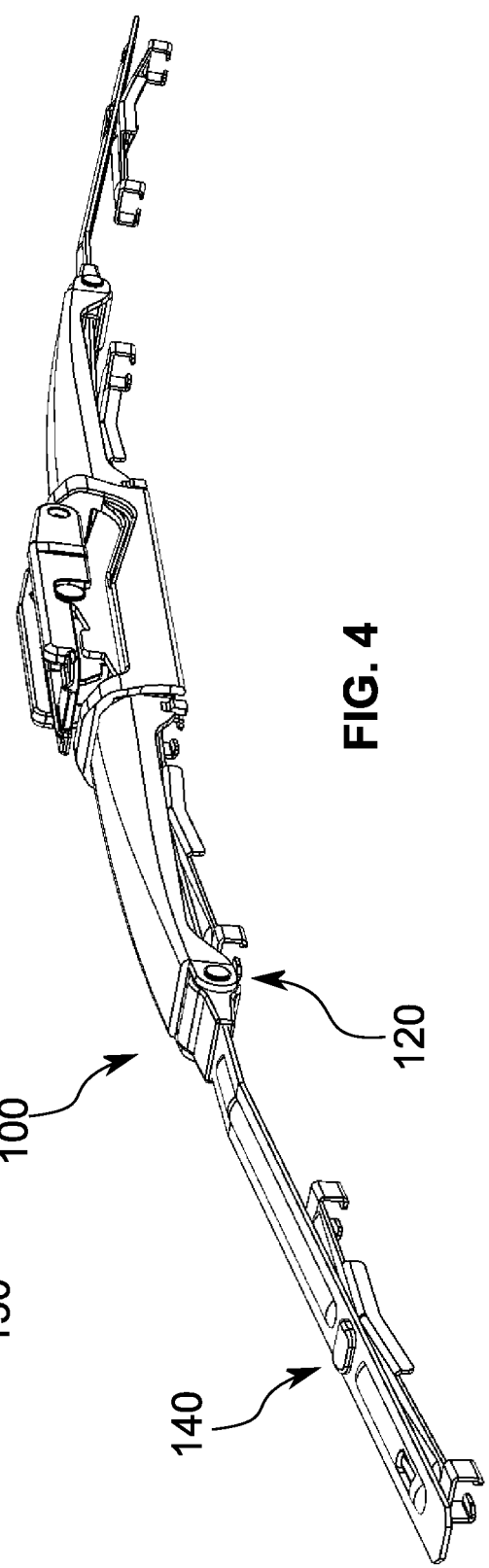
FIG. 4 illustrates a top perspective view of the wiper blade assembly of FIG. 3 without the wiper strip.
Figure 5:
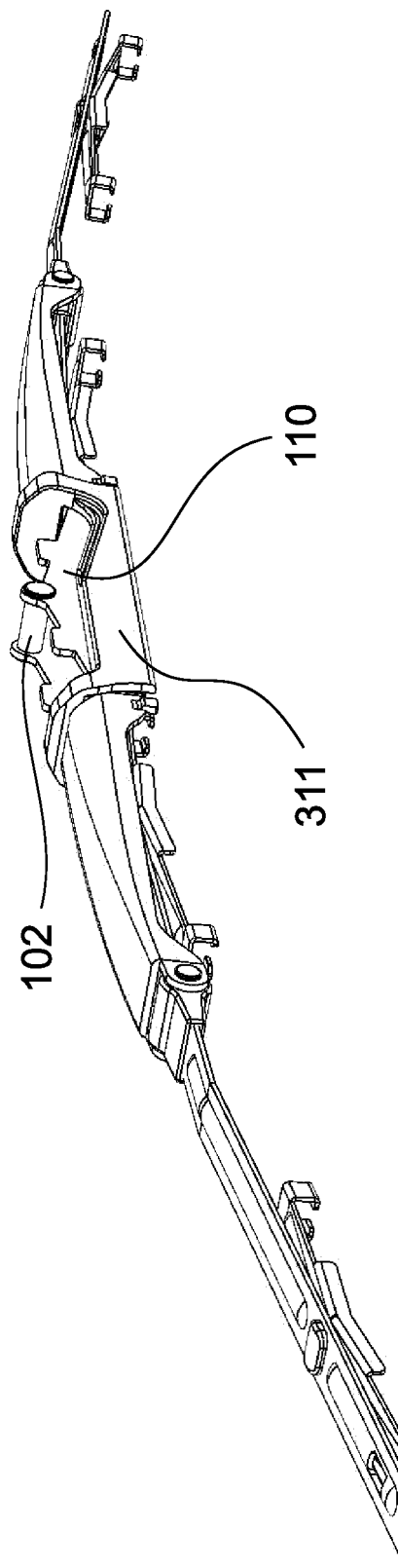
FIG. 5 illustrates a top perspective view of the wiper blade assembly of FIG. 4 without the wiper blade connector.
Figure 6:
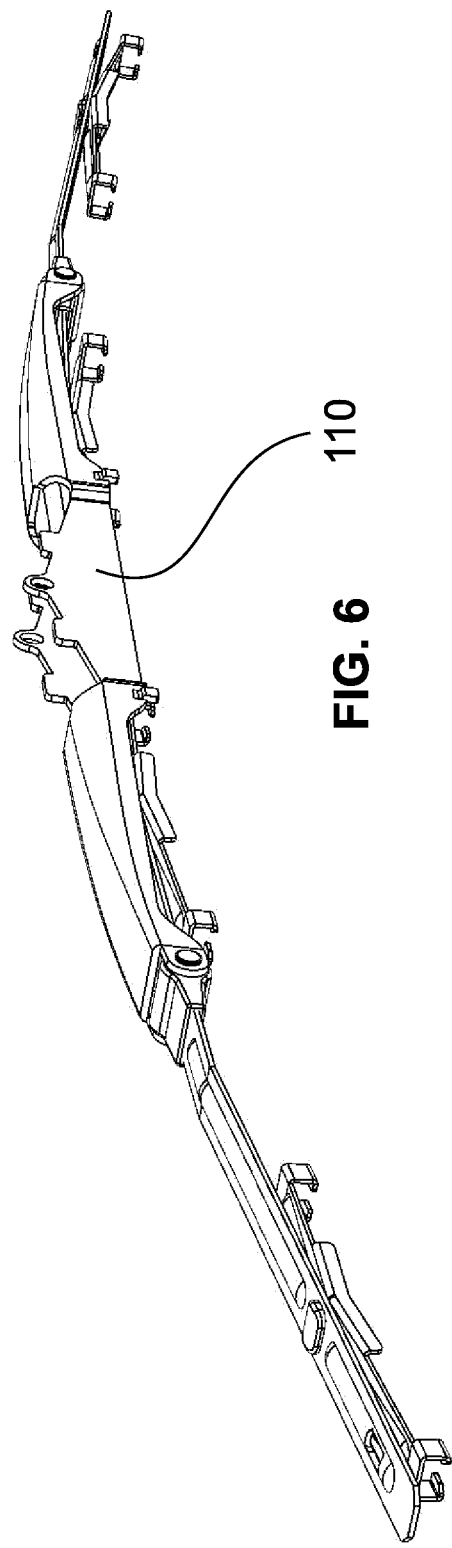
FIG. 6 illustrates a top perspective view of the wiper blade assembly of FIG. 5 without the cover center section and without the primary rivet.
Figure 7:
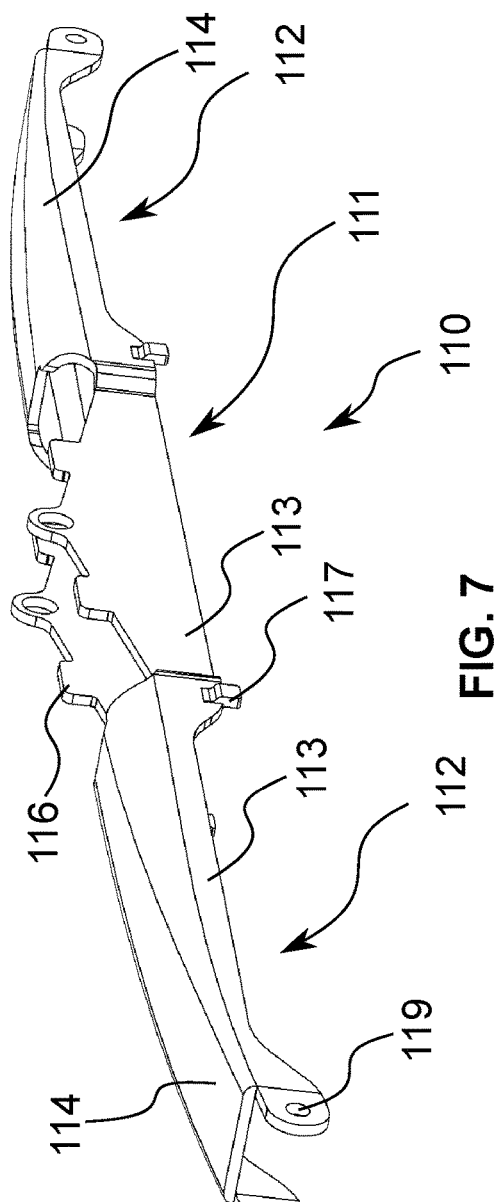
FIG. 7 illustrates a top perspective view of an embodiment of the primary frame.
Figure 8:
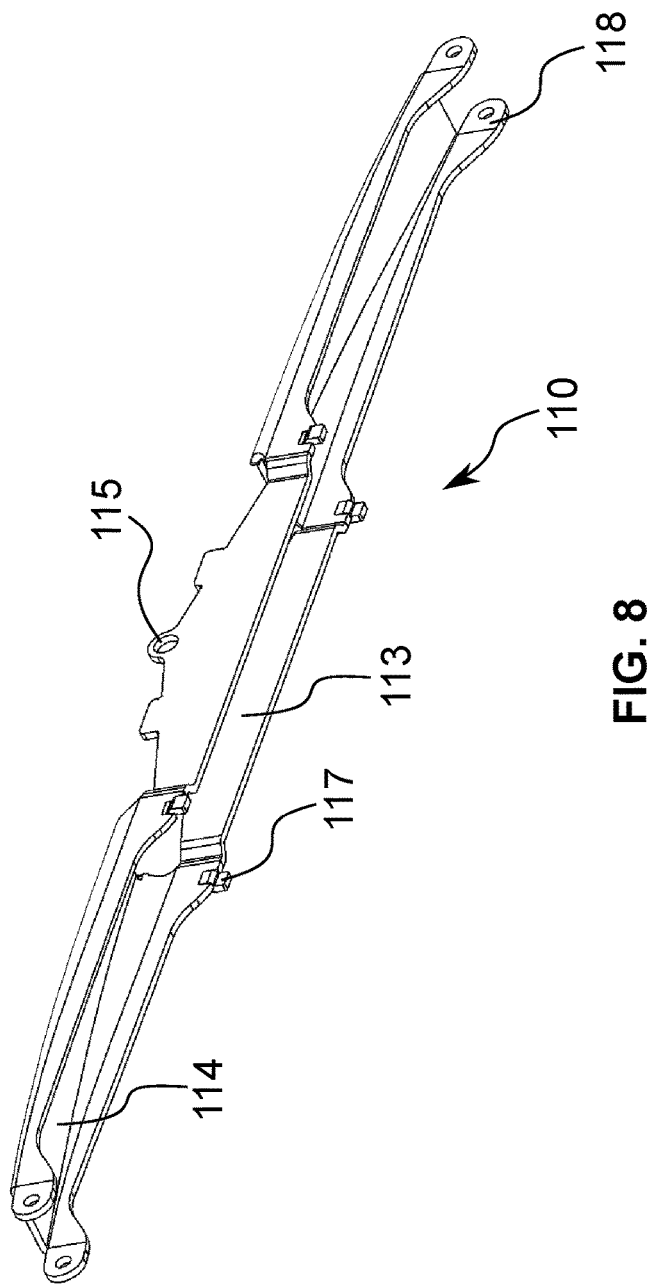
FIG. 8 illustrates a bottom perspective view of the primary frame of FIG. 7.
Figure 13:
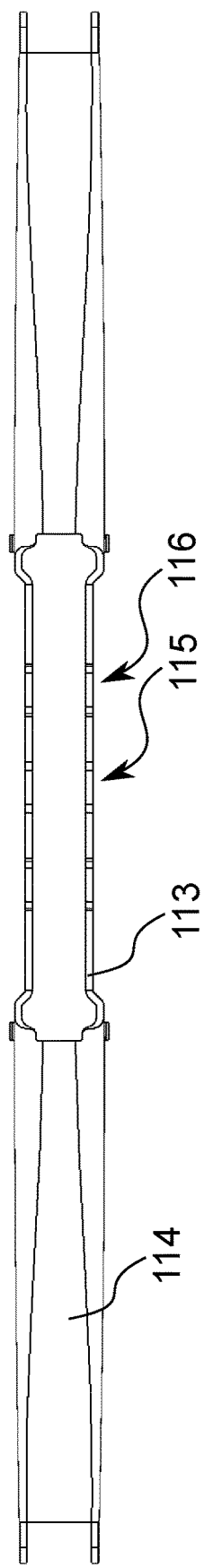
FIG. 13 illustrates a top view of the primary frame of FIG. 7.
Figure 14:
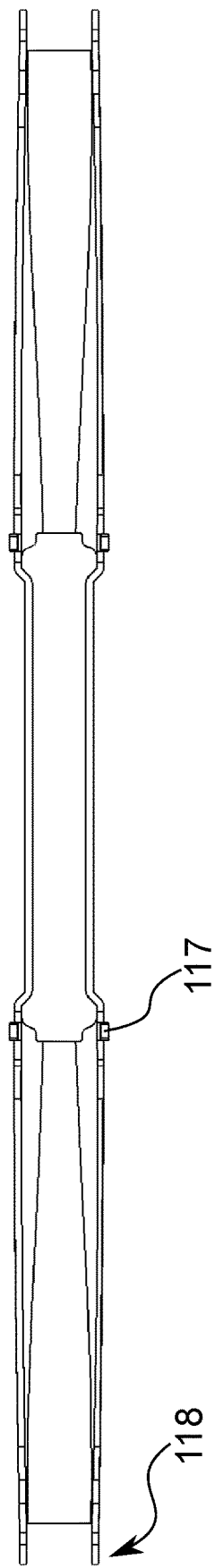
FIG. 14 illustrates a bottom view of the primary frame of FIG. 7.
Figure 15:
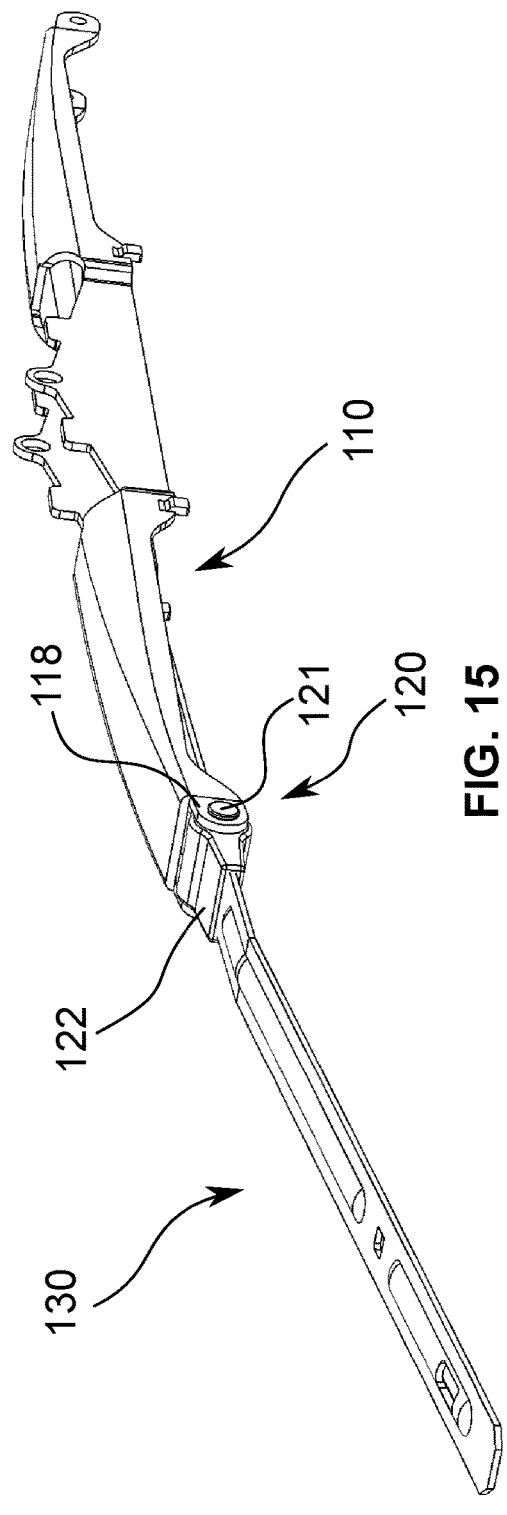
FIG. 15 illustrates a top perspective view of an embodiment of a primary frame coupled with a secondary frame.
Figure 25:
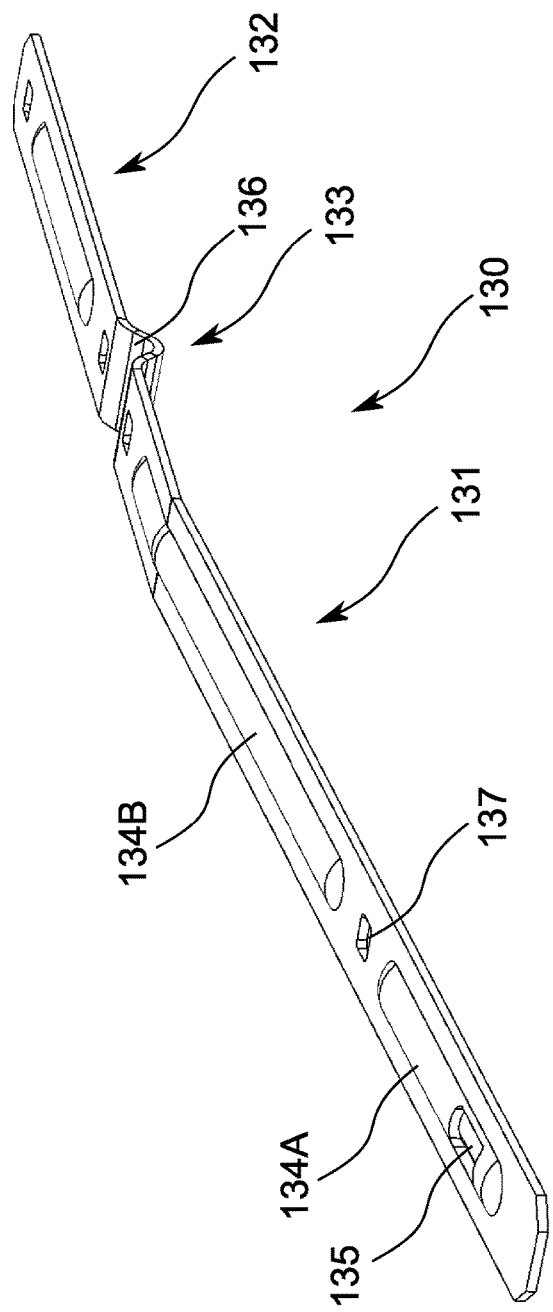
FIG. 25 illustrates a top perspective view of an embodiment of a secondary frame.
Figure 26:
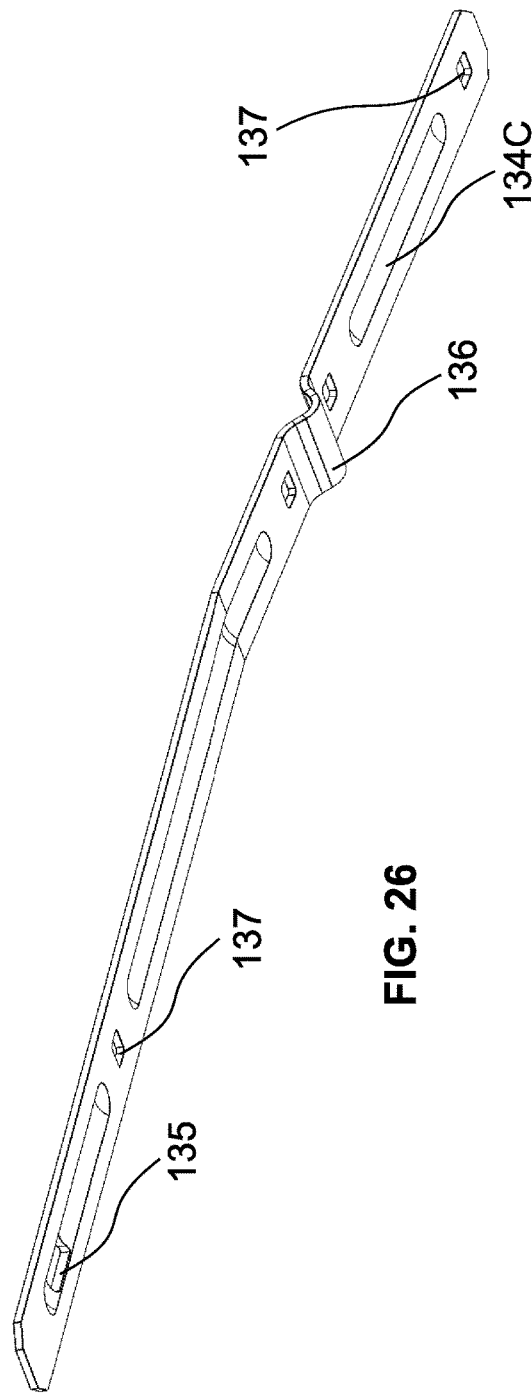
FIG. 26 illustrates a bottom perspective view of the secondary frame of FIG. 25.
Figure 47:
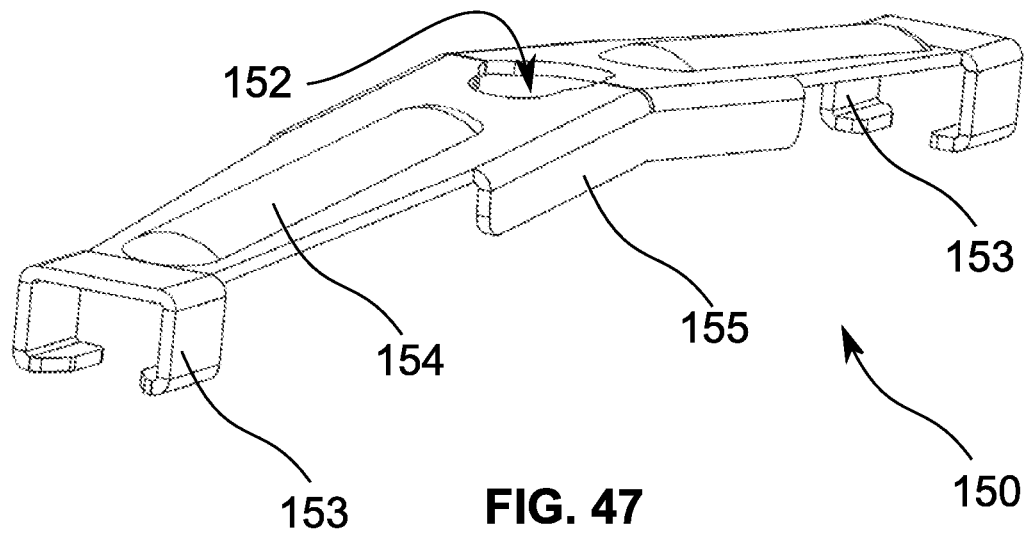
FIG. 47 illustrates a top perspective view of an embodiment of a tertiary frame.
Figure 48:
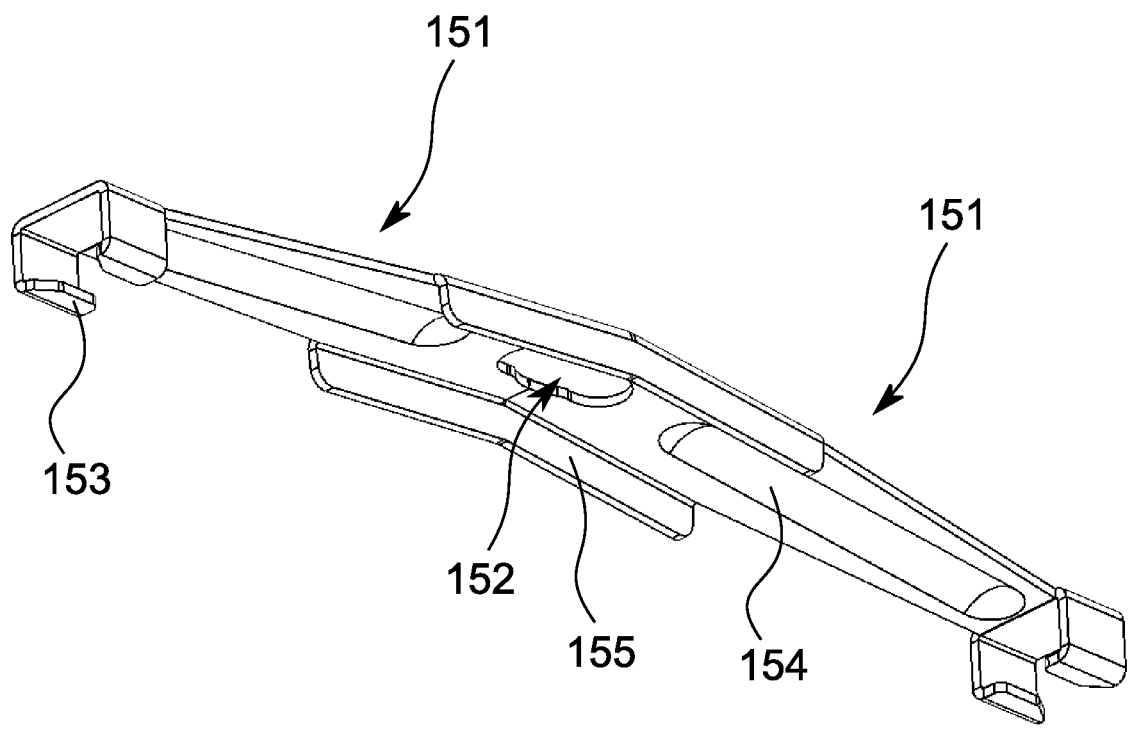
FIG. 48 illustrates a bottom perspective view of the tertiary frame of FIG. 47.
Figure 49:
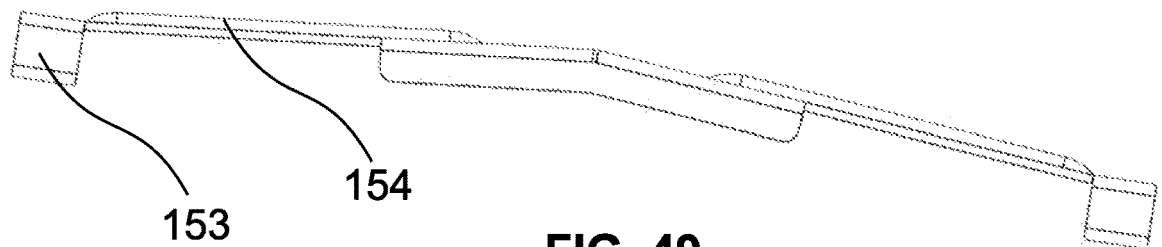
FIG. 49 illustrates a front view of the tertiary frame of FIG. 47.
Figure 50:
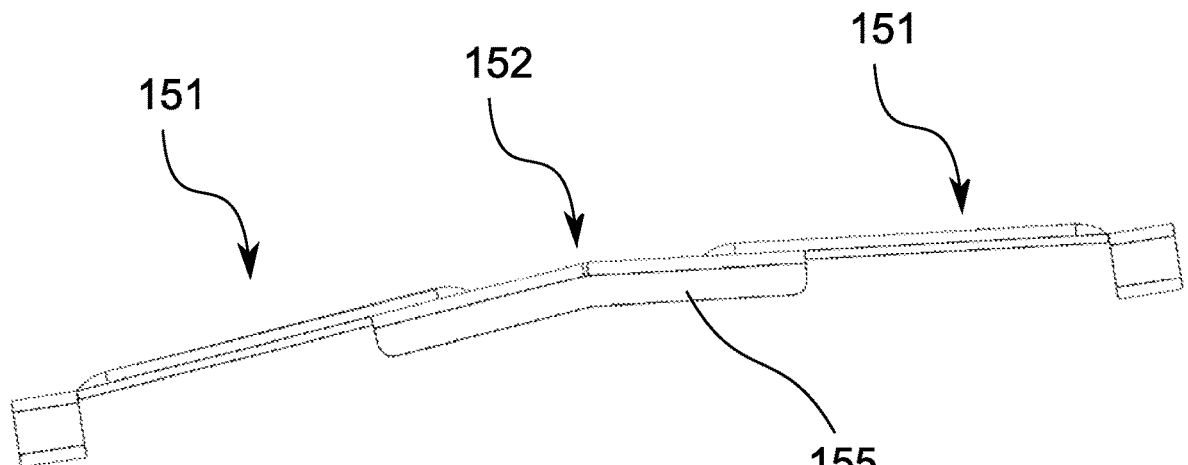
FIG. 50 illustrates a back view of the tertiary frame of FIG. 47.
Figure 51:
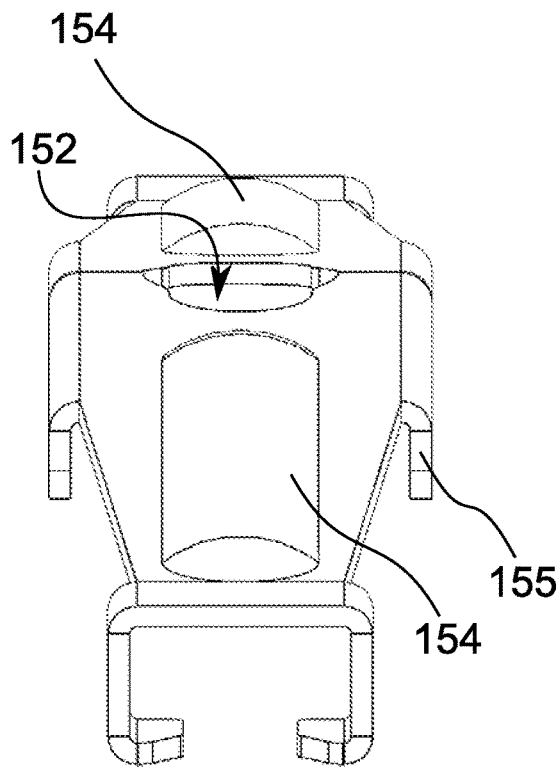
FIG. 51 illustrates a side view of the tertiary frame of FIG. 47.
Figure 52:
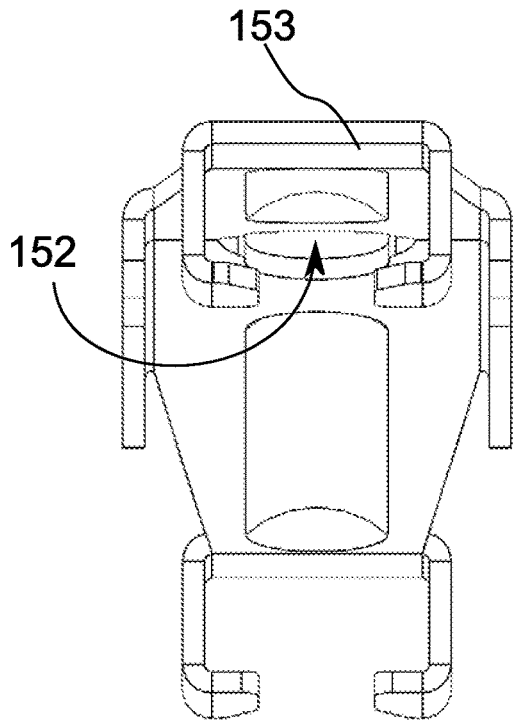
FIG. 52 illustrates an opposing side view of the tertiary frame of FIG. 47.

With reference to FIGS. 15-16, primary frame 110 may be connected with a secondary frame 130 by a secondary frame connector 120. A secondary frame connector rivet 121 may be provided mutually through holes 119 of the primary frame 110 and a rivet passage 123 of a secondary connector structure 122 along a laterally defined secondary connector axis. As discussed above, persons of ordinary skill in the art will recognize that the disclosed concepts may be practiced with any method or structure for connecting primary frame to a secondary frame known in the art or to be developed.

Secondary frame connector 120 may include a base secondary connector structure 122 having one or more side openings 124 which may permit passage of a portion of secondary frame 130 there through. As shown and described in further detail herein, the portion of secondary frame 130 which may be disposed within secondary connector structure 122 may have a groove or valley 136 conformingly shaped with secondary frame connector rivet 121 and to further discourage separation of secondary connector structure 122 from secondary frame 130 once connected. Secondary connector structure 122 may be symmetrical about the secondary connector axis, and may thicker towards the center so as to accommodate the rivet 121 and the inserted portion of secondary frame 130. While primary frame 110 and secondary frame 130 are connected, the structure of secondary frame connector 120 may permit rocking or pivoting of secondary frame 130 with respect to primary frame 110 about the secondary connector axis. Extension walls 118 may be dimensioned and shaped so as to provide clearance of secondary connector structure 122 from the remainder of primary frame 110, including for instance top surface 114, so as to permit this rocking or pivoting.

Secondary frame connector may be made out of plastic, or metal, or any other suitable material known in the art or to be developed. Secondary frame connector 120 may be a unitary structure, which may be molded around secondary frame 130. Alternatively, secondary frame connector may be assembled from multiple parts. For example, as shown in FIG. 18, secondary frame connector 120 may be formed from two secondary connector halves 120a by splitting the secondary connector frame along a vertical, longitudinal plane. Side openings 124 may lead to a passage formed between secondary connector half structure 122a and secondary connector half cylinder 128, which helps secure the valley 136 in the secondary frame. The secondary frame connector half may further include one or more projections 125, which may engage central holes 138 in the secondary frame. Additional projections and recesses may be included in each secondary connector half 120a to further secure two secondary connector halves 120a to each other. Two secondary connector halves 120a may be held together by a rivet 121, and/or or any other method of securing two secondary connector halves known in the art or to be developed, including but not limited to adhesives, being held together by the rivet within the extension walls 118 of the primary frame 110, projections that engage recesses, and other form-fit connections. As discussed below with respect to FIGS. 33-37, other methods of forming secondary frame connectors may be practiced within the scope of the disclosed concepts.

Referring now to FIGS. 25-32, a secondary frame 130 may include a first side portion 131, a second side portion 132, and a center portion 133. One or more side portions 131, 132 may be angled with respect to center portion 133, and in the illustrated embodiment first side portion 131 may be acutely angled downward from center portion 133, thereby forming an obtuse angle with same, while second side portion 132 may not be not angled. One or more side portions 131, 132 may further include one or more strengthening beads 134. A strengthening bead 134 be provided longitudinally along secondary frame 130. Three strengthening beads 134 are provided in the illustrated embodiment: a first bead 134A provide on the first portion 131 proximate to the longitudinal end 10A/10B; a second bead 134B provided on the first portion 131 as well as center portion 133, and spaced from first bead 134A; and a third bead 134C on second portion 132. Beads 134 may project or arc towards upwards from the top surface of the secondary frame 130. On the underside, beads 134 may be hollow or recessed such that a uniform thickness is maintained across the secondary frame 134. By including beads 134, secondary frame may gain increased strength to resist failure from forces experienced by secondary frame 130 during operation of the wiper blade. One or more bead holes 135 may be provided in a strengthening bead 134. Center portion 133 may be partially curved into a valley 136 having a conforming shape with a secondary frame connector rivet 121. One or more central holes 138 may be disposed on either side of valley 136. Side portions 131, 132 may also include a tertiary connector hole 137. The tertiary connector hole 137 may be square, rectangular, oval, or any other suitable shape that is dimensioned and shaped to engage with a tertiary frame connector as described further herein. Side portions 131, 132 may be the same length or have different lengths, as shown in the illustrated embodiment where side portion 131 is longer than side portion 132. The outer end of first side portion 131 may engage with wiper cover 300 as described further herein, and thus extending the length of side portion 131 may permit longer wiper blades and wiper blade covers. As illustrated in these figures, while not beams, the secondary frames may be beam-like, and may be made from a resilient spring-elastic material, such as spring-elastic steel or other metals, or plastic. Alternatively, the secondary frames may be rigid, and made out of any suitable material including metals and plastics. Persons of skill in the art will recognize that different shapes and designs of the secondary frames or other secondary force distribution structures may be practiced in accordance with the disclosed concepts, including but not limited to rigid traditional frames, other beam-like frames, or in embodiments wherein the secondary frames are replaced by beams.

With reference to FIGS. 33-37, FIG. 33 illustrates a cross sectional view of the secondary frame coupled to a secondary frame connector. FIGS. 34-37 illustrate an alternative embodiment of the secondary connector halves wherein the secondary frame connector 120 is split into halves structures 122a, 122b along a lateral, longitudinal plane. Internal projections 125 in each connector half 122a, 122b may engage both recesses 126 in the other half, and central holes 138 in the secondary frame. Additionally inner projections 127 may be provided in secondary connector half structure 122*a* to help secure valley 136 against the secondary connector half structure 122*b*. Again, persons of ordinary skill in the art will recognize that the disclosed concepts can be practices with any suitable design of a secondary frame connector currently known in the art or to be developed.

Referring now to FIGS. 38-46, one or more tertiary frames 150 may be each connected with a secondary frame 130 by a tertiary frame connector 140. In the illustrated embodiment, two tertiary frames 150 are connected with secondary frame 130, one at each side portion 131, 132. The disclosure further contemplates just one tertiary frame 150 connected at either side portion 131, 132.

Tertiary frame connector 140 may include a top portion 141, a bottom portion 142, and a neck portion 143 defined between the top and bottom portions. The neck portion 143 may be narrower than either top or bottom portions, and neck portion 143 may be dimensioned to fit within tertiary connector hole 137. Neck portion 143 may have a rounded outer surface to facilitate rocking or pivoting of a tertiary frame 150 with respect to secondary frame 130 about a tertiary pivot axis defined through tertiary connector hole 137. Top portion 141 may include a cap 144, which may have a substantially flat surface provided on the underside of cap which may contact a top surface of secondary frame 130. The cap 144 may be sized and shaped such that it may be inserted through the tertiary connector hole 137 in the secondary frame 130. The cap may further be sized and shaped such that when it is rotated 90 decrees relative to the secondary frame, the respective lateral sides of the cap are larger than the lateral sides of the tertiary connector hole 137, and thus the cap 144 helps secures the secondary frame 130 to the tertiary frame 150. Bottom portion 142 may include wings 145, which may be rounded or curved on their top surfaces which may contact the underside of tertiary frame 150. The bottom portion 142, including wings 145 may be sized and shaped such that they can be inserted into central tertiary connector hole 152 in the tertiary frame. The bottom portion 142, including wings 145 may be sized and shaped such when the tertiary connector 140 is rotated 90 degrees the distance between the ends of the wings 145 is greater than the distance between the lateral sides of the central hole 152 such that the wings help secure the tertiary frame 150 to the secondary frame 130. Any suitable frame connector capable of connecting the secondary frame to the tertiary frame, including but not limited to the tertiary frame connectors described below with respect to FIGS. 55-60, and all other tertiary frame connectors known in the art or to be developed may be used within the scope of the disclosed concepts. Tertiary frame connectors may be made out of any suitable material known in the art or to be developed, including but not limited to plastics and metals.

With reference to FIGS. 47-54, a tertiary frame 150 may include tertiary side portions 151 and a center projecting from a central tertiary connector hole 152. As discussed above, the central tertiary connector hole 152 may be shaped to allow the bottom portion 142 of the secondary frame connector 140, to pass through in one orientation, and to secure it when the tertiary frame connector 140 is rotated 90 degrees. The central tertiary connector hole may have any suitable size and shape complementary to the size and shape of the tertiary frame connector. Side portions 51 may be acutely angled downward from central hole 152, thereby forming an obtuse angle with the opposing tertiary side portion. The respective side portions 151 may be symmetric, or may be asymmetric, both as to length and angle of descent. At or proximate to the longitudinal end of each side portion 151 may be a claw 153 dimensioned to grip a wiper strip 400. One or more beads 154 may also be provided on one or more side portions 151 similar to beads 134 provided on secondary frame 130. A side wall 155 may also be provided on lateral ends of tertiary frame 150 so as to block or shield the underside of tertiary frame 150 particularly near center hole 152 so as to protect the bottom portion 142 of tertiary connector 140. The side walls 155 may also increase the rigidity of the tertiary frame 150. The disclosed concepts may be practiced with tertiary frames may made out of any suitable material known in the art or to be developed, including but not limited to rigid and/or elastic metals and plastics.

Figure 55:
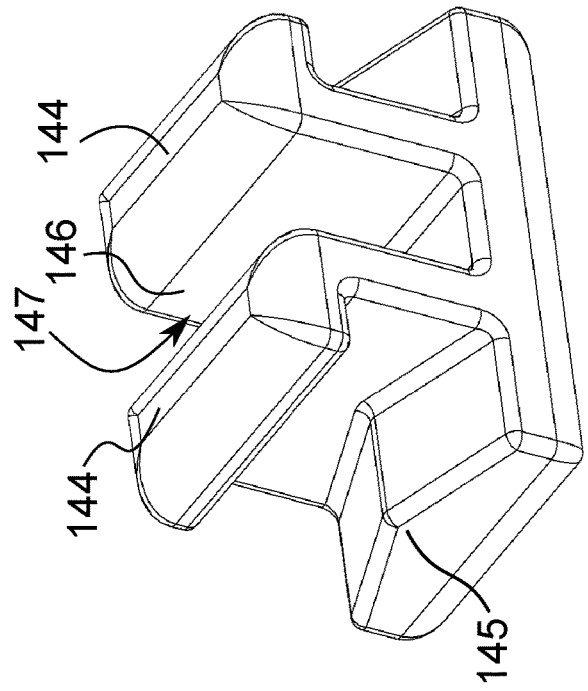
FIG. 55 illustrates a top perspective view of an embodiment of a tertiary frame connector.
Figure 56:
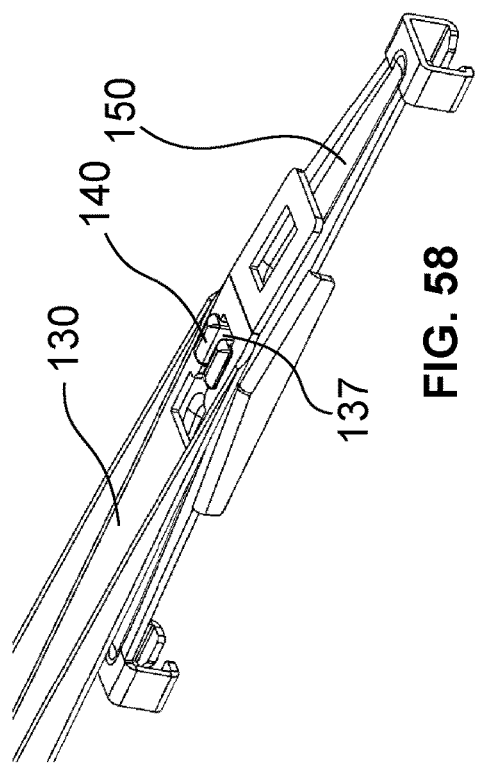
FIG. 56 illustrates a top perspective view of the tertiary frame connector of FIG. 55 connected to a secondary frame and a tertiary frame.
Figure 57:
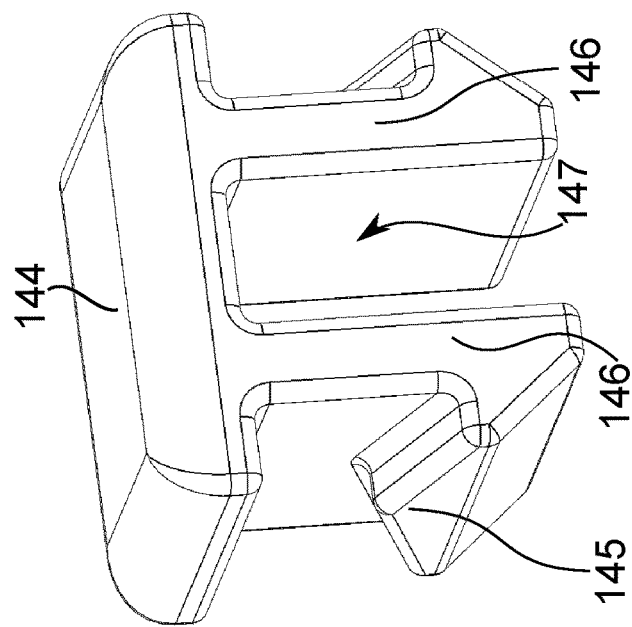
FIG. 57 illustrates a bottom perspective view an embodiment of a tertiary frame connector.
Figure 58:
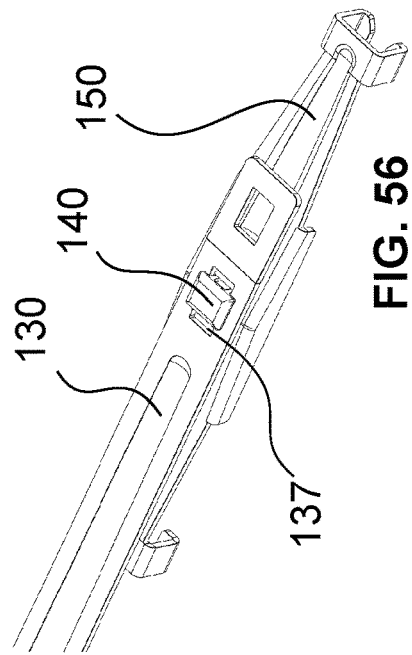
FIG. 58 illustrates a top perspective view of the tertiary frame connector of FIG. 57 connected to a secondary frame and a tertiary frame.

FIGS. 55-60 illustrate alternative embodiments of tertiary connectors and/or holes 137, 152 for receiving same. Referring to FIGS. 55-58, an embodiment of a tertiary frame connector 140 may include a central gap 147 through neck portion 143 that may extend into either bottom portion (as shown for example in FIGS. 55 and 56) or top portion (as shown for example in FIGS. 57 and 58). The edges of central gap 147 may be defined by tertiary frame connector side walls 146, which may be elastically deflectable inward. As shown in FIG. 55, wings 145 may project outward from side walls 146, or from a base, as shown in FIG. 57. Wings 145 may project at an angle which may be acute (as shown for example in FIG. 55) or substantially perpendicular (as shown for example in FIG. 57). Wings 145 may be disposed adjacent to the bottom surface of secondary frame 130 as a tertiary frame 150 is connected with a secondary frame 130, such that they are sized and shaped to hold the tertiary frame 150 to the secondary frame 130. In an embodiment where the gap 147 extends from the top portion 141, the cap 144 may be divided into separate portions which project outwardly from side walls 146 each of which has a substantially flat bottom surface which conformingly fits with the top surface of the secondary frame. In an embodiment where the gap 147 extends from the bottom portion 142, the cap 144 have a substantially flat bottom surface to conformingly fit with the top side of secondary frame 130. Embodiments may include either one or two wings 145. Persons of skill in the art will recognize that tertiary frame connectors 140 such as those depicted in FIGS. 55-58 may be inserted into holes 137, 152 such that the side walls are deflected inwardly until the wings 145 and/or cap 144 passes through the hole, and such that they snap into place once the wings 145 or cap 144 has passed through the holes 137, 152. Alternatively, as shown in FIG. 57 and discussed above, the cap/wings may be inserted into holes 137, 152 and rotated into a securing position. Alternatively, as shown in FIG. 58, the holes 137, 152, may be generally "T" shaped, and may further have a narrower neck between the top bar of the T and the bottom portion of the T. Accordingly, the wings 145 and/or cap 144 may be inserted into the top bar of the "T", and then slid into place, whereby the side walls 146 deflect enough to allow the tertiary connector to pass through the narrower neck into the bottom portion of the "T". Persons of skill in the art will recognize that any suitable combination of shapes and structures discussed herein may be combined and used within the scope of the disclosed concepts to securely connect frame to frame, whether primary, secondary or tertiary.

Figure 59:
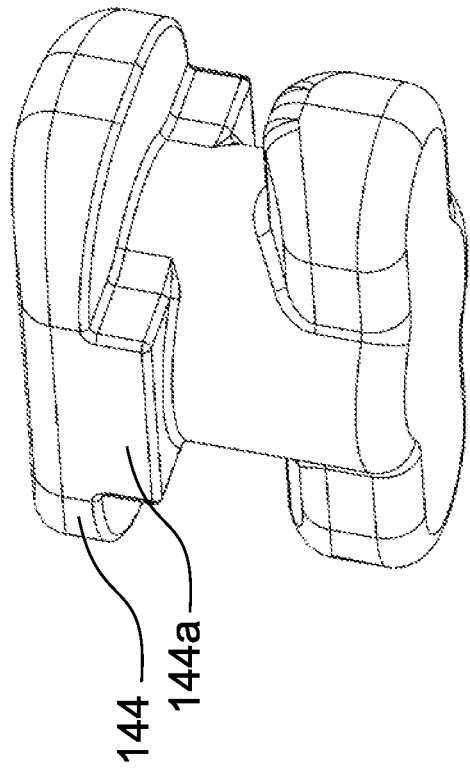
FIG. 59 illustrate a bottom perspective view of an embodiment of a tertiary frame connector.
Figure 60:
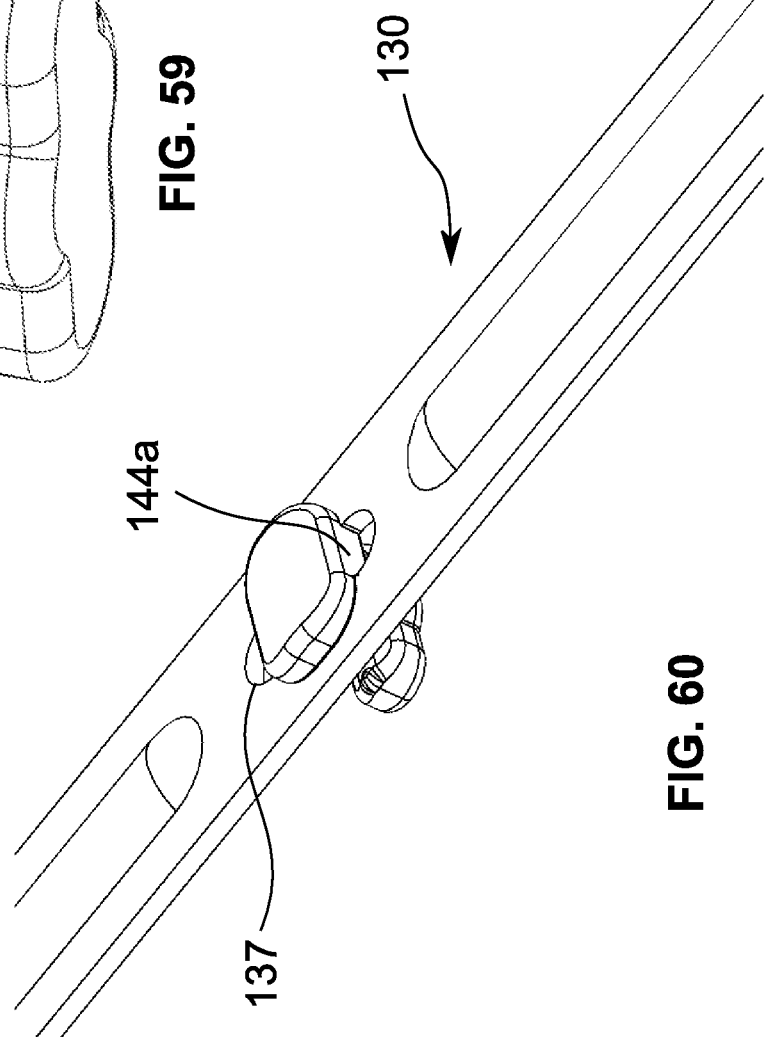
FIG. 60 illustrate a top perspective view of a tertiary frame connector connected to a secondary frame.

With reference to FIGS. 59 and 60, an embodiment of tertiary frame connector 140 may include a cap 144 with one or more underside projections 144*a*. Underside projections 144*a* may secure tertiary frame connector 140 within tertiary connector hole 137 in secondary frame 130. As shown in the illustrated embodiment, a pair of underside cap projections 144a may be provided on opposing sides of neck portion 143, and cap projections 144a may be longitudinally oriented within tertiary connector hole 137 when inserted therein. Tertiary connector hole 137 may be sized and shaped to allow the bottom portion 142 of the tertiary frame connector 140, including the wings 145 to pass through in one orientation. The tertiary connector may then be rotated to fit the underside projections 144a within the tertiary connector hole 137, and the cap 144 may be sized such that it does not fit through the tertiary connector hole 137.

Referring now to FIGS. 61-89, a wiper blade connector assembly 200 may be provided to connect support structure 100, and more particularly to connect to with a wiper connector rivet 102 of a primary frame 110, with a plurality of types of wiper arms 20. Wiper blade connector assembly may include a wiper blade connector 210 and a wiper blade connector cover 230. Wiper blade connector cover 230 may be attached to the wiper blade connector 210 to assist with or facilitate securing a wiper arm 20 inserted between the wiper blade connector 210 and the connector cover 230 (shown more particularly in FIGS. 68-72). The pieces of the connector assembly 200, including the connectors 210, adapters 250 and connector covers 230 disclosed herein may be made out of plastic, or any other suitable material or materials known in the art by a person of skill in the art or to be developed. Additionally, a person of skill in the art will recognize that these connector assemblies are exemplary, and that the disclosed concepts can be practiced with any suitable connector assembly, including other connectors, adapters and connector covers.

Wiper blade connector 210 may include a first side portion 211, a second side portion 212, and center portion 213. The first side portion may be located on the distal end of the connector, while the second side portion may be located on the proximal end of the connector. A side wall 214 may be provided on each lateral edge of wiper blade connector 210 over one or more of each portion 211, 212, 213, and may include inner portions as well as outer portions. In the illustrated embodiment, a pair of side walls 214 are provided along first side portion 211 and center portion 213. The top surface 215 of side walls 214 at first side portion 213 may be downwardly and acutely angled with respect to the top surface 215 of side walls 214 at central portion 213. The bottom surface 216 of side walls 214 may have varied elevations depending on the portion of the side walls 214. For instance, in the illustrated embodiment bottom surface 216 is positioned at a first elevation at first side portion 211 and center portion 213 proximate the first side portion, while bottom surface 216 of the outer side wall is positioned at a second, higher elevation at center portion 213 proximate the second side portion 212. Similarly, the bottom portion of the inner side wall is located at a lower elevation adjacent to a hook end stop 226. Between the first and second elevations of bottom surface 216 may be a rivet cutout 217 to accommodate an inserted wiper connector rivet 102. Rivet cutout 217 may extend laterally between side walls 214 adjacent to a rivet clip and a rivet passage disposed on the bottom of the center portion 222 of the connector. The rivet clip and rivet passage may form an "L" shape, and rivet 102 may be snap fit insertable therein. In the first side portion 211, the inner surface of side wall 214 may include an inner ledge 218 including a primary frame stop cutout 219. As shown more particularly in FIG. 87, stops 116 on primary frame 110 may be contactable with bottom surface 216 at the second side portion 212, while stops 116 adjacent to the first side portion 211 may be contactable with stop cutouts 219 to prevent over rocking of connector 210. In some embodiments stop cutouts 219 may be provided in the second side portion.

Figure 61:
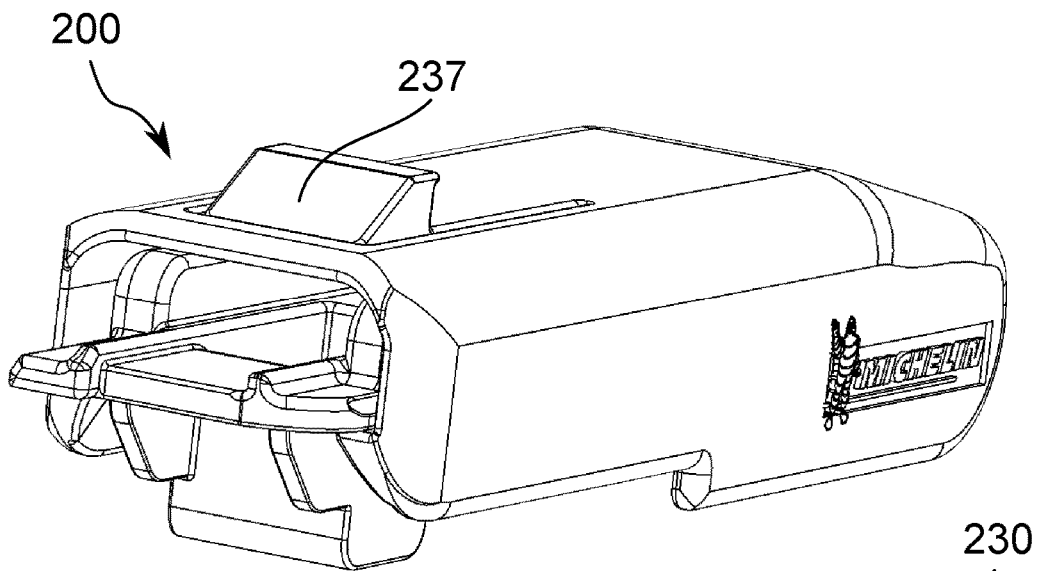
FIG. 61 illustrates a top perspective view of an embodiment of a wiper blade connector assembly, including a wiper blade connector cover and a wiper blade connector.
Figure 62:
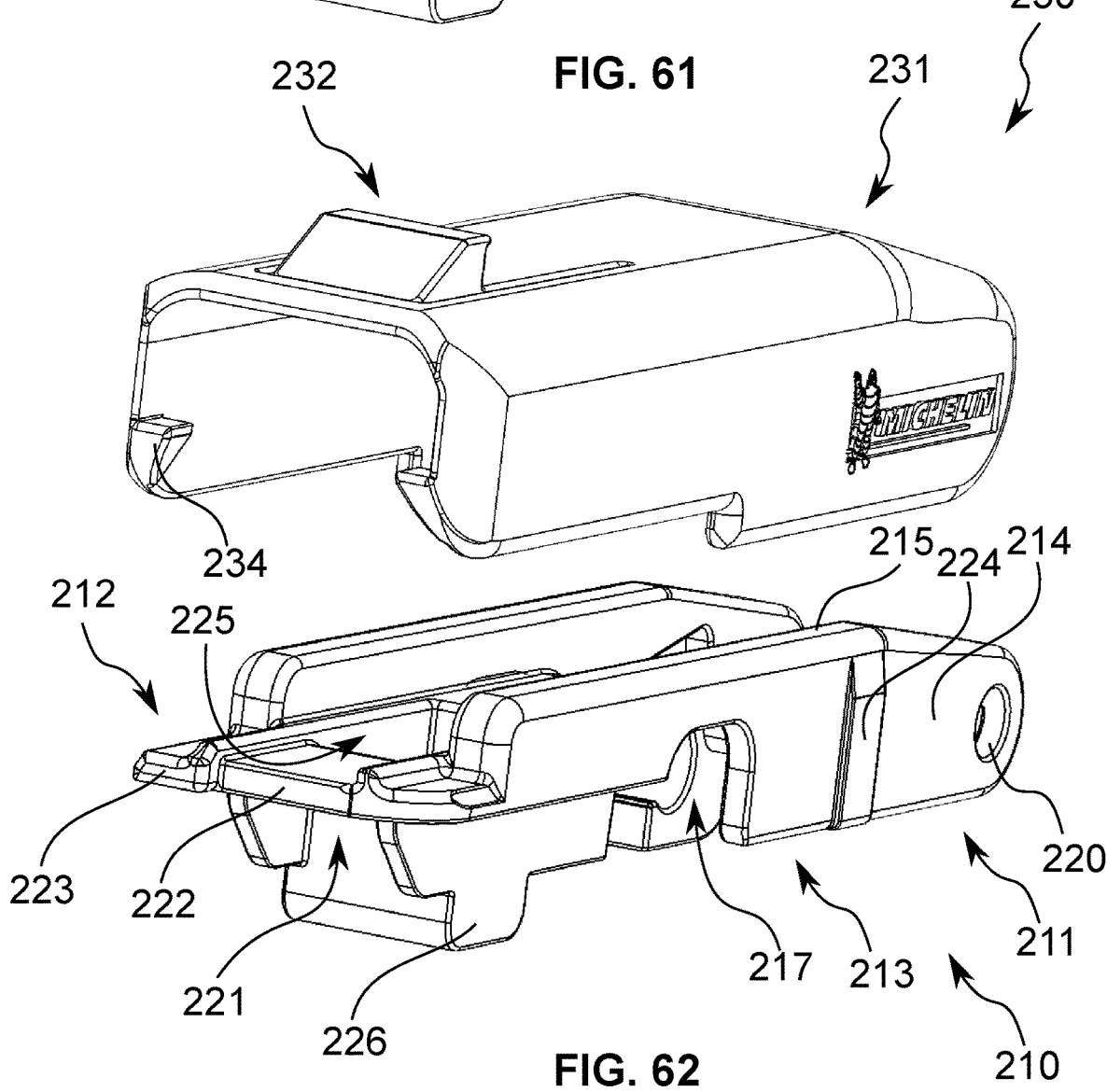
FIG. 62 illustrates an exploded top perspective view of the wiper blade connector assembly of FIG. 61.
Figure 63:
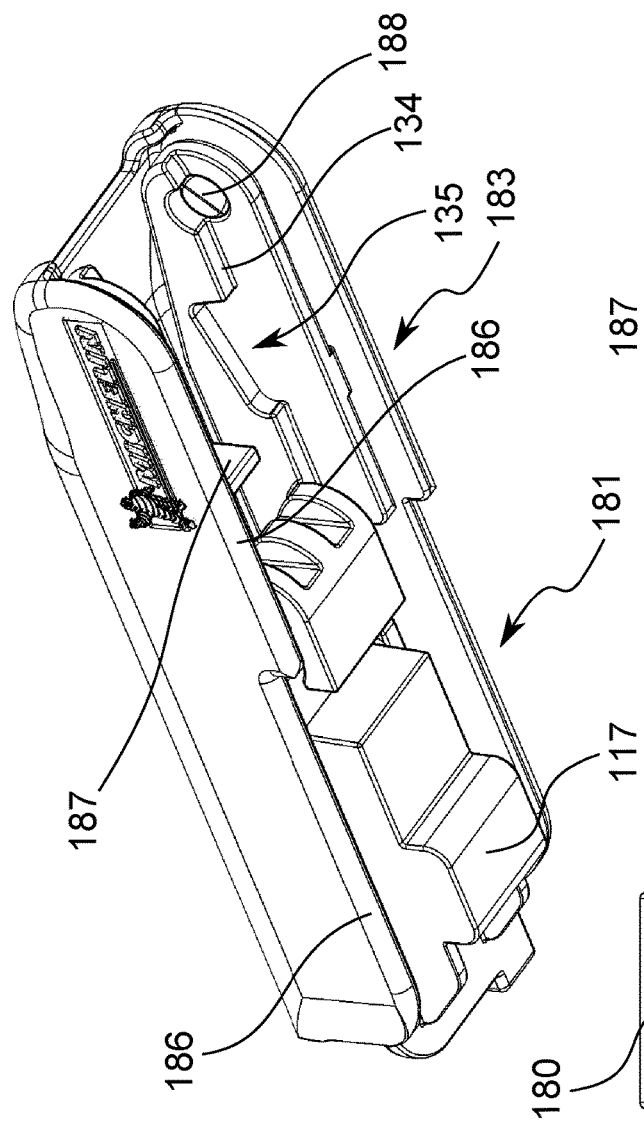
FIG. 63 illustrates a bottom perspective view of the wiper blade connector assembly of FIG. 61.
Figure 65:
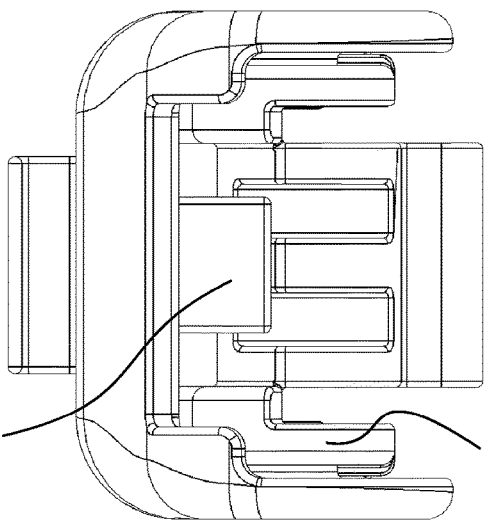
FIG. 65 illustrates an opposing side back view of the wiper blade connector assembly of FIG. 61.
Figure 64:
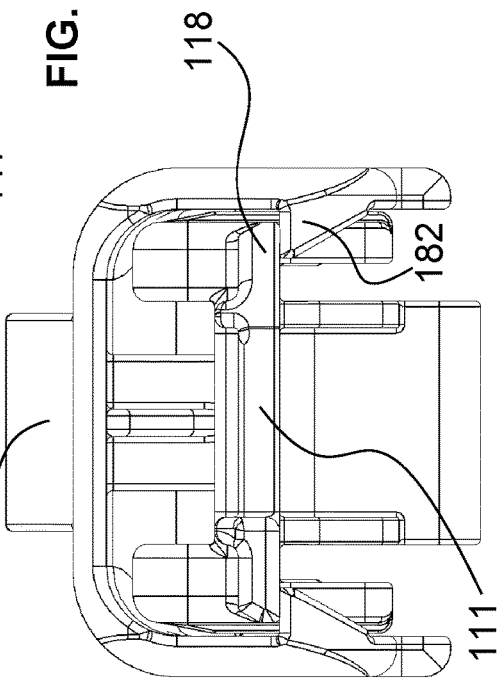
FIG. 64 illustrates a side view of the wiper blade connector assembly of FIG. 61.
Figure 66:
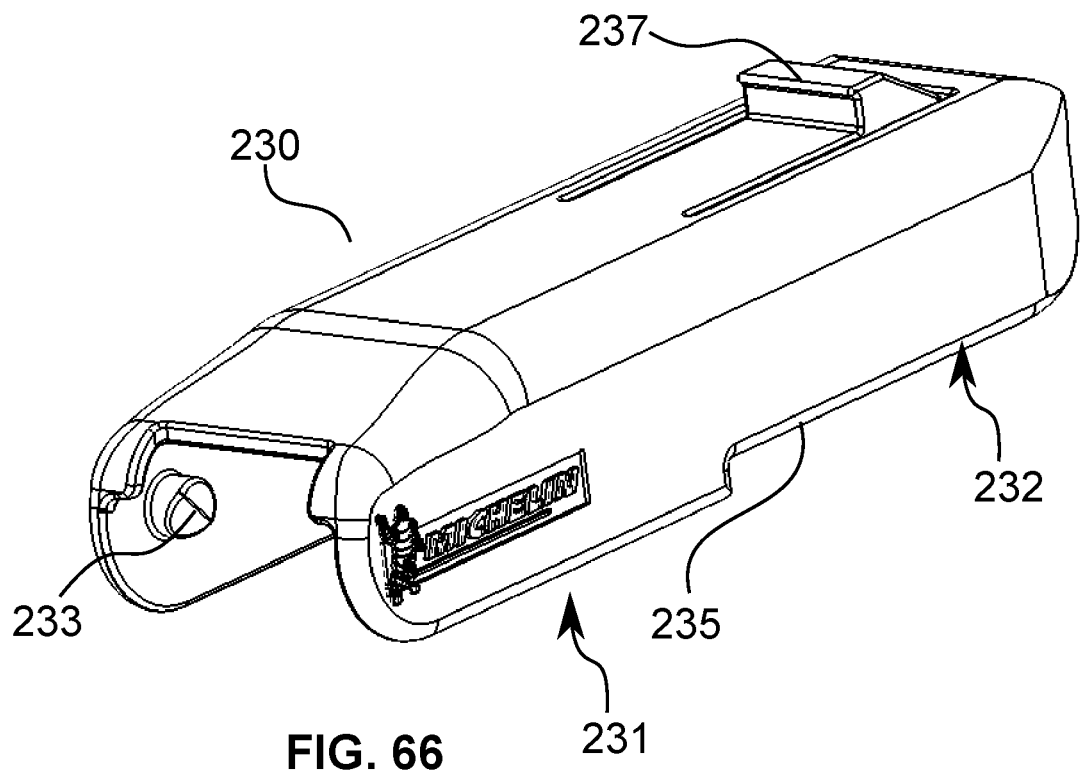
FIG. 66 illustrates a top perspective view of the wiper blade connector cover of FIG. 61.
Figure 67:
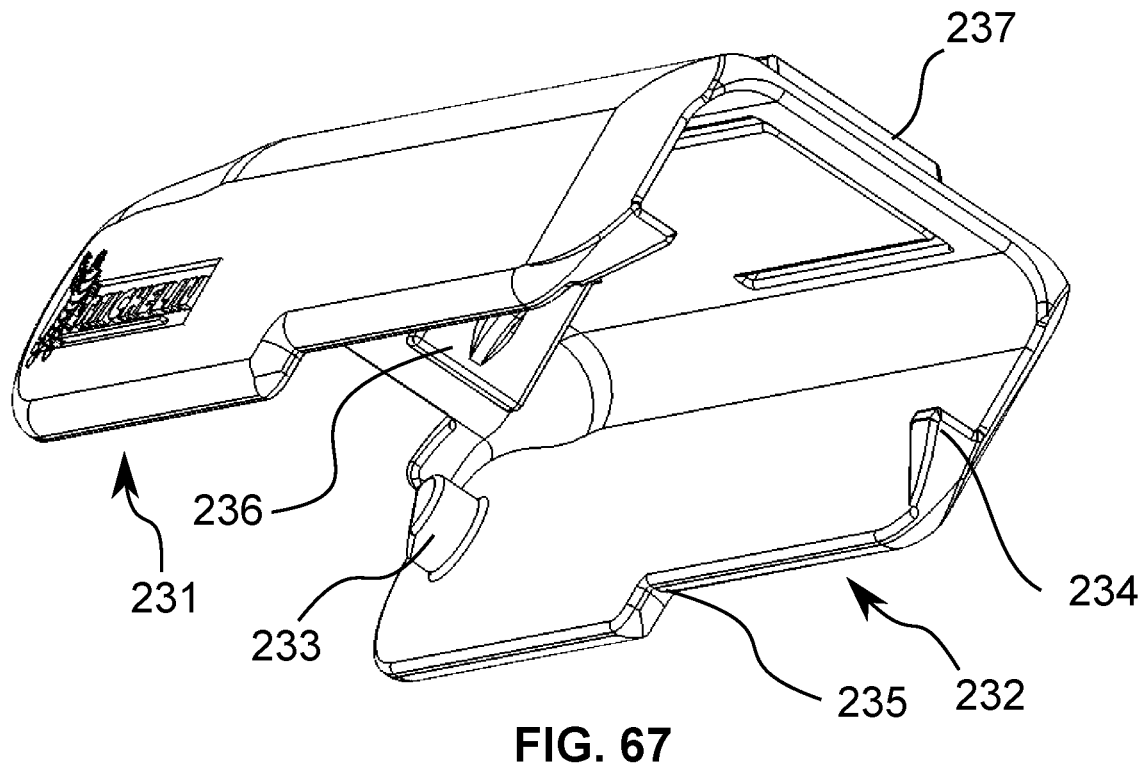
FIG. 67 illustrates a bottom perspective view of the wiper blade connector cover of FIG. 61.
Figure 68:
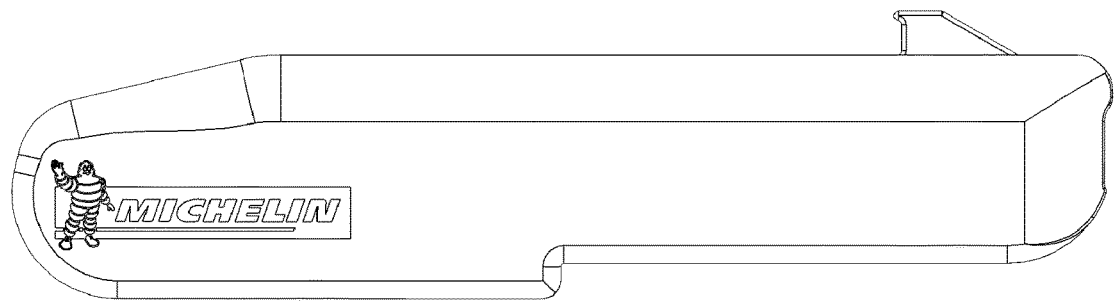
FIG. 68 illustrates a front view of the wiper blade connector cover of FIG. 67.
Figure 69:
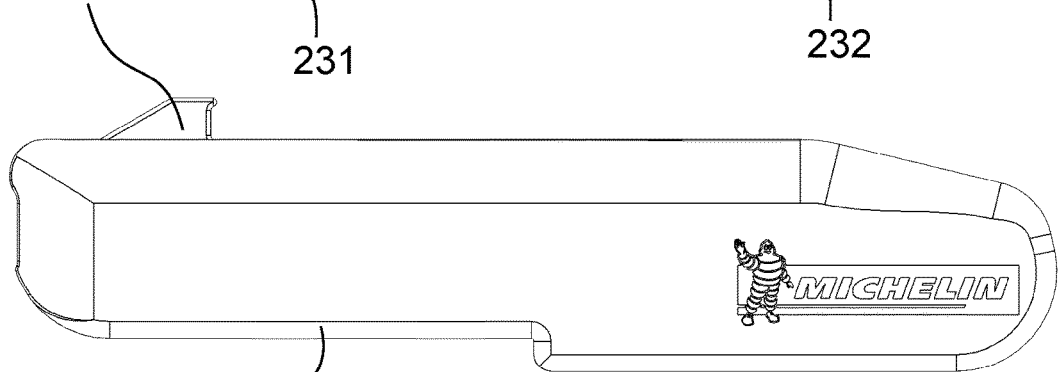
FIG. 69 illustrates a back view of the wiper blade connector cover of FIG. 67.
Figure 70:
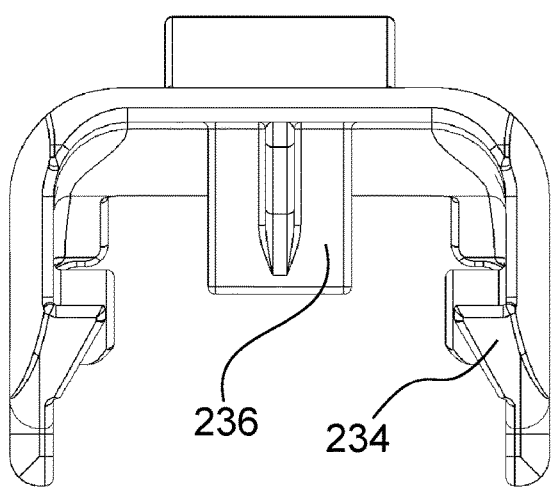
FIG. 70 illustrates a side view of the wiper blade connector cover of FIG. 67.
Figure 71:
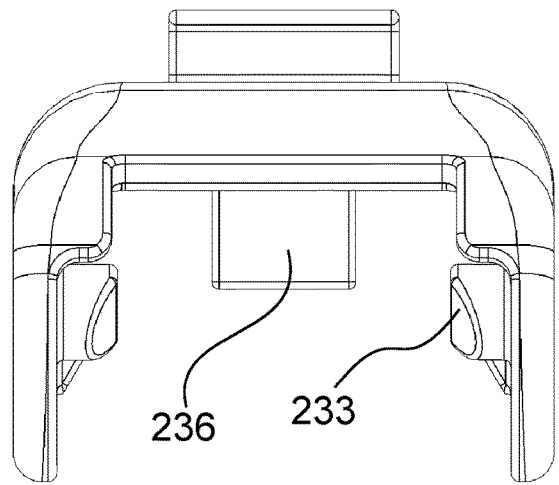
FIG. 71 illustrates an opposing side view of the wiper blade connector cover of FIG. 67.
Figure 72:
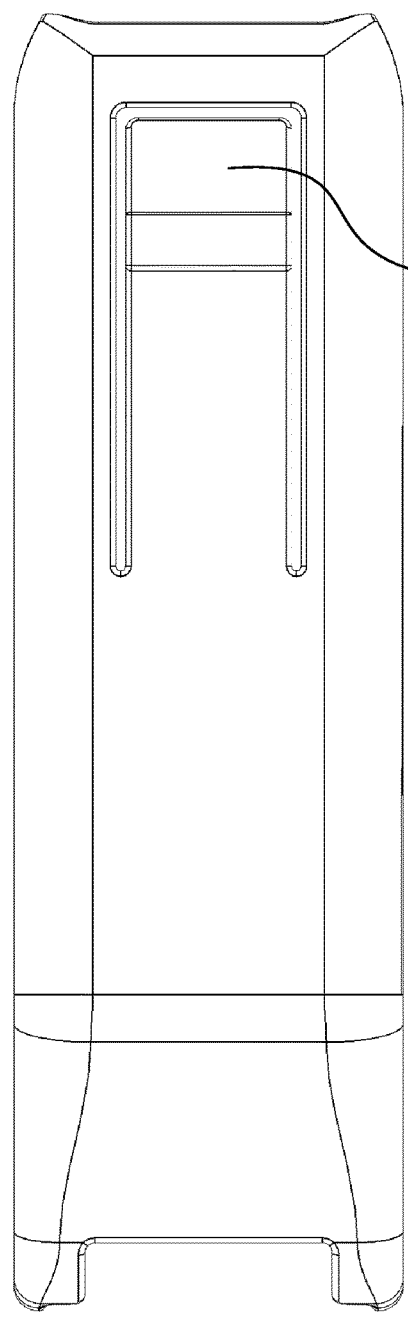
FIG. 72 illustrates a top view of the wiper blade connector cover of FIG. 67.
Figure 73:
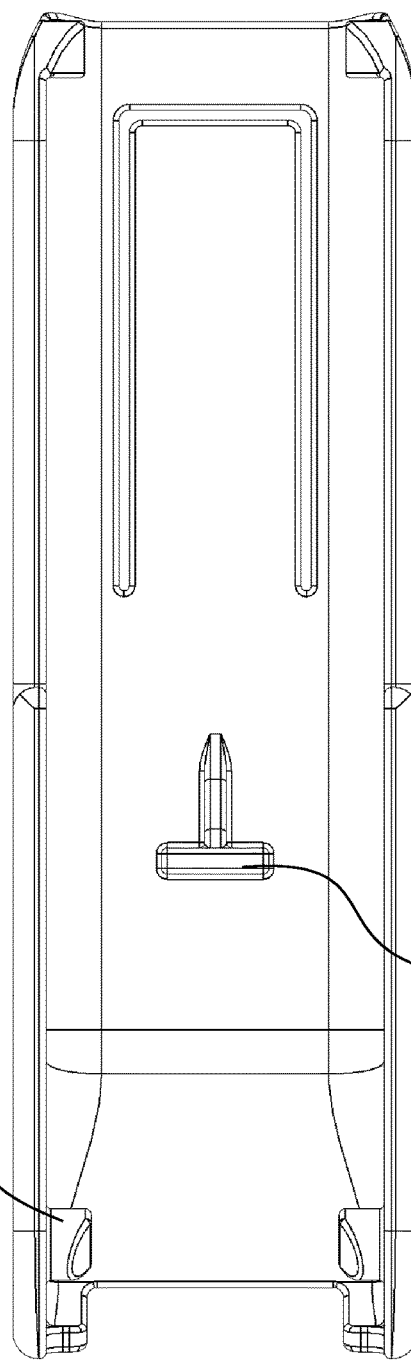
FIG. 73 illustrates a bottom view of the wiper blade connector cover of FIG. 67.
Figure 74:
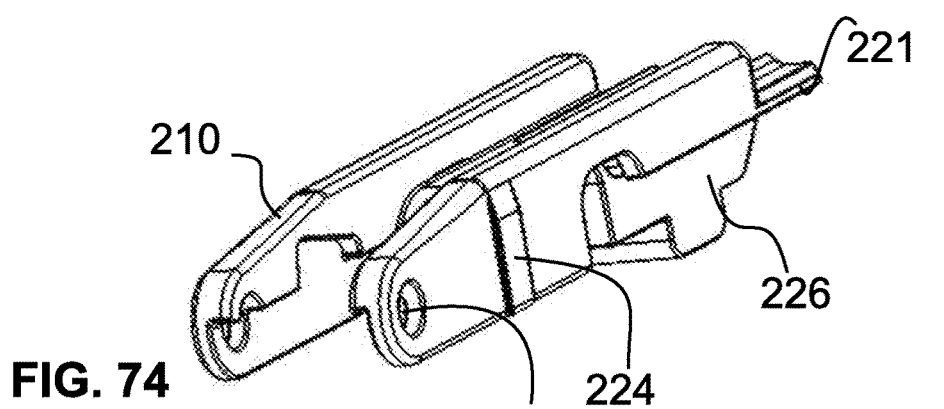
FIG. 74 illustrates a top perspective view of the wiper blade connector of FIG. 61.
Figure 75:
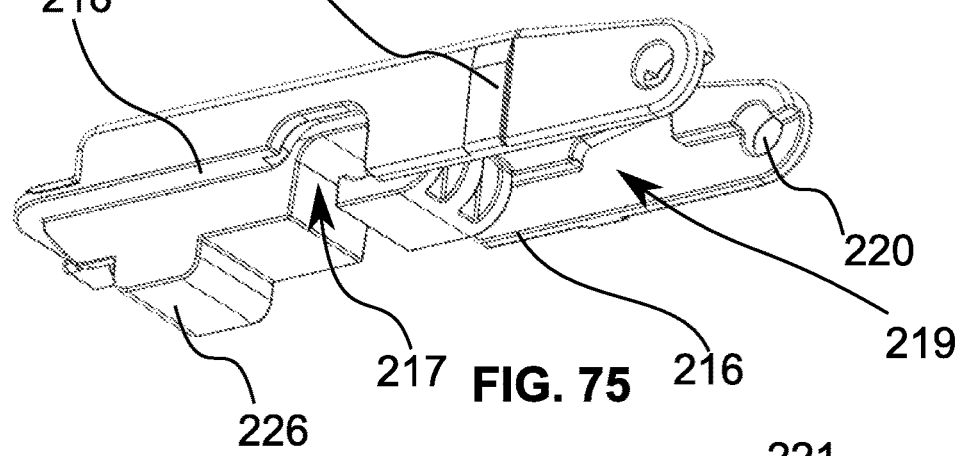
FIG. 75 illustrates a bottom perspective view of the wiper blade connector of FIG. 74.
Figure 76:
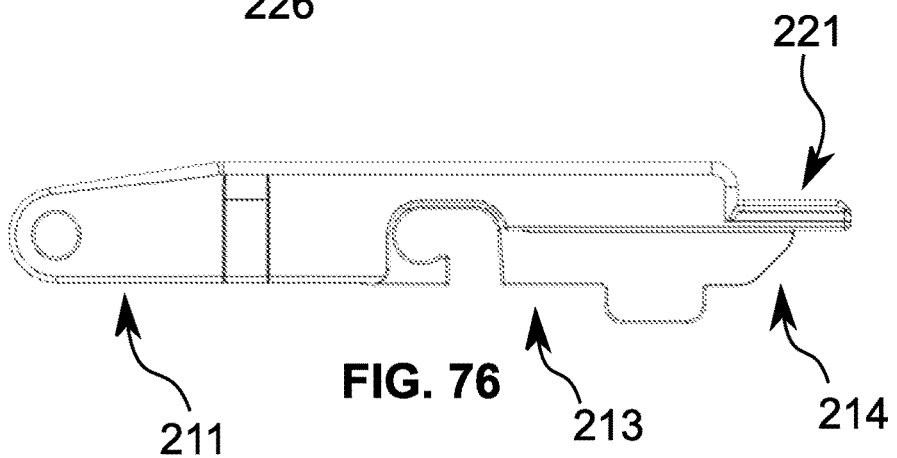
FIG. 76 illustrates a front view of the wiper blade connector of FIG. 74.
Figure 77:
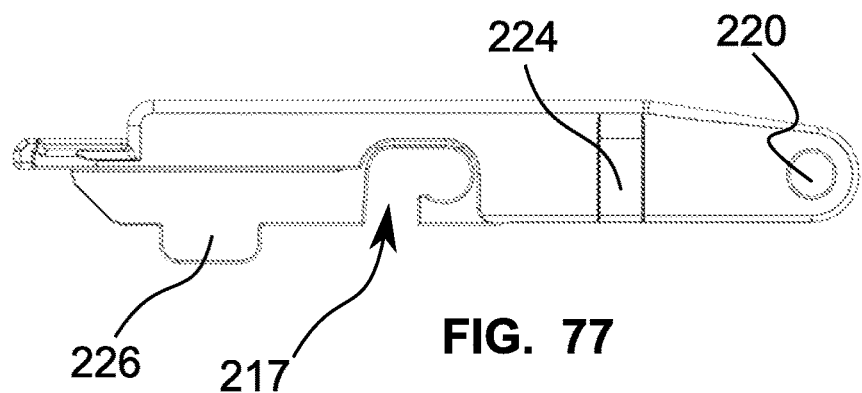
FIG. 77 illustrates a back view of the wiper blade connector of FIG. 74.
Figure 78:
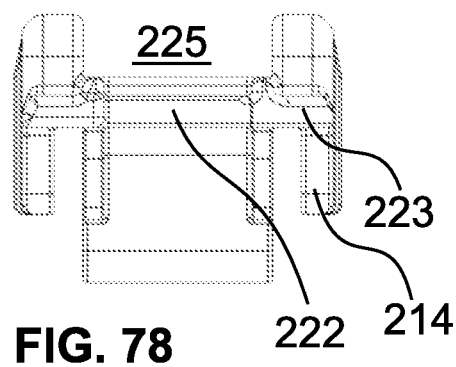
FIG. 78 illustrates a side view of the wiper blade connector of FIG. 74.
Figure 79:
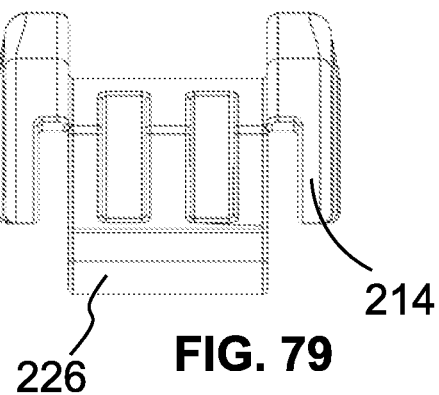
FIG. 79 illustrates an opposing side view of the wiper blade connector of FIG. 74.
Figure 80:
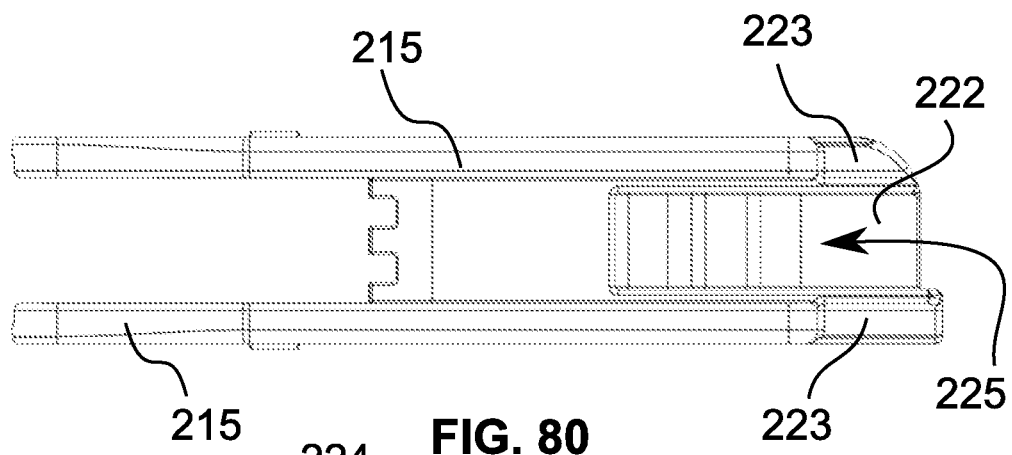
FIG. 80 illustrates a top view of the wiper blade connector of FIG. 74.
Figure 81:
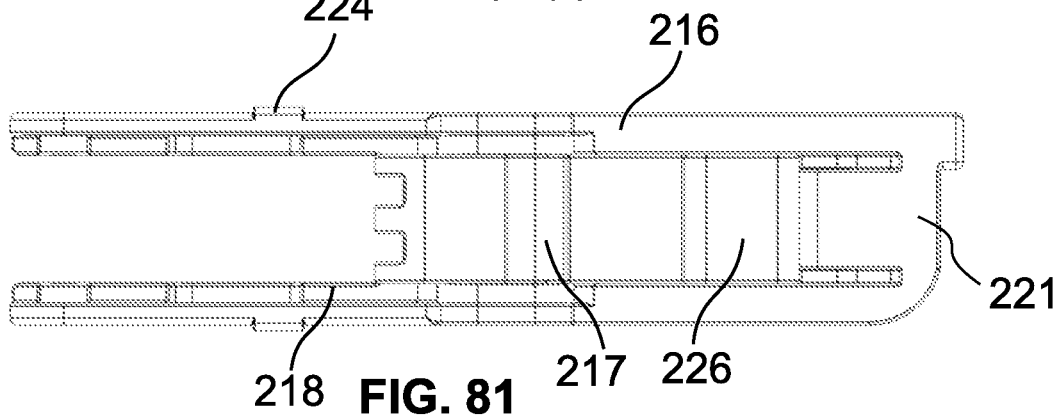
FIG. 81 illustrates a bottom view of the wiper blade connector of FIG. 74.
Figure 82:
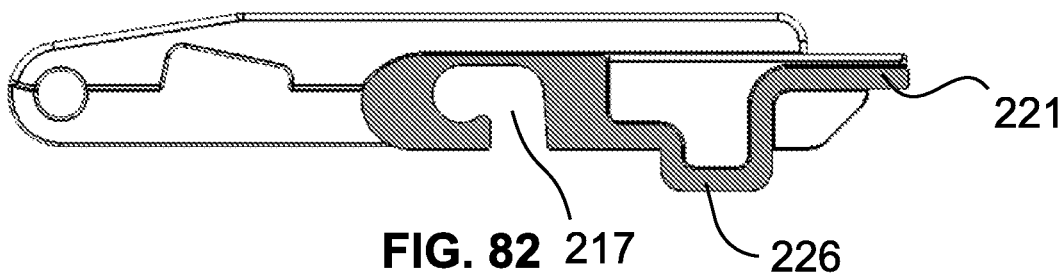
FIG. 82 illustrates a front view of a longitudinal cross-section of the wiper connector of FIG. 74.
Figure 83:
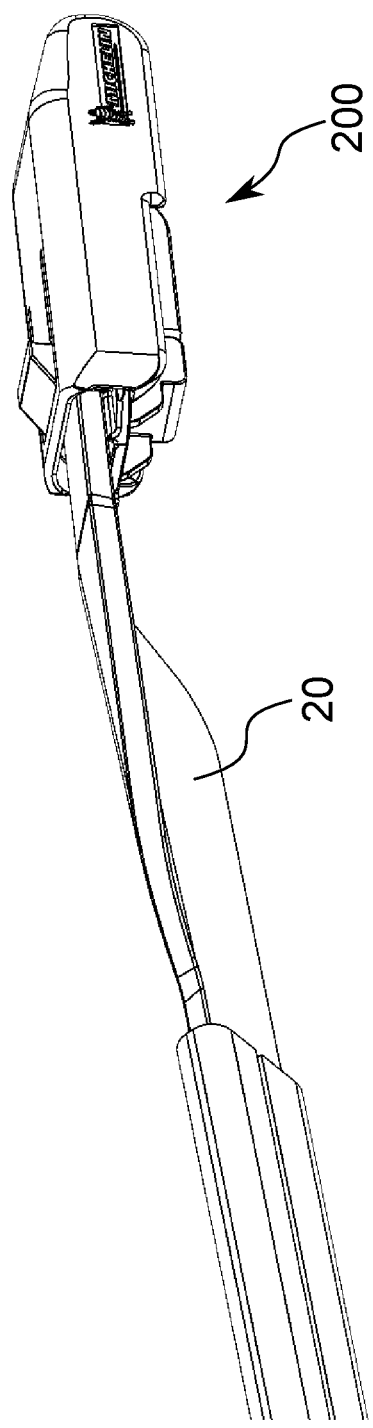
FIG. 83 illustrates a top perspective view of a wiper arm connected with the wiper blade connector assembly of FIG. 61.
Figure 84:
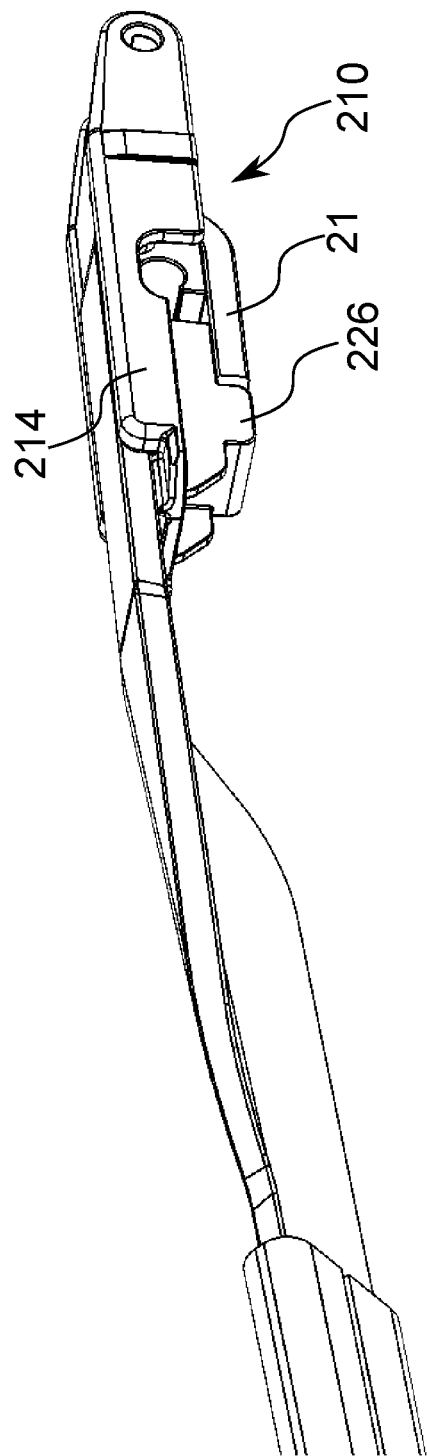
FIG. 84 illustrates a top perspective of a wiper arm connected with the wiper blade assembly of FIG. 83 with the wiper blade connector cover removed.
Figure 87:
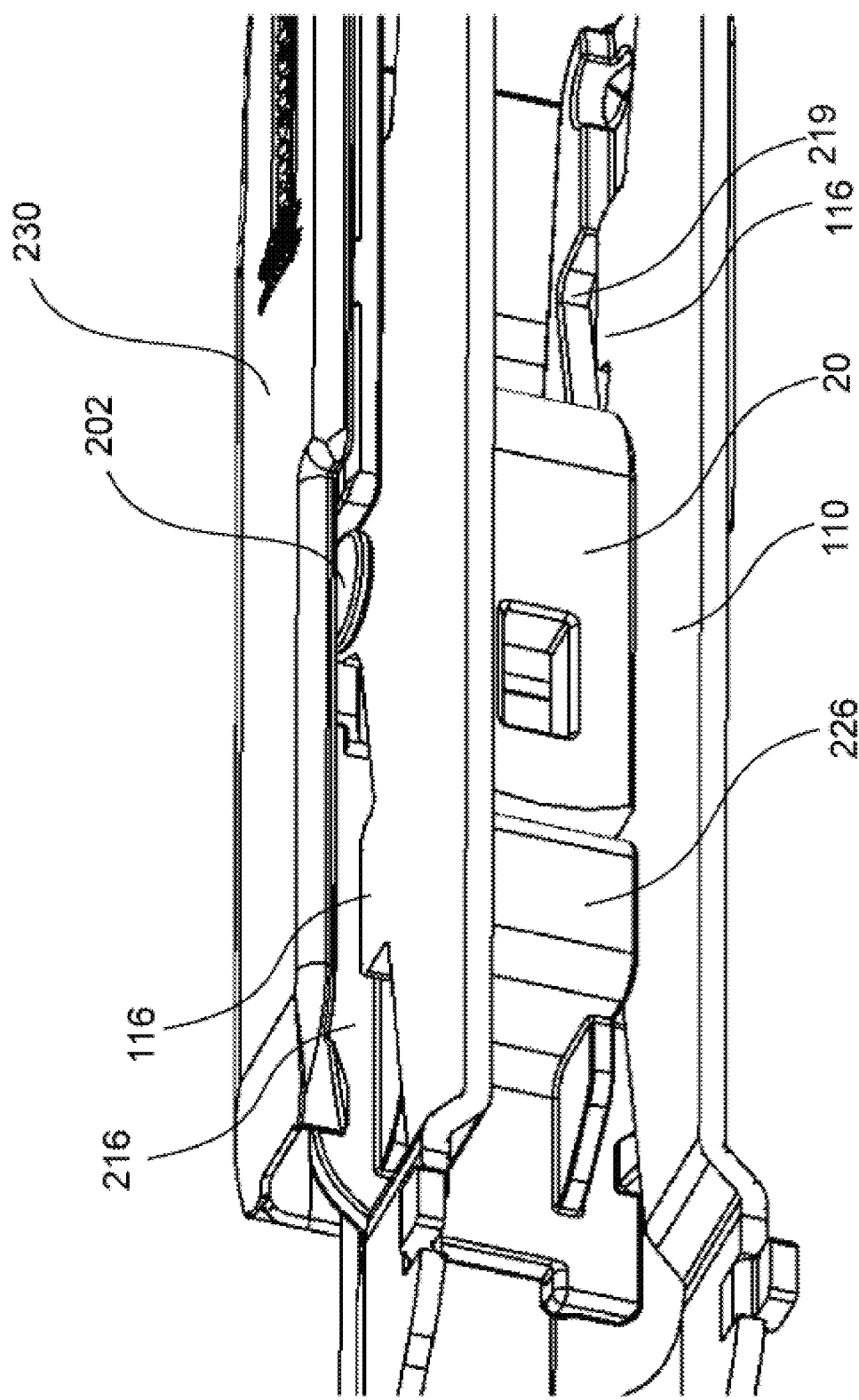
FIG. 87 illustrates a bottom perspective view of the wiper arm connected with the wiper blade connector assembly of FIG. 83 and an embodiment of a primary frame and primary frame rivet.

On the first side portion 211, connector cover receiving structures, such as connector cover receiving holes 220 or recesses may be provided on each side wall 214. Each connector cover hole 220 may be engageable with a connector hole rod 232 provided on an inner surface of connector cover 230. Persons of skill in the art will recognize that this relationship may be reversed, such that the rods or projections are on the connector 210 while the recesses or holes are on the connector cover 230, and that any other suitable connection structure known in the art or to be developed can be used in accordance with the disclosed concepts. On the second side portion 212, a shelf 221 may be provided with having a center section 222 and lateral wings 223. Reinforcing ribs may be located there between along the top surface of the shelf 221. Similarly, internal side walls 214 may form reinforcing ribs underneath the bottom surface of the shelf 221. The center portion 222 of the shelf 221 may be integrated with the lateral wings 223, as shown in FIGS. 61-82, or the center portion may be cantilevered and capable of moving relative to the lateral wings 223, as shown in FIGS. 126-130 and discussed below. Connector cover tabs 234 may be provided on an inner surface of connector cover 230, and connector cover tabs 234 may be engageable by snap-fit with lateral wings 223, as shown in FIG. 61. Alternatively, this relationship may be swapped, with claws or projections on the connector 210 engaging holes, recesses or shelves on the connector cover within the scope of the disclosed concepts. Connector cover 230 may rotate about a connector cover axis extending laterally through connector cover holes 220. In an open position, connector cover 230 may accommodate the insertion of a wiper arm 20 into connector 210, and then be rotated downward into a closed position to secure the inserted wiper arm 20 with the connector cover 230 locking into the closed position by engagement of tabs 234 with wings 220. One or more side walls may also include an outward protrusion 224 positioned on the central portion 213 proximate the first side portion 211.

Connector cover 230 may include a first portion 231 and a second portion 232 defined at longitudinally opposed ends. The first portion may be located on the distal end of the connector, while the second portion may be located on the proximal end of the connector. A pair of the aforementioned connector hole rods 233 may be provided on opposing inner surfaces in the first portion 231, with each rod 233 projecting inwardly so as to engage hole 220. As previously discussed, this relationship may be swapped, or any other suitable connection method known in the art may be used. A pair of the aforementioned connector cover tabs 234 may be provided on the second portion 232. As previously discussed, this relationship may be swapped, or any other suitable connection method known in the art may be used. Connector cover 230 may further include a bottom edge 235. The bottom edge 235 may have a first, lower elevation at the first portion 231 of the connector cover 230, and a second, higher elevation, at the second portion 232. The change in elevation may be made at 90 degree angles such that it acts as a stop for claws 23 of a wiper arm 20.

Embodiments of connector cover 230 are generally shown and described herein as substantially covering the length of embodiments of connector 210 in a locked or secured position. However, embodiments where connector cover 230 only covers a significantly smaller portion of connector 210 are contemplated within the disclosure. For example, connector cover tabs 234 may engaged with first portion 211 of connector 210 rather than second portion 212 as generally shown and described. An example of this shorter connector cover embodiment is shown as FIG. 13 in U.S. Prov. Patent No. 62/538,368, the contents of which are incorporated herein by reference.

As shown in FIGS. 83-87, Wiper arms 20 having hooks 21 may be connected with wiper blade connector assembly 200 by placing the connector cover 230 in an open position, inserting the hook end of the wiper arm 20 into the connector 210, pulling the wiper arm 20 so that until it snuggly fits into a connector channel 225 and the end of the hook contacts a hook end stop 226 on the bottom side of connector 210, and rotating connector cover 230 into its closed position. On the underside surface of connector cover 230 may be a hook stop 236 to further secure the curved end of the hook type warm in when connector cover 230 is in the closed position.

Figure 88:
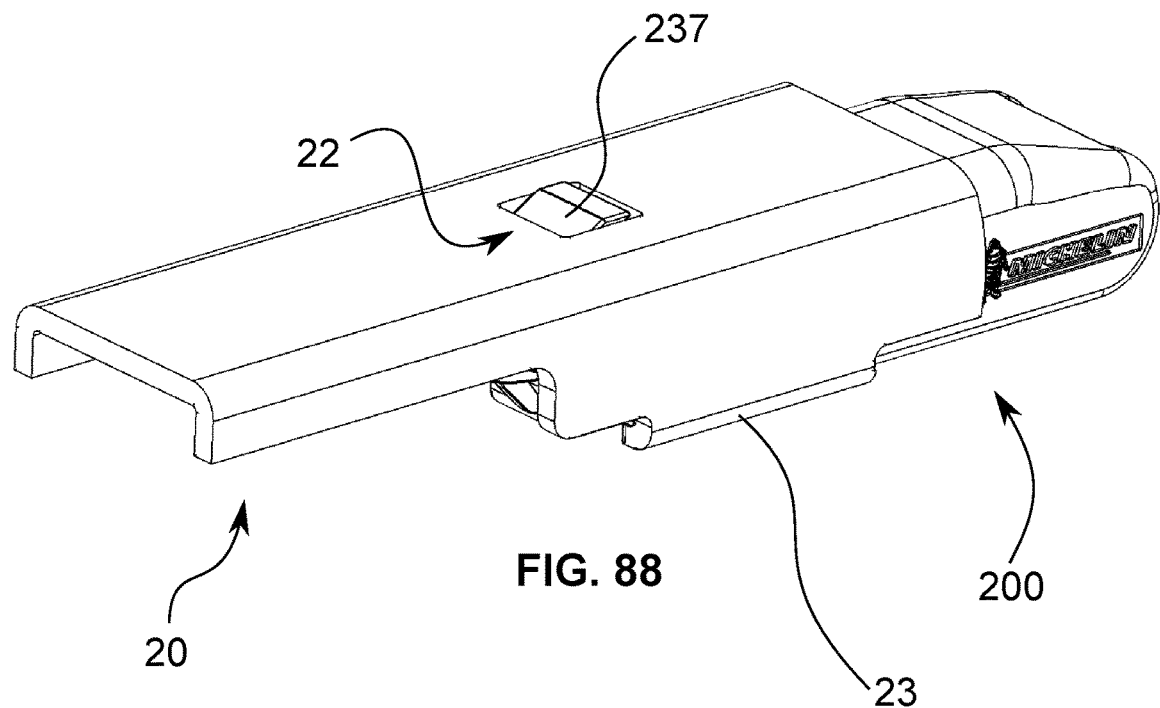
FIG. 88 illustrates a top perspective of an embodiment of a wiper arm connected with the wiper blade connector assembly of FIG. 61.
Figure 89:
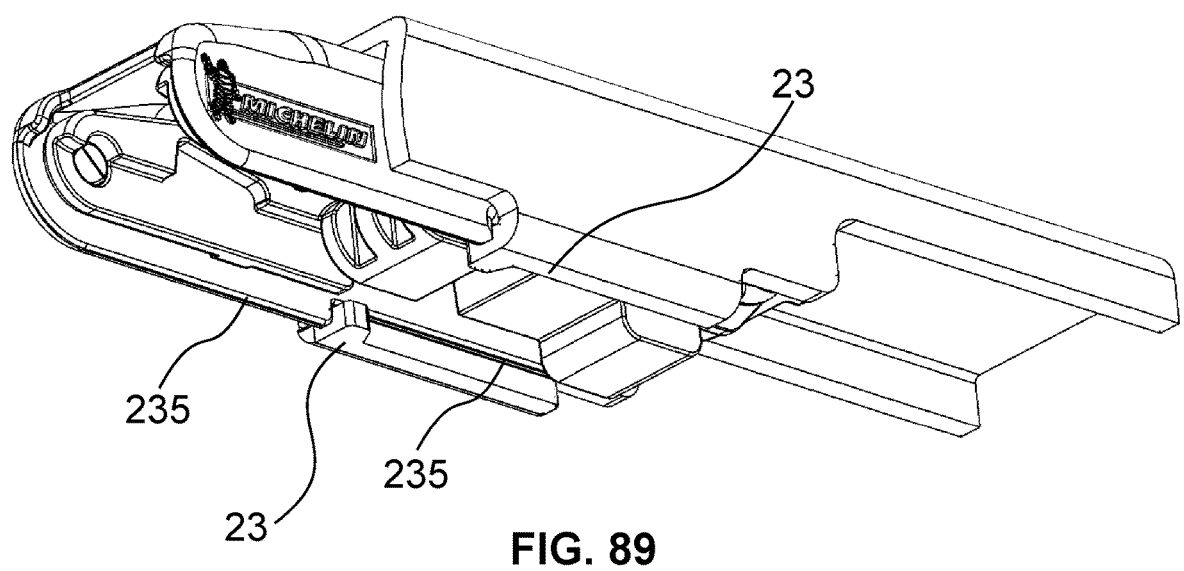
FIG. 89 illustrates a bottom perspective of the wiper arm connected with the wiper blade connector assembly of FIG. 88.
Figure 90:
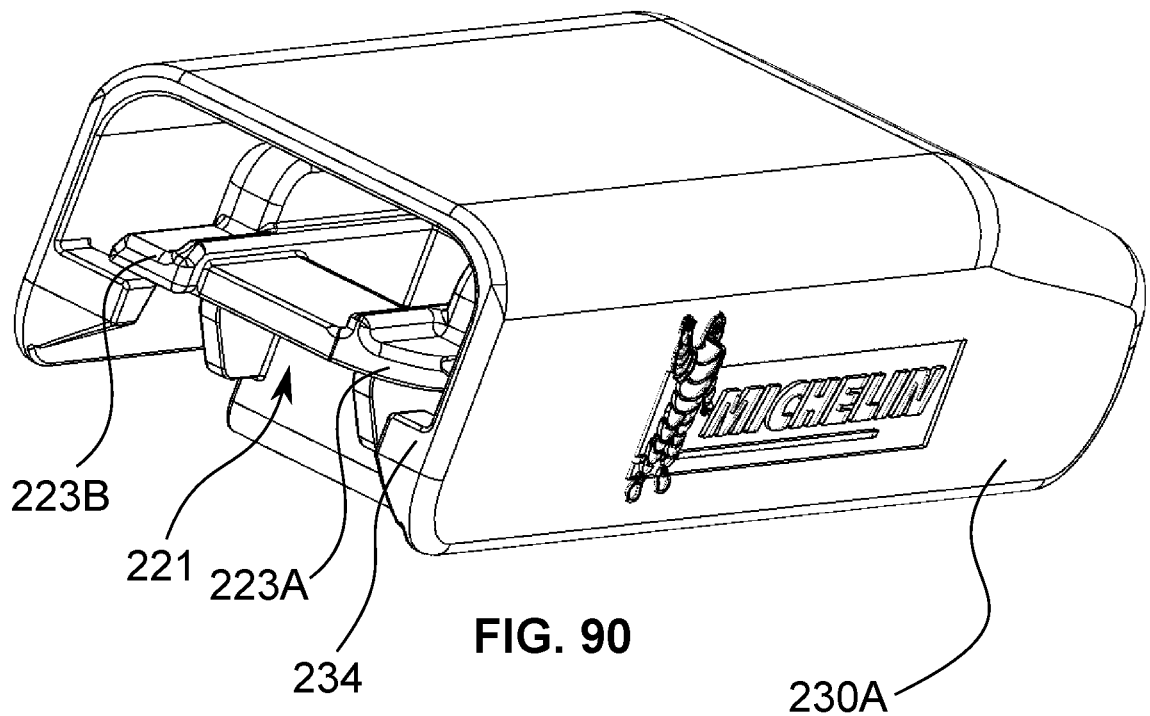
FIG. 90 illustrates a top perspective of an embodiment of a wiper blade connector assembly, including a wiper blade connector cover and a wiper blade connector.
Figure 91:
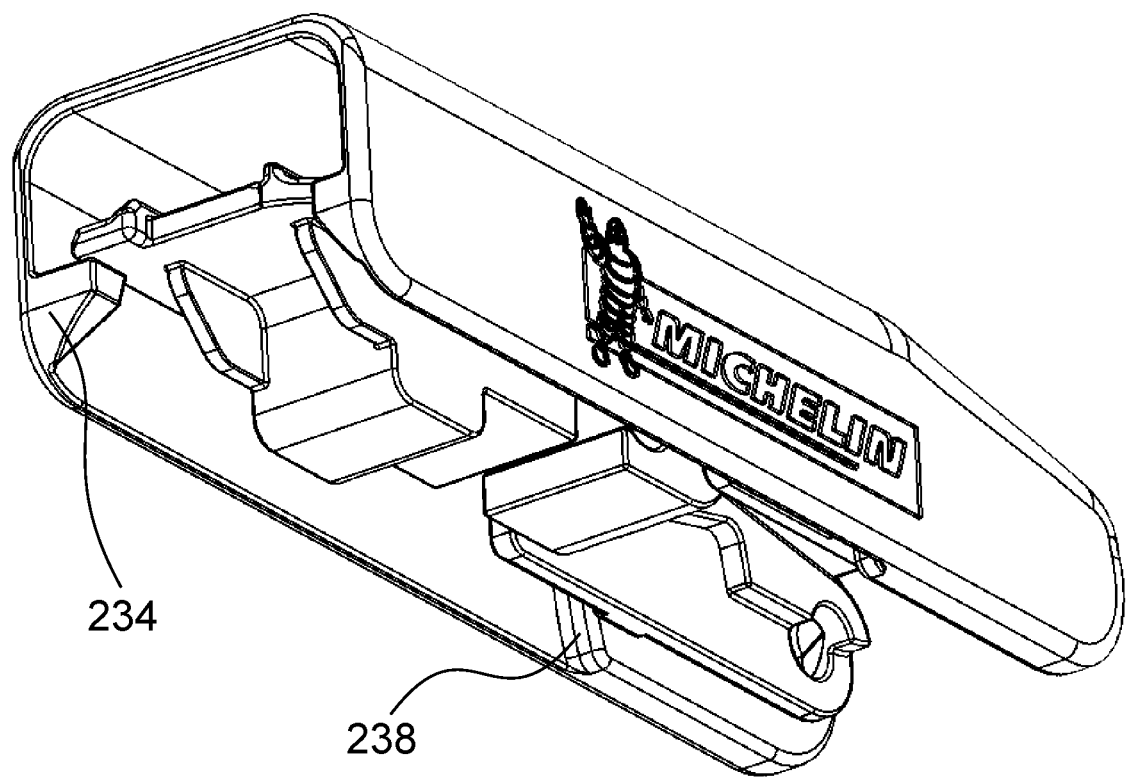
FIG. 91 illustrates a bottom perspective of the wiper blade connector assembly of FIG. 90.
Figure 92:
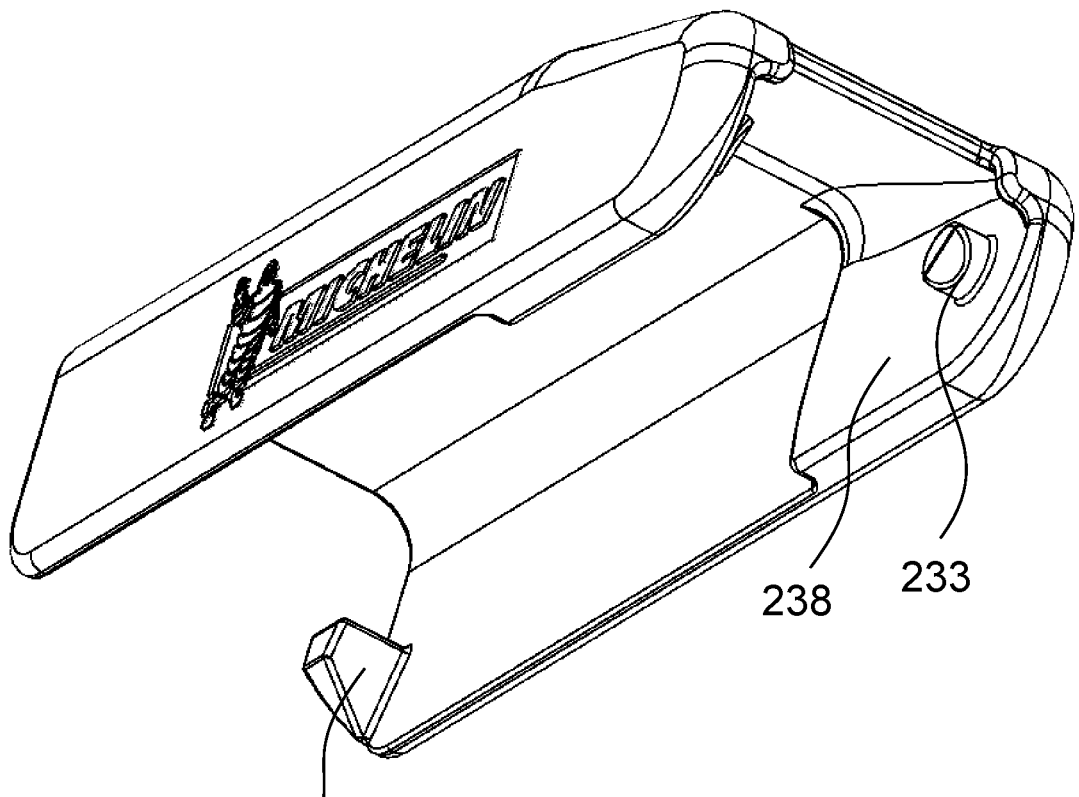
FIG. 92 illustrates a bottom perspective of the connector cover of the wiper blade connector assembly of FIG. 90.
Figure 93:
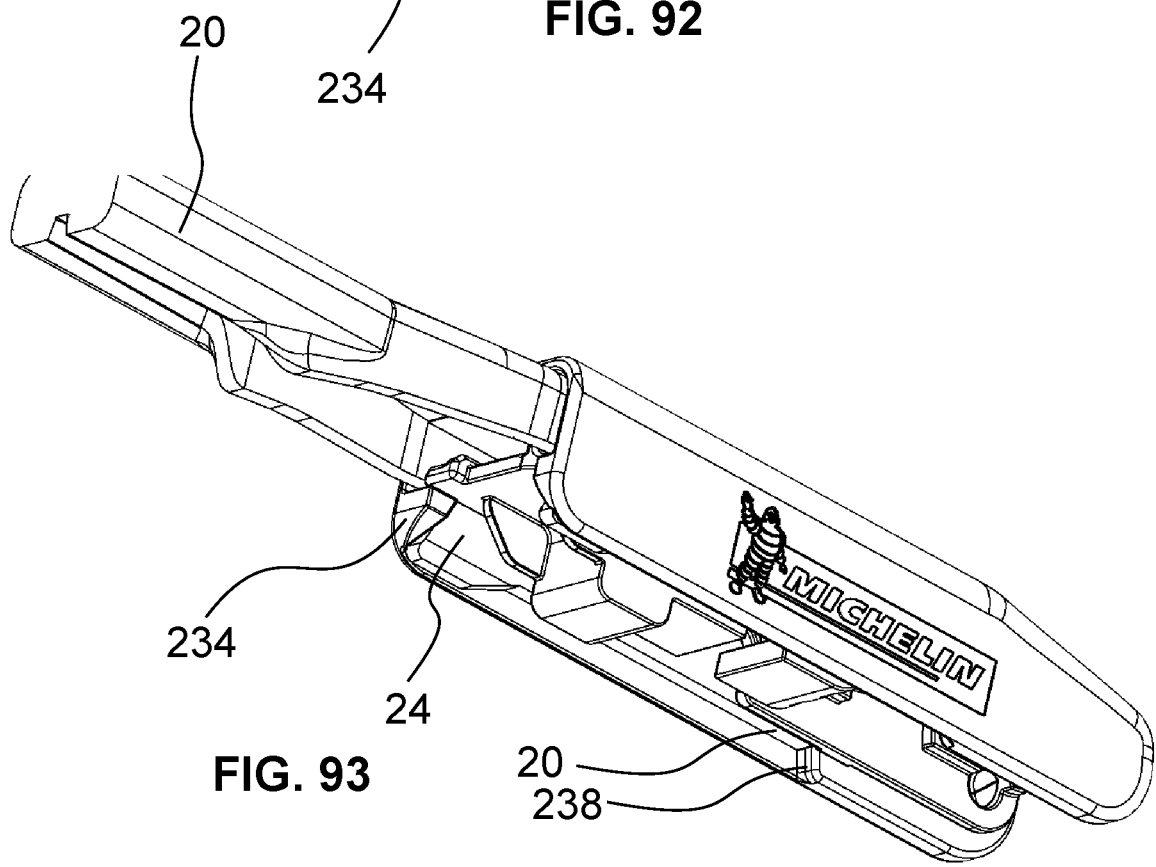
FIG. 93 illustrates a bottom perspective of a wiper arm connected with the wiper blade connector assembly of FIG. 90.

As shown in FIGS. 88-89, connector assembly 200 may also be connected with wiper arms 20 having openings 22 and/or underside ledges 23. A resilient button 237 may be provided on the top surface of connector cover 230. Button 237 may protrude upwards and be provided on a cantilever on the top surface of connector cover 230. A wiper arm 20 may engage with connector cover 230 by having button 237 inserted into opening 22 while underside ledges 23 are fit underneath the bottom surface 235, which may be the portion of bottom surface 235 with a higher elevation on the second portion 232. The button 237 may have a chamfered top surface to facilitate engaging with the opening 22.

With reference now to FIGS. 90-103, an embodiment of connector assembly 200 may include an embodiment of connector cover 230A connectable with connector 210. Connector cover 230A may be longer than connector cover 230. As such, connector 210 may include two different types of wings 223 as part of shelf 221. Wings may include a first wing 223A longitudinally projecting first distance, while a second wing 223B may longitudinally project a second distance further than first. Additionally, a first wing 223 may have a rounded corner, while a second wing 223B may have a more rectangular corner. Having two differently dimensioned wings 223A, 223B may allow for multiple sized connector covers 230 having differently sized and/or positioned tabs 234 to be used with the same connector 210, and may further allow the connector 210 to connect to arms having an offset engagement portion, and those having a linear engagement portion, as shown in FIG. 153. Connector cover 230A may also include one or more inner platforms 238 provided on the inner surface of connector cover 230A at or proximate first end 231, which increase the thickness of the connector cover side walls. Rods 233 may project from the platforms 238.

Figure 94:
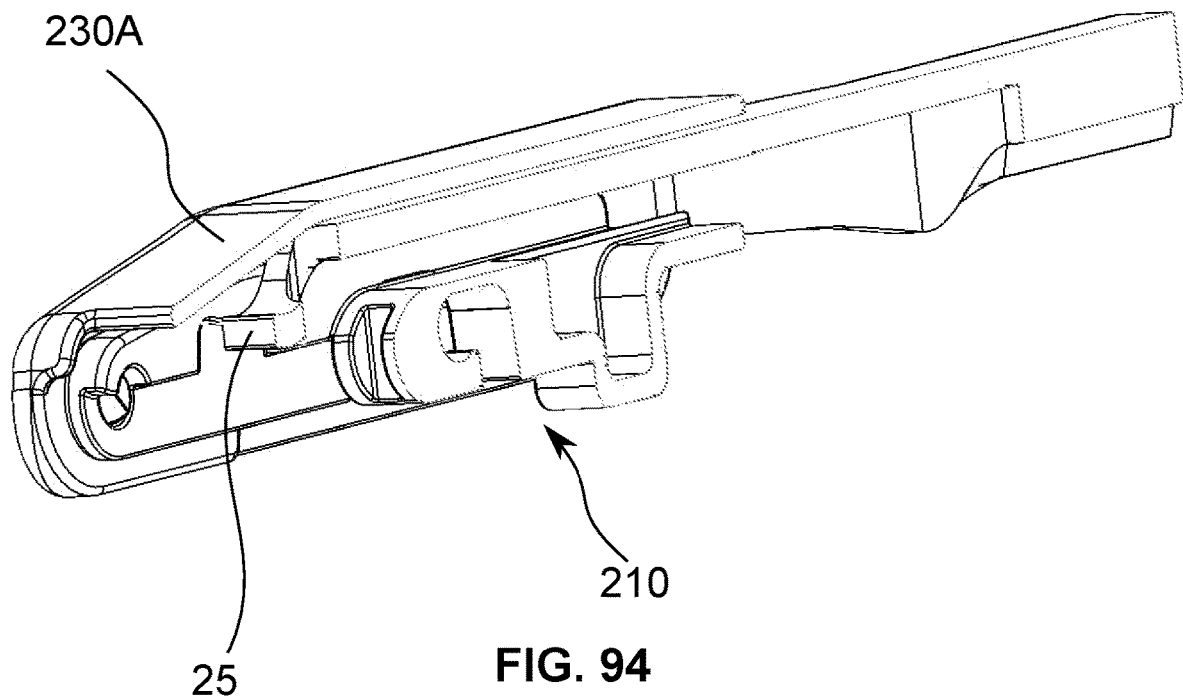
FIG. 94 illustrates a top perspective view of a longitudinal cross section of the wiper arm connected with the wiper blade connector assembly of FIG. 90.
Figure 95:
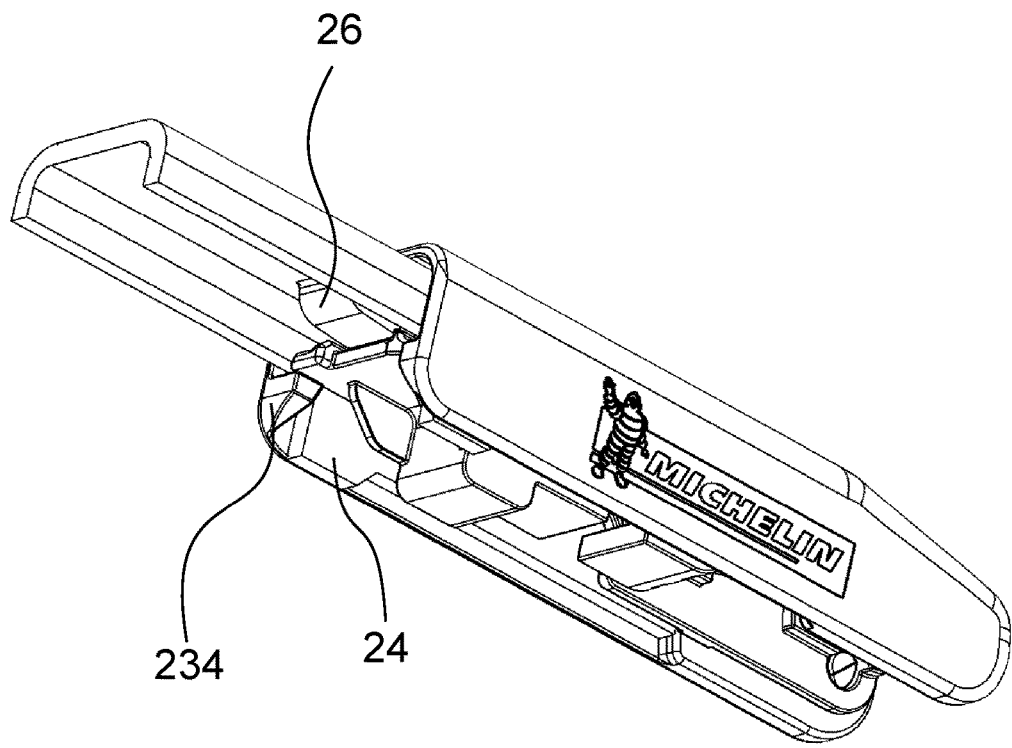
FIG. 95 illustrates a bottom perspective of a wiper arm connected with the wiper blade assembly of FIG. 90.
Figure 96:
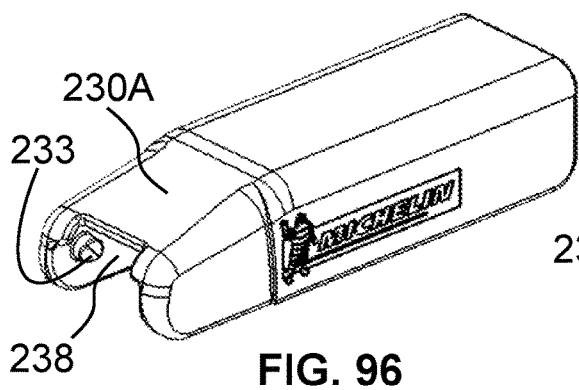
FIG. 96 illustrates a top perspective view of the connector cover of FIG. 92.
Figure 97:
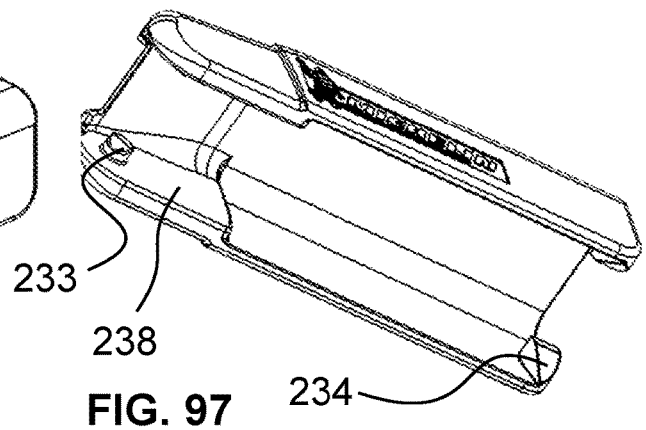
FIG. 97 illustrates a bottom perspective view of the connector cover of FIG. 92.
Figure 98:
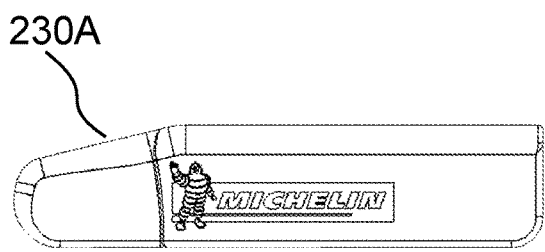
FIG. 98 illustrates a front view of the connector cover of FIG. 92.
Figure 99:
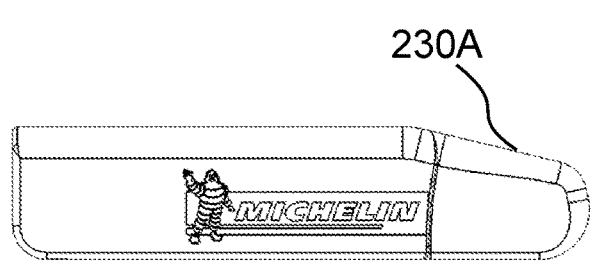
FIG. 99 illustrates a back view of the connector cover of FIG. 92.
Figure 100:
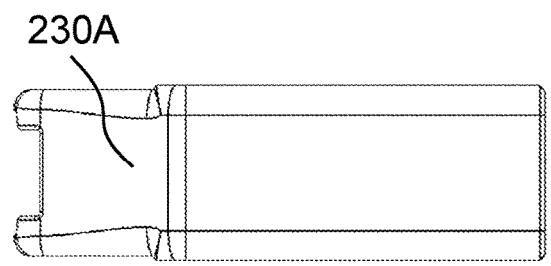
FIG. 100 illustrates a top view of the connector cover of FIG. 92.
Figure 101:
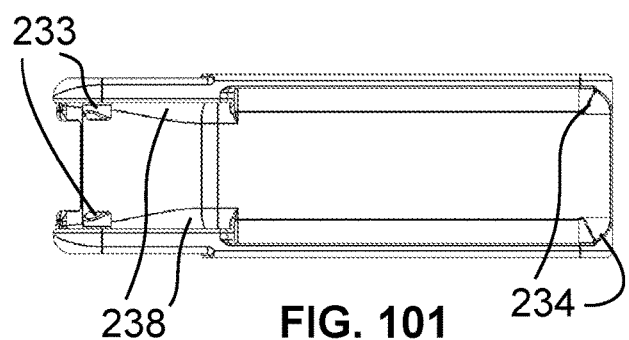
FIG. 101 illustrates a bottom perspective of the connector cover of FIG. 92.
Figure 102:
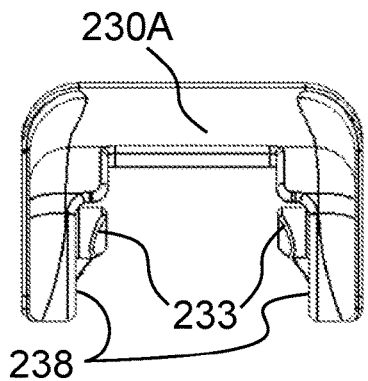
FIG. 102 illustrates a side view of the connector cover of FIG. 92.
Figure 103:
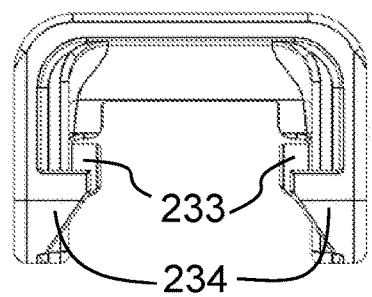
FIG. 103 illustrates an opposing side view of the connector cover of FIG. 92.
Figure 104:
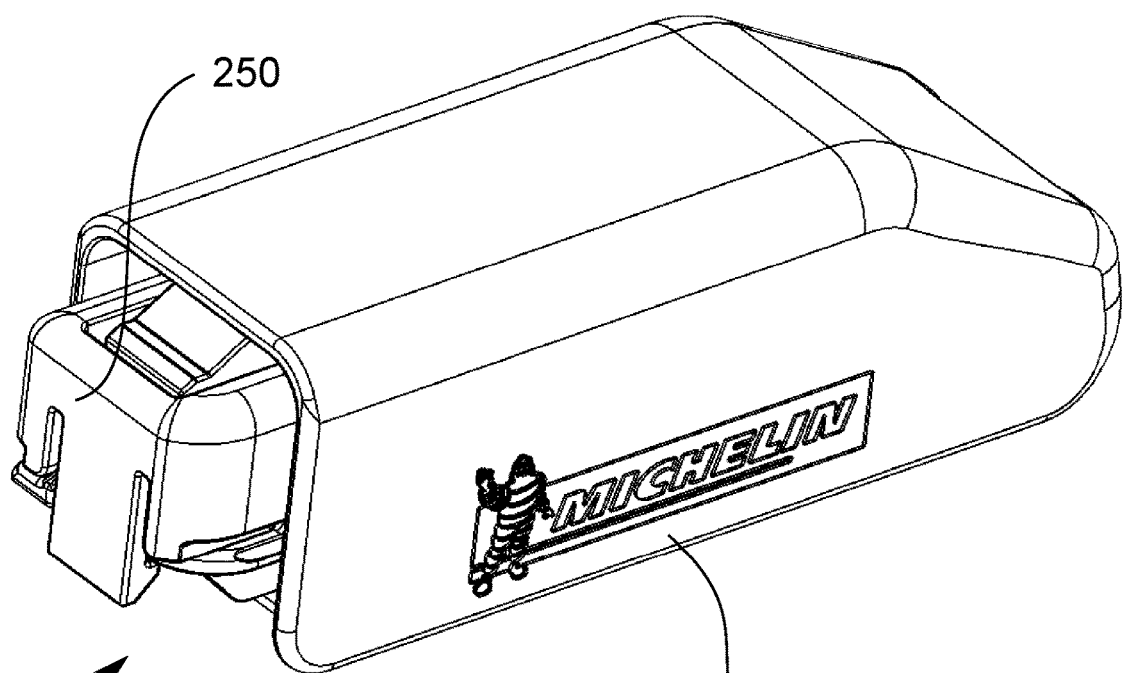
FIG. 104 illustrates a top perspective view of a wiper blade connector assembly, including a connector cover, a connector and an adapter.
Figure 105:
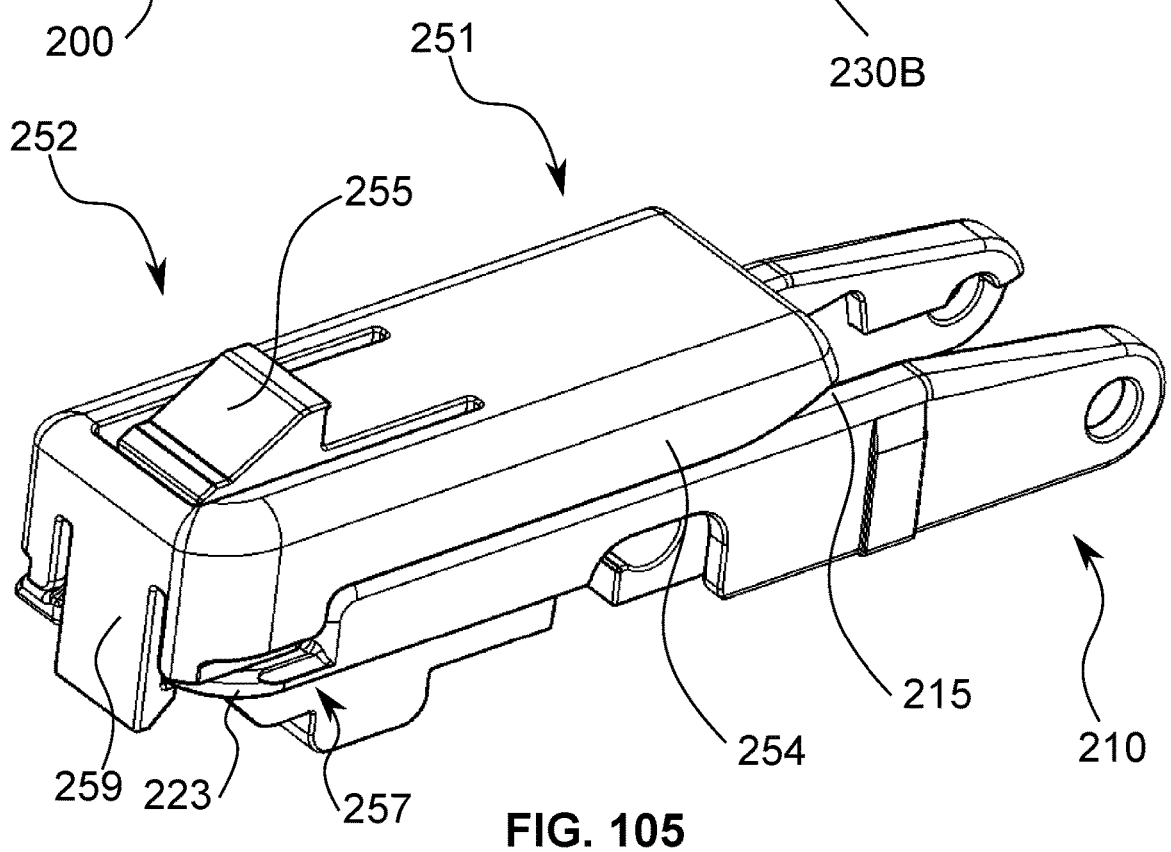
FIG. 105 illustrates a top perspective view of the wiper blade connector assembly of FIG. 104 with the connector cover removed.
Figure 106:
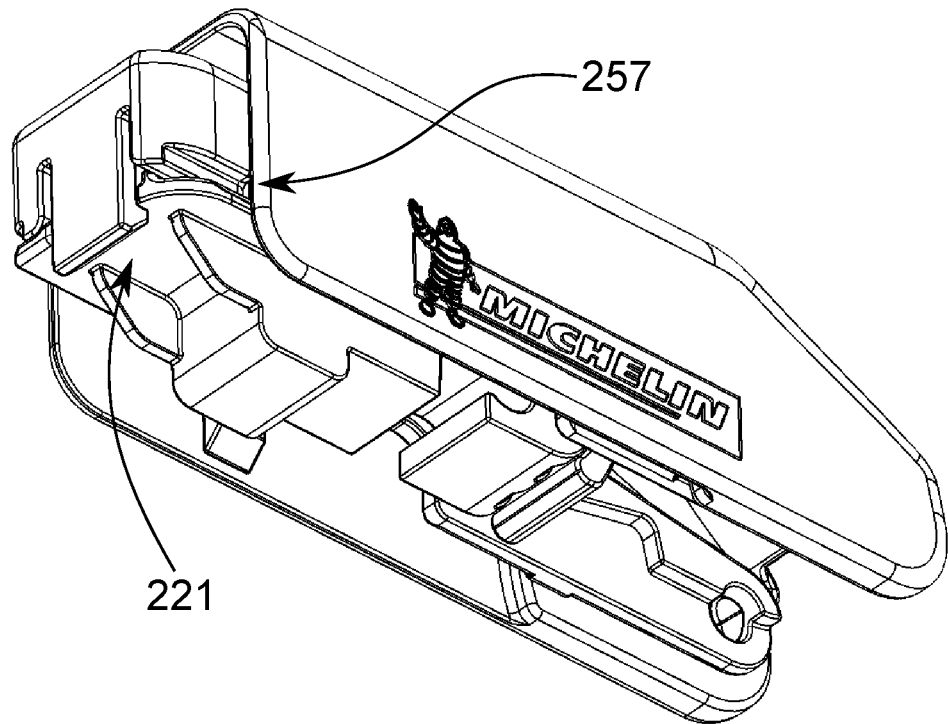
FIG. 106 illustrates a bottom perspective view of the wiper blade connector assembly of FIG. 104.
Figure 107:
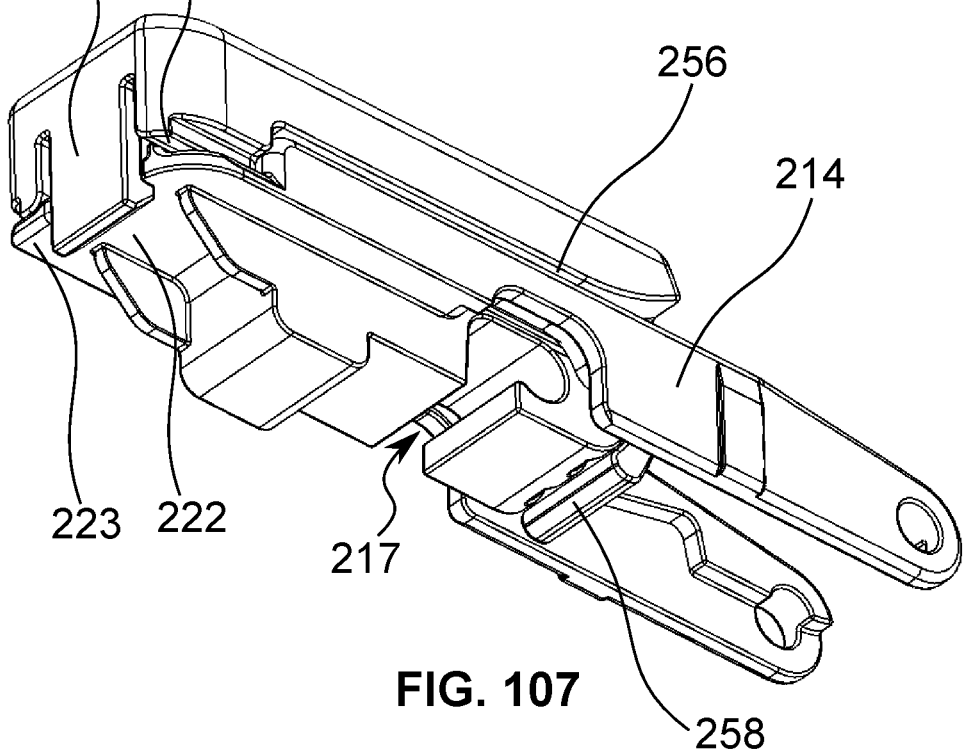
FIG. 107 illustrates a bottom perspective view of the wiper blade connector assembly of FIG. 104 with the connector cover removed.
Figure 108:
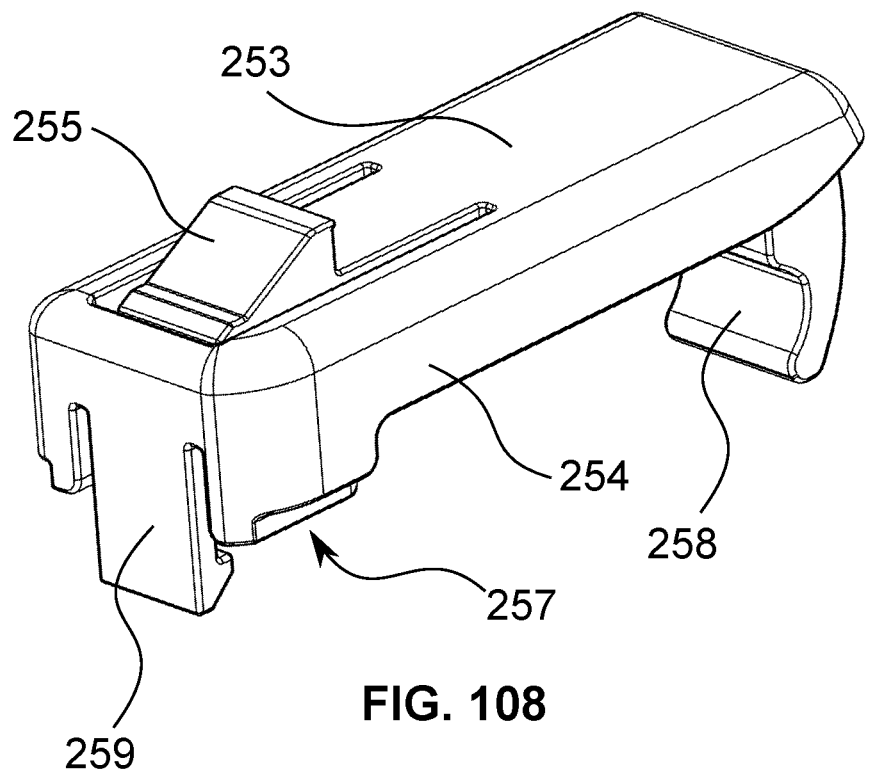
FIG. 108 illustrates a top perspective view of the adapter of the wiper blade connector assembly of FIG. 104.
Figure 109:
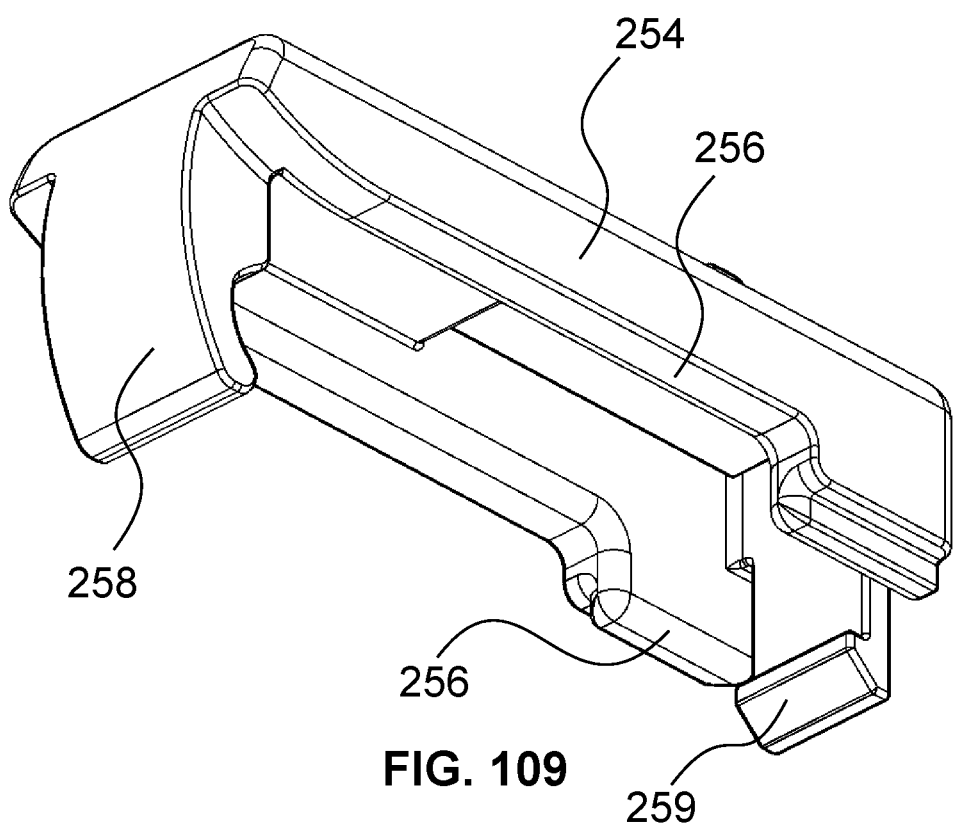
FIG. 109 illustrate a bottom perspective view of the adapter of FIG. 108.
Figure 110:
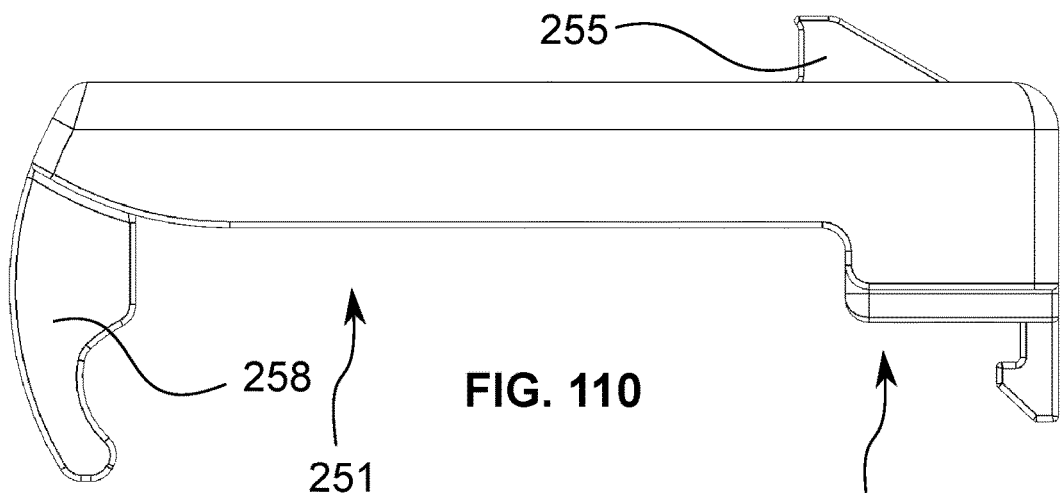
FIG. 110 illustrates a front view of the adapter of FIG. 108.
Figure 111:
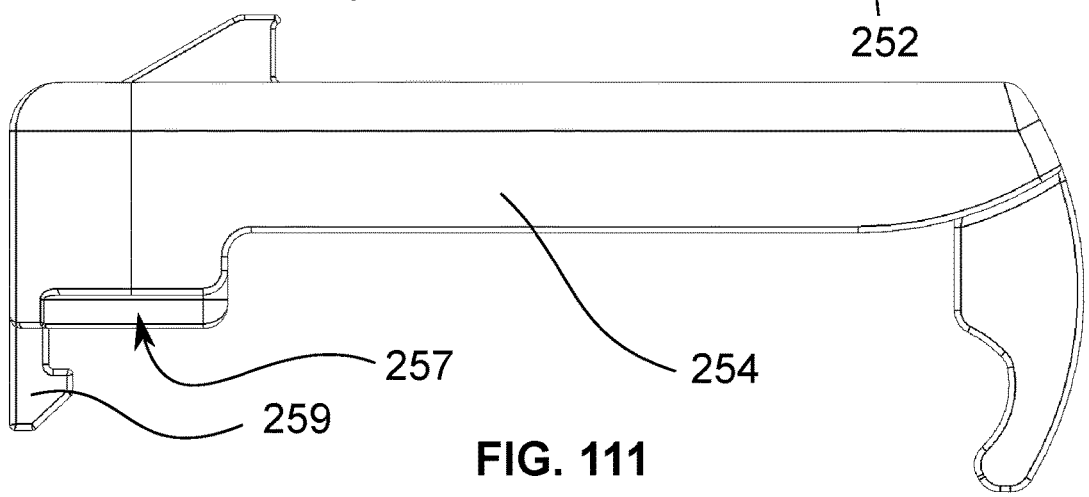
FIG. 111 illustrates a back view of the adapter of FIG. 108.
Figure 112:
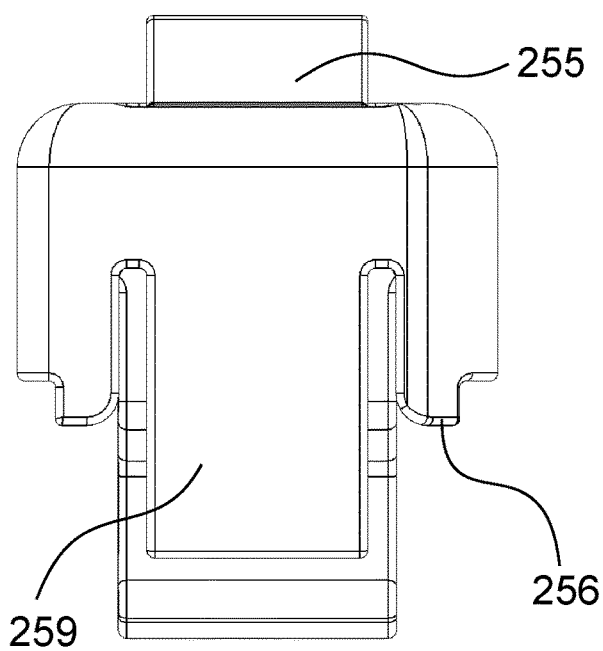
FIG. 112 illustrates a side view of the adapter of FIG. 108.
Figure 113:
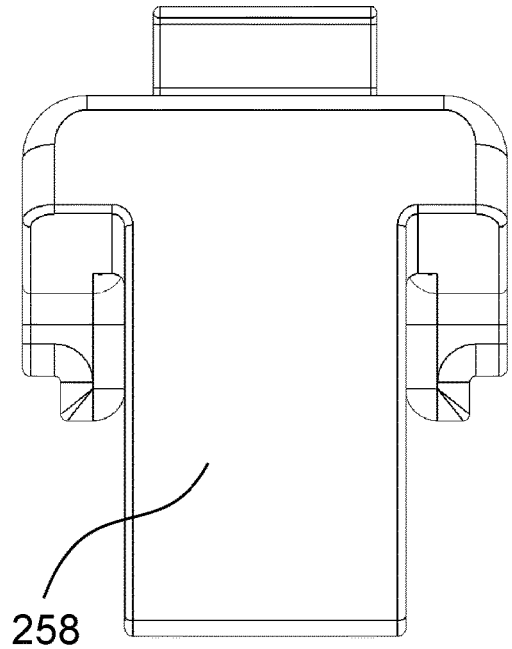
FIG. 113 illustrates an opposing side view of the adapter of FIG. 108.

FIGS. 93-96 illustrate various types of wiper arms 20 connected with a wiper blade connector assembly 200 including a wiper blade connector 210 and a wiper blade connector cover 230A. FIGS. 94 and 95 illustrate a wiper arm 20 having a wing members 24 and a front tongue 25. Connector cover tabs 234 may be conformingly dimensioned secure wing members 24 while front tongue 25 may be positionable between cover 230A and connector 210. The wiper arm may fit over connector 210 and between connector side walls 214 and cover 230A, and wiper arm 20 may press against the edge of platform 238. FIG. 95 illustrates how a wiper arm 20 having a rear tongue 25 may be accommodated, such that rear tongue 25 may be insertable within channel 225.

Figure 114:
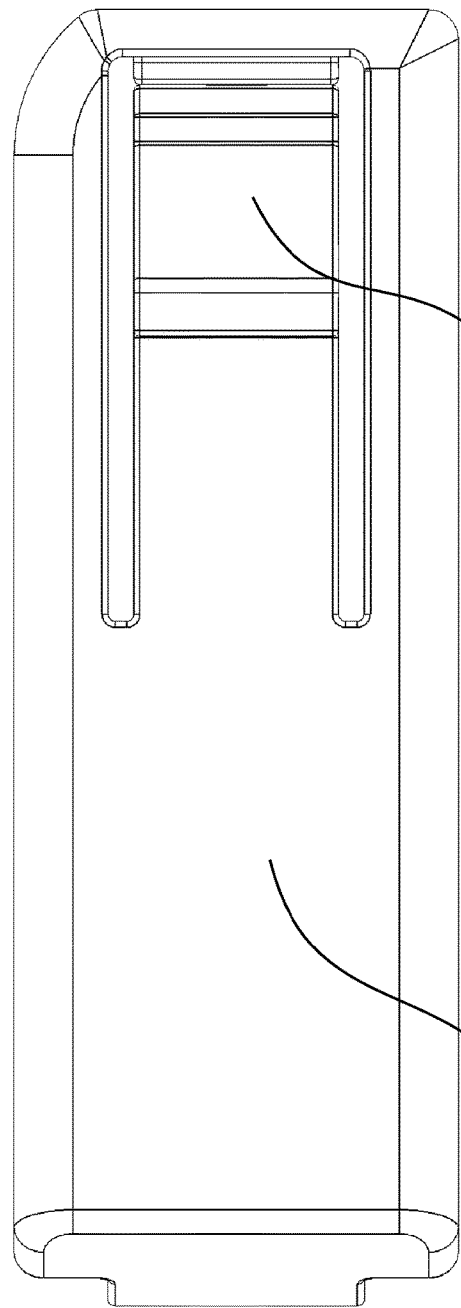
FIG. 114 illustrates a top view of the adapter of FIG. 108.
Figure 115:
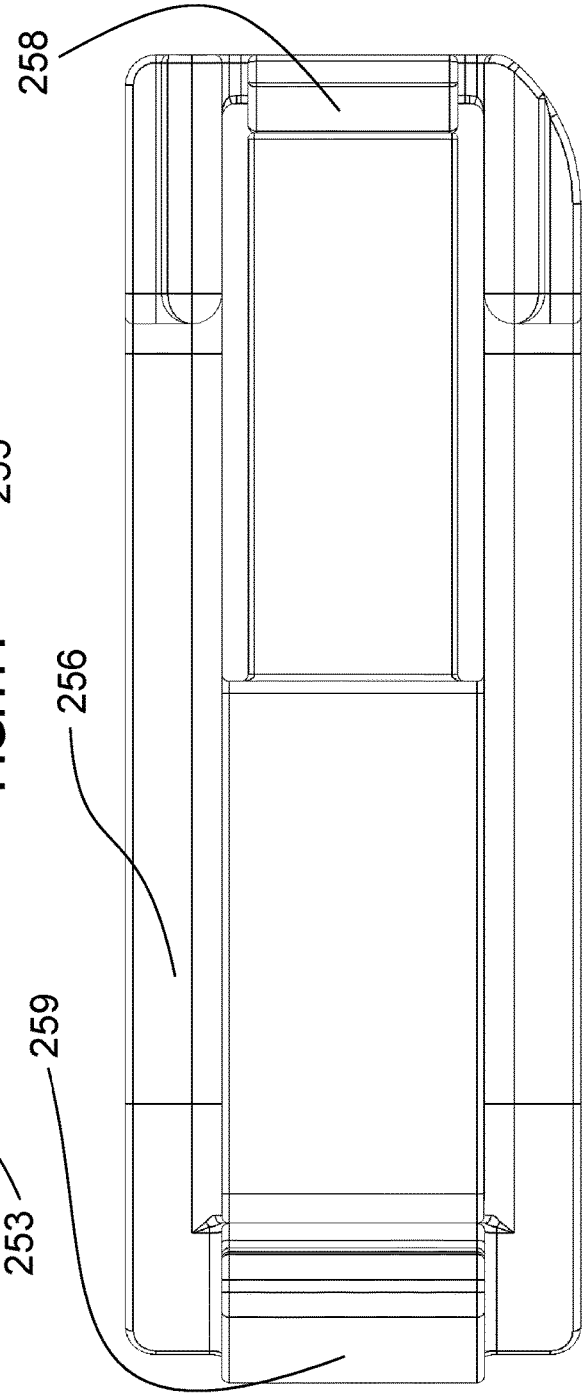
FIG. 115 illustrates a bottom view of the adapter of FIG. 108.
Figure 116:
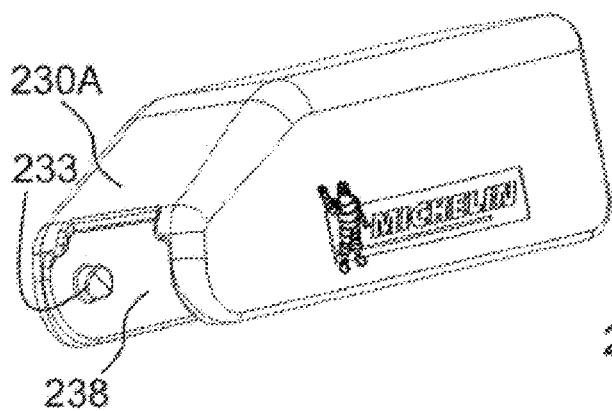
FIG. 116 illustrates a top perspective view of the connector cover of FIG. 104.
Figure 117:
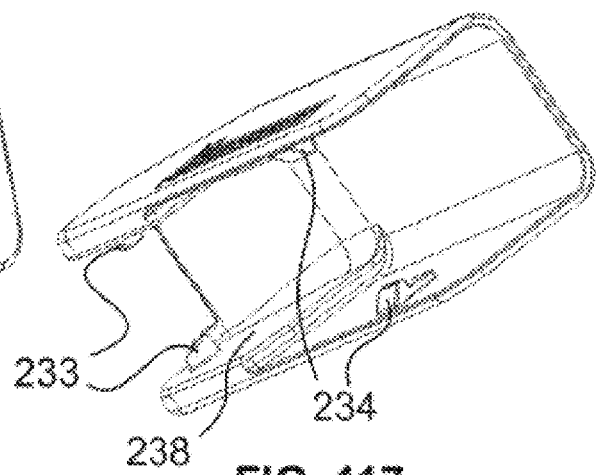
FIG. 117 illustrates a bottom perspective view of the connector cover of FIG. 116.
Figure 118:
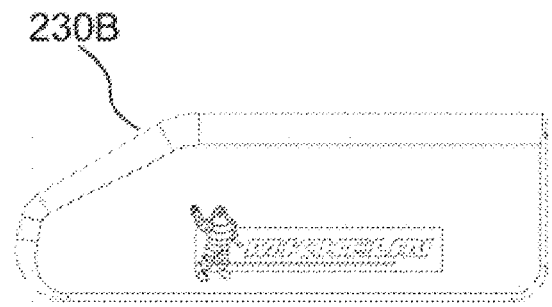
FIG. 118 illustrates a front view of the connector cover of FIG. 116.
Figure 119:
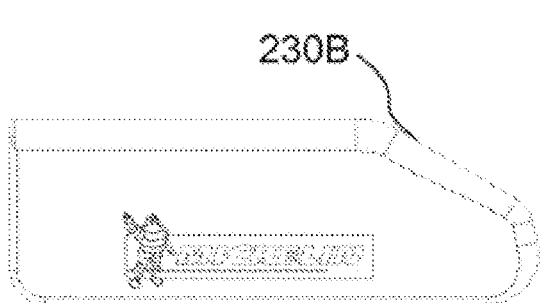
FIG. 119 illustrates a rear view of the connector cover of FIG. 116.
Figure 120:
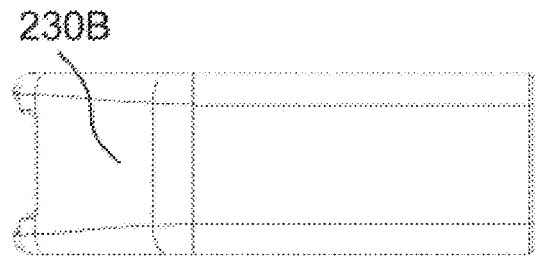
Figure 121:
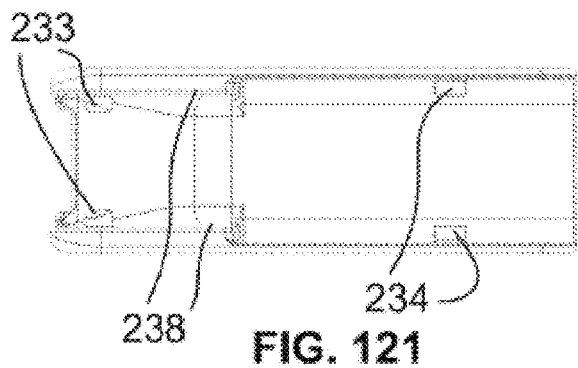
Figure 122:
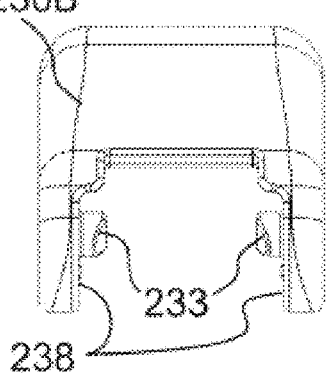
Figure 123:
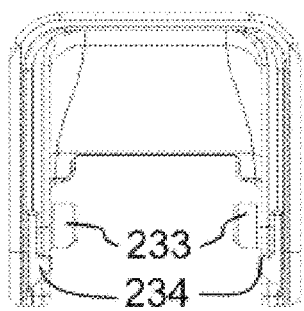

With reference to FIGS. 104-123, a wiper blade connector assembly may include a wiper blade connector 210, and wiper blade connector cover 230B, and a wiper blade connector adapter 250 connected between connector 210 and connector cover 230B. Connector cover 230B may be taller than connector cover 230A. Adapter 250 may include a first portion 251 and a second portion 252, a top surface 253 and a pair of side walls 254. The first portion 251 may be located on the distal end of the adapter 250 while the second portion 252 may be located on the proximal end of the adapter 250. An adapter button 255 may project from or be connected with top surface 253 from a cantilever. Adapter side walls 254 may include a bottom edge 256 which may have a staggered or different elevations. In the illustrated embodiment, bottom edge 256 has a higher elevation over first portion 251 than it does over second portion 252. Moreover, the lower elevation bottom edge 256 may include a cutout 257 to accommodate a projection from a wiper arm 20 as shown further herein. The higher elevation of bottom edge 256 may contact the upper edge 215 of connector 210, while the slower elevation of bottom edge 256 may contact the top side of shelf 221, and more particularly the top side of wings 223. As shown in FIG. 114, one side of the top surface of the proximal end of the adapter 250 may be more curved, while the other end may be more rectangular. This may facilitate connections with arms that have the engagement portion offset such as wiper arm 20 shown in FIG. 124.

A first clip 258 may be provided at the first portion 251 of adapter 250, and a second clip 259 may be provided at second portion 252. First clip 258 may project downwards and snap fit against the curved area, where a wiper arm hook 21 may fit as previously shown, of connector 210 proximate rivet cutout 217. Second clip 259 may also project downwards and clip the underside of shelf 221 at center section 222. One or both of the first clip 258 and second clip 259 may be elastically deflectable to facilitate connection of the adapter 250 to the connector 210.

Figure 124:
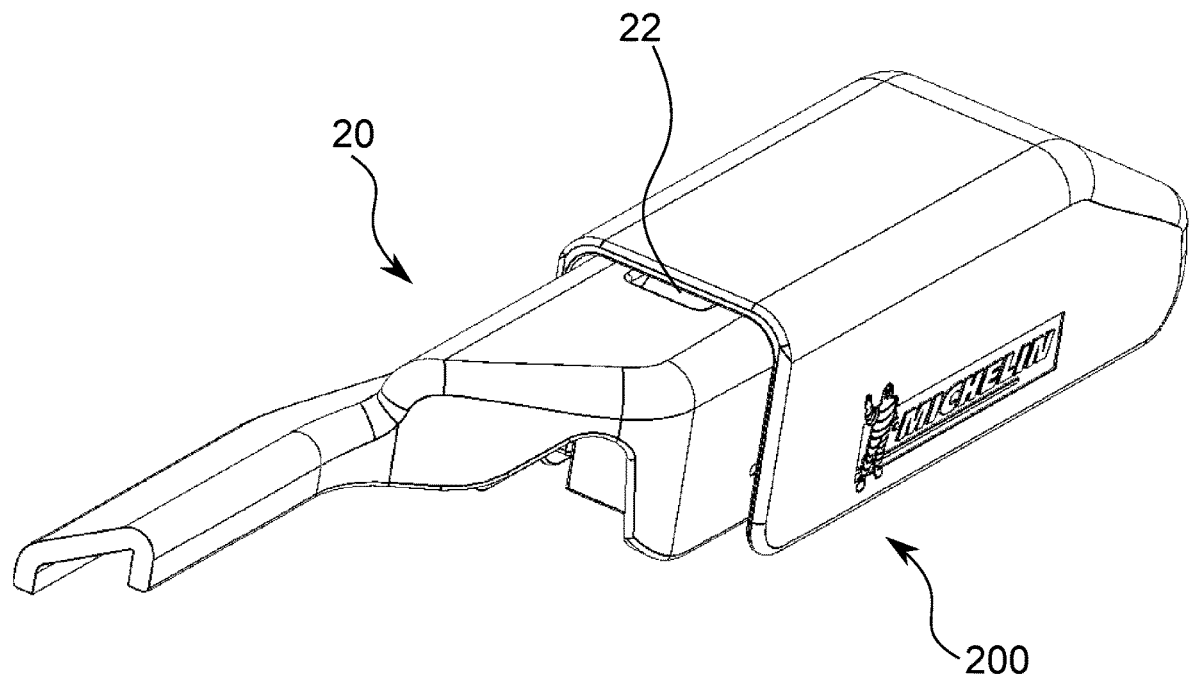
Figure 125:
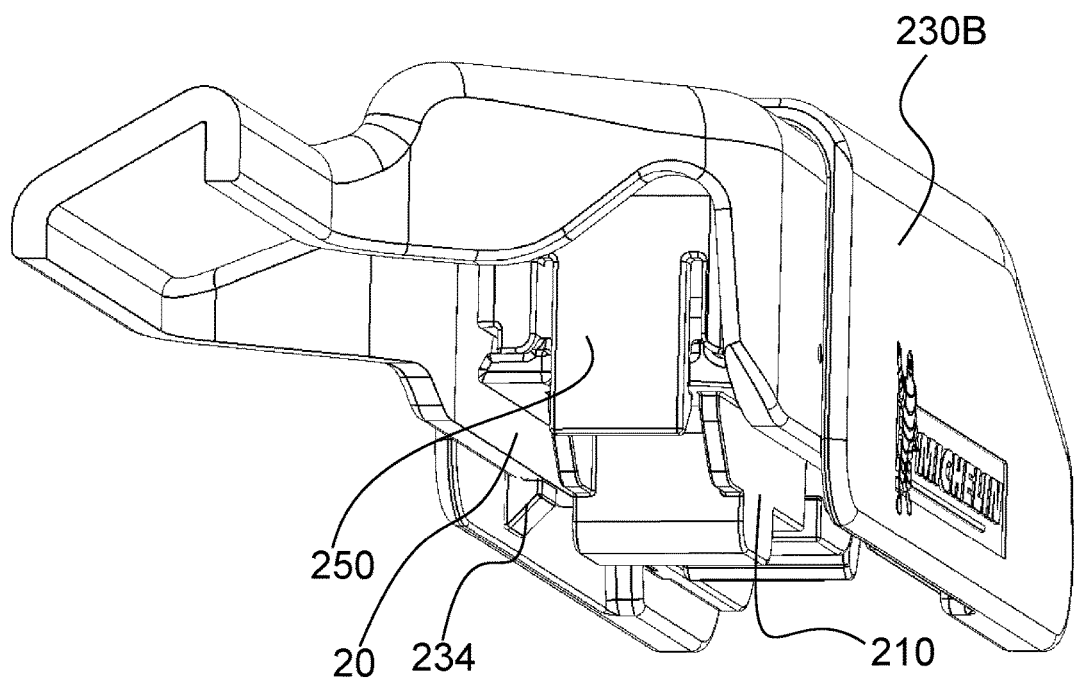
Figure 128:
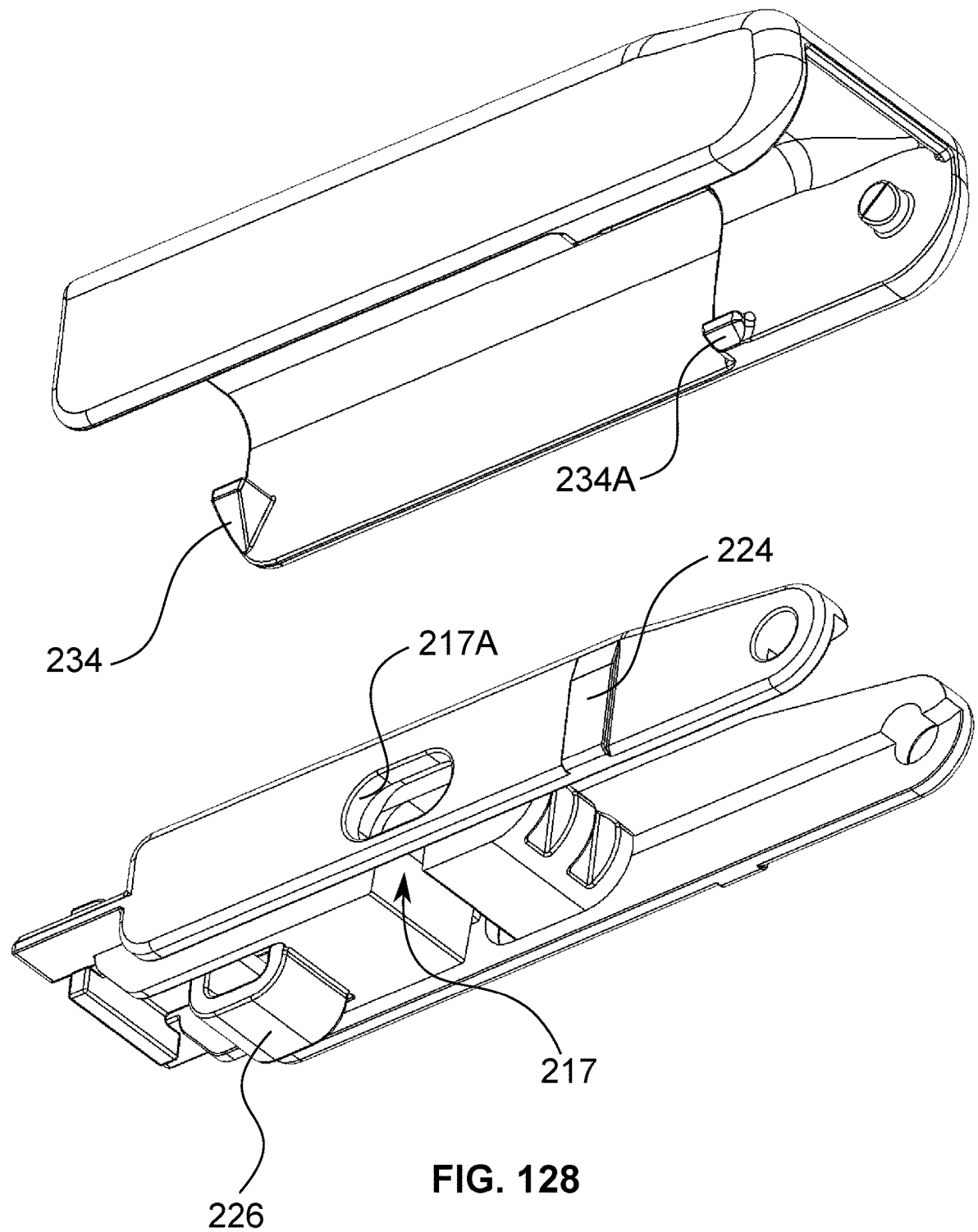
Figure 129:
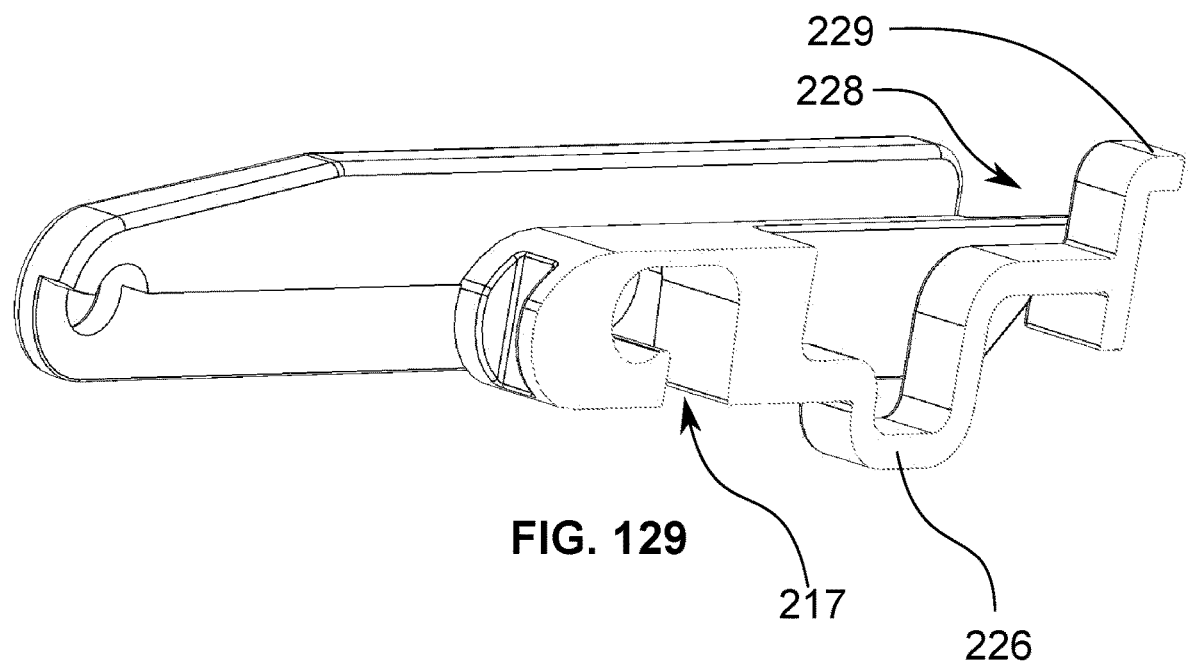
Figure 130:
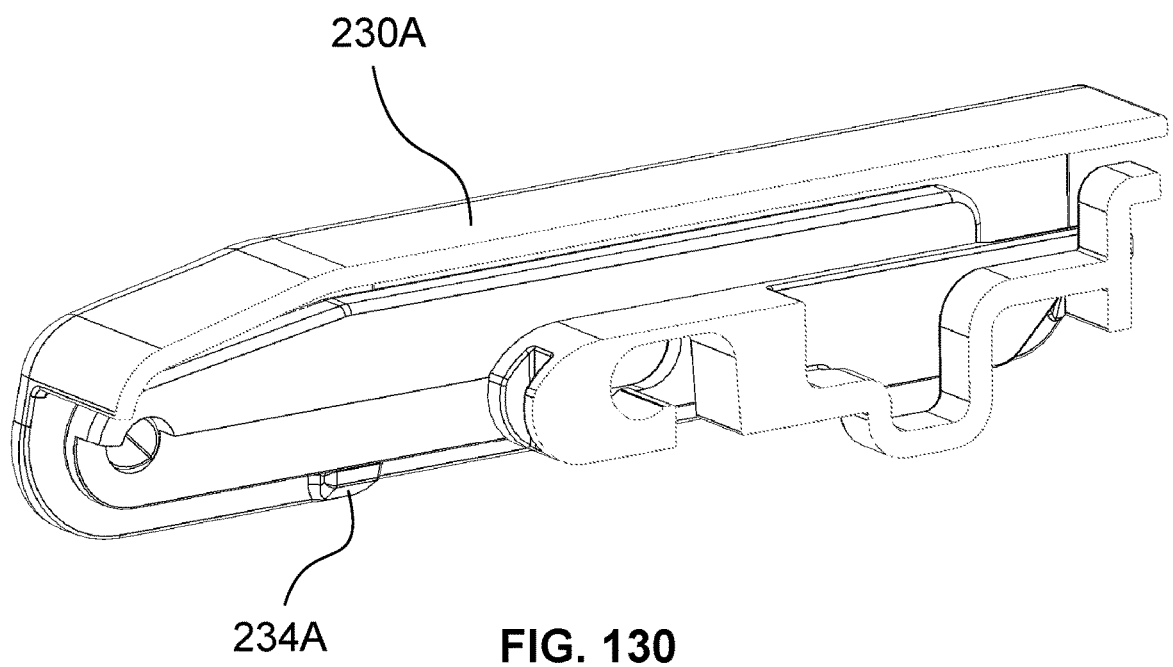

FIGS. 124 and 125 show an embodiment of wiper blade connector assembly 200 having adapter 250 and connector cover 230B connected with a wiper arm 20 having opening 22. Cover tabs 234 may grip the edge of arm 22 in the closed position, and tab 255 may engage the opening 22 in the wiper arm. Accordingly, wiper adapter 250 may allow connector assembly 200 to accommodate differently dimensioned wiper As 20, including those that are larger or thicker. Use of adapter 250 may require a differently dimensioned cover 350B at least having longer side walls.

Referring now to FIGS. 126-130, an embodiment of connector assembly 200 may include a connector 210A having a pillar 227 which may project upwardly from shelf 221 between wings 223. Pillar 227 may be cantilevered 228 to an upper lip 229 which may be resiliently engageable with a tongue on wiper arm 20, as described further herein. The lip 229 may be sized and shaped to engage with the rear tongue 25 of a wiper arm. Pillar 227 may an extension of hook end stop 226, which collectively may be a bent cantilever extending from the center of connector 210A proximate rivet cutout 217. Moreover, connector 210A shows that a rivet window 217A may be used in place of a rivet cutout 217. In this regard, a rivet window 217A may be provided adjacent to the rivet passage and rivet clip, and rivet window may not extend through lower edge 216. Cover 230A may also be provided with rear tabs 234A to press-fit connect with the lower edge 216 of side wall 214, potentially at protrusion 224.

As discussed previously, connector assembly 200 may be connected to support structure 100 and, more particularly, may be connected to a connector rivet 102 secured on primary frame holes 115. FIGS. 131 and 132 shows another embodiment of primary frame 110 whereby the mounting base 111A is a separate piece from the rest of primary frame 110. Mounting base 111A may be securely attached to primary frame 110 via welding, crimping, or any other method known to a person of ordinary skill in the art. Mounting base 111A may have a lower profile and may be engaged at its longitudinal edges with adjacent side portions 112A, and side portions 112A may have adjoining side walls 113A which removal central portion 111A sits between.

With reference now to FIGS. 133-152, a wiper blade cover 300 may be provided to cover various components of the wiper blade, particularly support structure 100, from environmental conditions. Wiper blade cover 300 may include a center section 310 and two side sections 330. Center section may include side walls 312 between two wrap over portions 313 which extend over the central portion 111 of primary frame 110 at the longitudinal edges of center section 310. The cover center section may preferably be made of a rigid, or hard plastic, while the cover side sections may be preferably made from a rigid, hard plastic or an elastic, soft plastic. Persons of skill in the art will recognize that the disclosed concepts may include covers made from any suitable material or materials known in the art or to be developed, including but not limited to plastics, rubbers, and silicone. One or more ribs 314 may be provided on the inner surface of the center section 310. One or more ribs 316 may be provided along the bottom edge of side walls 312 to engage with the underside of side walls 113 of the primary frame 110 to facilitate the securing of center section 310 to same. The grips 316 may be provided on the end of ribs 314 on the inner side of side walls 312. Persons of skill in the art will recognize that the grips 316 described herein are exemplary and that any structure for connecting and securing the cover center section 310 to the primary frame 110 may be used. Center section side walls 312 may also have a recessed area 315 so as not to interfere with the rocking or pivoting of a connected connector assembly 200. Inner ledge 317 may have a downwardly sloped section 318 descending at an acute angle adjacent the recessed area 315. The downwardly sloped section 318 may further have a narrow portion 319 such that the distance between the outer surfaces of the sidewall 112 at the narrow portion 319 is less than the distance between the outer surfaces of sidewalls 312 at other portions of the cover center section 310.

Side sections 330 may include an outer end groove 332 dimensioned to receive an outer end of a secondary frame 150. Outer groove 332 may be defined by a ledge provided on the bottom side of side section cover 330, with the ledge projecting inwardly throughout the distal end. The outer edge of a secondary frame 150 may then fit on that ledge. Inner projections 339 may be provided to engage holes in on the outer end of secondary frame, such as bead hole 135. One or more intermediary braces 334 may also be provided within side section 330 to provide lateral support, and to secure the support structure 100, such as primary frame 110. A downward projection 336 may be provided on the underside of the side section 330 proximate the center section 310 to engage the inner edge of the primary frame side portions 112, and to reduce gaps between the wiper blade cover sections 310, 330 as the wiper blade moves and the sections 310, 330 may be forced apart. At or proximate to the center section 310 may be one or more holes 337 to receive cover engagements 117 on primary frame 110. The inner surface of the side wall of cover side section 330 may be recessed adjacent to holes 337 to facilitate insertion of cover engagements 117. Tire treading 338 may also be provided on an upper surface of side sections which may dually serve an ornamental purpose as well as an aerodynamic purpose as the wiper blade moves. Alternatively, the cover may be provided with a spoiler, or any other functional or aesthetic features known in the art or to be developed, within the scope of the disclosed concepts. Persons of skill in the art will recognize that the cover design illustrated in these figures is exemplary and that the disclosed concepts may be practiced with any suitable cover known in the art or to be developed.

Referring now to FIGS. 154-171, further embodiments of a connector assembly 200 are shown and described including a connector 210b, connector cover 230c, and adapter 250a. FIGS. 154-161 illustrate an embodiment of a connector 210b which includes a shelf opening or window 222a provided on the center portion 222 of shelf 221. One or more notches 223a may be provided on shelf 222, and more particularly on wings 223. As shown, the one or more notches 223a may have a substantially triangular cross section. The positioning and dimensioning of notches 223a may receive the ends of projections on or claws having a generally triangular or bent shape and may improve the secure interface with corresponding latches on certain embodiments of a wiper arm 20. A bottom edge slot 216a may also be provided to receive, and further secure, certain embodiments of a wiper arm 20. As shown in FIGS. 155 and 156, a primary frame stop cutout 219 may further be disposed further inward, i.e., closer to the pivot point, and corresponding adjustments may be made to the positioning of stops 116.

FIGS. 162-169 illustrate an embodiment of a connector cover 230c. Connector cover tabs 234b may include cutouts 239 to accommodate wiper arm claws or projections having a generally triangular or bent shape. Connector cover 230c may further have triangular shaped supports on the lower side of tabs 234b to increase support and facilitate securing the cover to the wiper arm. An underside wall may also be provided to abut portions of either a connector or adapter.

FIGS. 170 and 171 illustrate an embodiment of an adapter 250a. Embodiments of adapter 250, 250a may include clips 258, 259 which may be inward facing, as illustrated in previous embodiments, or outward facing, as second clip 259 is shown in adapter 250a. For instance, an outward facing second clip 259 may engage with the shelf window 222a of connector 210b. An end stop 260 may also be provided at the end of either first or second portion 251, 252. As shown, an end stop 260 is provided at first portion 251 proximate first clip 258. End stop 260 may longitudinally project past first clip 258, may curl upwards towards top surface 253, and may include a top wall 261 projecting away from top surface 253 proximate the end of first portion 251. Top wall 261 may press or abut against underside wall on cover 230b, and may receive, abut, or otherwise act as a stop for an end of a wiper arm 20. Additionally, adapter 250a may be provided with stop wall 262 which may also receive, abut, or otherwise act as a stop for an end of a wiper arm. The cutouts 257 in adapter 250a may further be provided with stops 263 that receive, abut, or otherwise act as stop for the projections or claws of a wiper arm 20.

With reference to FIG. 172, the primary frame stop cutout 219 may be provided at the bottom surface of side walls 214 rather than on an inner ledge. Moreover, wings 223 may extend from a longitudinal projection off side walls 214a rather than from a shelf 221. Wings 223 may also contact a portion of lower edges 26 on side walls of a wiper arm 20.

With reference to FIGS. 173-176, embodiments where connector cover 230 may cover a significantly smaller portion of connector 210 are contemplated within the disclosure. For example, connector cover tabs 234 may engaged with first portion 211 of connector 210 rather than second portion 212 as generally shown and described. An upper tab 236a may project from the underside and engage with a front tongue 24 of a wiper arm.

The descriptions set forth above are meant to be illustrative and not limiting. Various modifications of the embodiments, in addition to those described herein, will be apparent to those skilled in the art from the foregoing description. Such modifications are also intended to fall within the scope of the concepts described herein. Each patent, patent application and publication cited or described in this document are hereby incorporated herein by reference, in their entireties.

The foregoing description of possible implementations consistent with the present disclosure does not represent a comprehensive list of all such implementations or all variations of the implementations described. The description of some implementation should not be construed as an intent to exclude other implementations. For example, artisans will understand how to implement the embodiments in many other ways, using equivalents and alternatives that do not depart from the scope of the disclosure. Moreover, unless indicated to the contrary in the preceding description, none of the components described in the implementations are essential to the embodiments disclosed. It is thus intended that the embodiments be considered as illustrative, with a true scope and spirit of the disclosure being indicated by the following claims.

What is claimed:

1. A wiper blade connector assembly for connecting a wiper blade support structure with a wiper arm, the wiper blade connector assembly comprising:
    a wiper blade connector having a first portion, a second portion longitudinally opposed to the first portion, and a center portion defined between the first and second portions, the wiper blade connector including
    a pair of side walls extending along at least some of the first, second, and center portions, each side wall having a top surface and a bottom surface,
    a connector channel defined between the pair of side walls on the second portion of the wiper blade connector, the connector channel dimensioned to accommodate at least a portion of the wiper arm,
    a rivet cutout provided proximate the bottom surface dimensioned to accommodate a rivet on the wiper blade support structure, and
    a shelf provided on the second portion of the wiper blade connector, the shelf including a center section aligned with the connector channel and a wing provided proximate to one of the side walls; and
    a wiper blade connector cover having a first portion and a second portion longitudinally opposed to the first portion, the first portion of the wiper blade connector cover pivotable with respect to the first portion of the wiper blade connector, and the second portion of the wiper blade connector cover includes a connector cover tab engageable with the wing to secure the wiper blade connector cover in a closed position, wherein the wiper blade connector cover further includes a button cantilevered to a top surface of the wiper blade connector cover, and a distal edge of the button projects upward from the top surface of the wiper blade connector cover and includes a chamfered surface.

2. The wiper blade connector assembly of claim 1, wherein the wiper blade connector includes a hook end stop provided proximate the bottom surface and distanced from the rivet cutout, the hook end stop positioned so as to abut the end of a hook-style wiper arm.

3. The wiper blade connector assembly of claim 1, wherein the top surface of the side walls at the first portion of the wiper blade connector are downwardly angled with respect to the top surface of the side walls at the center portion of the wiper blade connector, and the top surface of the side walls at the center portion of the wiper blade connector is co-planar with the top portion of side walls at the second portion of the wiper blade connector,
    wherein the bottom surface of the side walls at the first portion of the wiper blade connector are coplanar with the bottom surface of the side walls at the center portion of the wiper blade connector, and the bottom surface of the side walls at the center portion of the wiper blade connector are at a different elevation than the bottom surface of the side walls at the second portion of the wiper blade connector, and
    wherein an underside of the at least one wing is coplanar with the bottom surface of the side walls at the second portion of the wiper blade connector.

4. The wiper blade connector assembly of claim 1, wherein the wiper blade connector cover further includes at least one rear cover tab provided on the first portion of the wiper blade connector cover, and the wiper blade connector further includes an outward protrusion extending from an outer surface of one of the connector side walls,
    wherein the at least one rear cover tab is engageable with a bottom side of the protrusion when the cover is in the closed position.

5. The wiper blade connector assembly of claim 1, wherein the first portion of the wiper blade connector includes a pair of connector cover receiving holes and the first portion of the wiper blade connector cover includes a pair of connector hole rods projecting inwardly and engageable with the connector cover receiving holes.

6. The wiper blade connector assembly of claim 1, wherein an underside of the wiper blade connector cover includes a hook stop.

7. The wiper blade connector assembly of claim 1, wherein the wiper blade connector cover includes a bottom surface at a first elevation at the first portion of the wiper blade connector cover and at a second elevation at the second portion of the wiper blade connector cover.

8. The wiper blade connector assembly of claim 1, the wiper blade connector including an additional wing provided proximate to the opposite side wall of the pair of side walls, and
    the connector cover including an additional connector cover tab engageable with the additional wing to secure the wiper blade connector cover in a closed position.

9. The wiper blade connector assembly of claim 8, wherein the wing and additional wing have two different dimensions.

10. The wiper blade connector assembly of claim 9, wherein the wing projects a first distance and the additional wing projects a second distance that is greater than the first distance.

11. The wiper blade connector assembly of claim 9, wherein the wing includes a rounded corner and the additional wing includes a more rectangular corner than the rounded corner of the wing.

12. The wiper blade connector assembly of claim 8, wherein the shelf is integrated with the wing and additional wing.

13. A wiper blade assembly connectable with a wiper arm, the wiper blade assembly comprising:
- a wiper blade support structure; and
- a wiper blade connector assembly for connecting the wiper blade support structure with the wiper arm, the wiper blade connector assembly comprising:
- a wiper blade connector having a first portion, a second portion longitudinally opposed to the first portion, and a center portion defined between the first and second portions, the wiper blade connector including
- a pair of side walls extending along at least some of the first, second, and center portions, each side wall having a top surf ace and a bottom surface,
- a connector channel defined between the pair of side walls on the second portion of the wiper blade connector, the connector channel dimensioned to accommodate at least a portion of the wiper arm,
- a rivet cutout provided proximate the bottom surface dimensioned to accommodate a rivet on the wiper blade support structure, and
- a shelf provided on the second portion of the wiper blade connector, the shelf including a center section aligned with the connector channel and a wing provided proximate to one of the side walls;
- a wiper blade connector cover having a first portion and a second portion longitudinally opposed to the first portion, the first portion of the wiper blade connector cover pivotable with respect to the first portion of the wiper blade connector, and the second portion of the wiper blade connector cover includes at least one connector cover tab engageable with the wing to secure the wiper blade connector cover in a closed position; and
- wherein the top surface of the side walls at the first portion of the wiper blade connector are downwardly angled with respect to the top surface of the side walls at the center portion of the wiper blade connector, and the top surface of the side walls at the center portion of the wiper blade connector is co-planar with the top portion of side walls at the second portion of the wiper blade connector,
- wherein the bottom surface of the side walls at the first portion of the wiper blade connector are coplanar with the bottom surface of the side walls at the center portion of the wiper blade connector, and the bottom surface of the side walls at the center portion of the wiper blade connector are at a different elevation than the bottom surface of the side walls at the second portion of the wiper blade connector, and
- wherein an underside of the at least one wing is coplanar with the bottom surface of the side walls at the second portion of the wiper blade connector.

14. The wiper blade assembly of claim 13, wherein the wiper blade connector cover further includes at least one rear cover tab provided on the first portion of the wiper blade connector cover, and the wiper blade connector further includes an outward protrusion extending from an outer surface of one of the connector side walls,
- wherein the at least one rear cover tab is engageable with a bottom side of the protrusion when the cover is in the closed position.

15. The wiper blade assembly of claim 13, wherein the first portion of the wiper blade connector includes a pair of connector cover receiving holes and the first portion of the wiper blade connector cover includes a pair of connector hole rods projecting inwardly and engageable with the connector cover receiving holes.

16. The wiper blade assembly of claim 13, the wiper blade connector including an additional wing provided proximate to the opposite side wall of the pair of side walls, and
- the connector cover including an additional connector cover tab engageable with the additional wing to secure the wiper blade connector cover in a closed position.

17. The wiper blade assembly of claim 16, wherein the wing and additional wing have two different dimensions.

* * * * *